US009310033B2

(12) United States Patent
Yamada et al.

(10) Patent No.: US 9,310,033 B2
(45) Date of Patent: Apr. 12, 2016

(54) LIGHT SOURCE DEVICE AND PROJECTION-TYPE DISPLAY APPARATUS

(71) Applicants: Akihiro Yamada, Tokyo (JP); Takeshi Utakoji, Tokyo (JP); Kenji Samejima, Tokyo (JP); Hiroshi Kida, Tokyo (JP); Tomohiko Sawanaka, Tokyo (JP); Shinji Yagyu, Tokyo (JP)

(72) Inventors: Akihiro Yamada, Tokyo (JP); Takeshi Utakoji, Tokyo (JP); Kenji Samejima, Tokyo (JP); Hiroshi Kida, Tokyo (JP); Tomohiko Sawanaka, Tokyo (JP); Shinji Yagyu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 132 days.

(21) Appl. No.: 14/371,920

(22) PCT Filed: Jan. 8, 2013

(86) PCT No.: PCT/JP2013/050086
§ 371 (c)(1),
(2) Date: Jul. 11, 2014

(87) PCT Pub. No.: WO2013/105546
PCT Pub. Date: Jul. 18, 2013

(65) Prior Publication Data
US 2014/0354956 A1    Dec. 4, 2014

(30) Foreign Application Priority Data

Jan. 12, 2012    (JP) .................................. 2012-004157

(51) Int. Cl.
*G03B 21/00*    (2006.01)
*F21K 99/00*    (2010.01)
(Continued)

(52) U.S. Cl.
CPC .............. *F21K 9/56* (2013.01); *G03B 21/2013* (2013.01); *G03B 21/2073* (2013.01); *G03B 33/12* (2013.01); *H04N 9/3152* (2013.01); *H04N 9/3164* (2013.01); *H04N 9/3167* (2013.01); *F21Y 2101/02* (2013.01)

(58) Field of Classification Search
CPC . H04N 9/3161; H04N 9/3105; H04N 9/3167; H04N 13/0438; H04N 13/0459; H04N 13/0434; H04N 13/0422; G02B 27/48; G02B 27/283; G03B 21/2033
See application file for complete search history.

(56) References Cited

U.S. PATENT DOCUMENTS 6,727,982 B2    4/2004    Kawashima et al.
2005/0117337 A1    6/2005    Ishii et al.
(Continued)

FOREIGN PATENT DOCUMENTS

CN    1682154 A    10/2005
CN    101344643 A    1/2009
(Continued)

*Primary Examiner* — Sultan Chowdhury
(74) *Attorney, Agent, or Firm* — Birch, Stewart, Kolasch & Birch, LLP

(57) ABSTRACT

A light source device includes a plurality of light sources with different polarizations. A combined wavelength band of the light of a first polarization and second polarization is a first wavelength band. A combined wavelength band of a third polarization and fourth polarization is a second wavelength band. A plurality of selective transmission elements transmits one or more combined light of one or more polarizations and reflects one or more light of one or more polarizations. Thus, the light of the first polarization, the light of the second polarization and the light of the third polarization passing through a third selective transmission element, and the light of the fourth polarization reflected by the third selective transmission element proceed in the same direction.

12 Claims, 32 Drawing Sheets

(51) Int. Cl.
*H04N 9/31* (2006.01)
*G03B 21/20* (2006.01)
*G03B 33/12* (2006.01)
*F21Y 101/02* (2006.01)

(56) References Cited

U.S. PATENT DOCUMENTS

| | | |
|---|---|---|
| 2005/0206847 A1 | 9/2005 | Hansen et al. |
| 2006/0023172 A1 | 2/2006 | Ikeda et al. |
| 2007/0273796 A1 | 11/2007 | Silverstein et al. |
| 2007/0273798 A1 | 11/2007 | Silverstein et al. |
| 2007/0297061 A1 | 12/2007 | Kyomoto et al. |
| 2009/0015734 A1 | 1/2009 | Hsu |
| 2009/0153752 A1 | 6/2009 | Silverstein |
| 2009/0278918 A1* | 11/2009 | Marcus ............ G02B 27/2228 348/54 |
| 2010/0253769 A1* | 10/2010 | Coppeta ............ G02B 27/1026 348/58 |
| 2010/0328633 A1 | 12/2010 | Sato et al. |
| 2011/0043767 A1 | 2/2011 | Kodama et al. |
| 2011/0096297 A1 | 4/2011 | Ogino et al. |
| 2011/0149250 A1 | 6/2011 | Sudo et al. |
| 2012/0133903 A1 | 5/2012 | Tanaka |
| 2013/0155336 A1 | 6/2013 | Nagashima |

FOREIGN PATENT DOCUMENTS

| | | |
|---|---|---|
| CN | 101455078 A | 6/2009 |
| JP | 2005-164769 A | 6/2005 |
| JP | 3659637 B2 | 6/2005 |
| JP | 2006-126644 A | 5/2006 |
| JP | 2007-003847 A | 1/2007 |
| JP | 2007-047245 A | 2/2007 |
| JP | 2008-003125 A | 1/2008 |
| JP | 2009-058594 A | 3/2009 |
| JP | 2009-258207 A | 11/2009 |
| JP | 2010-032797 A | 2/2010 |
| JP | 2010-072012 A | 4/2010 |
| JP | 2010-102049 A | 5/2010 |
| JP | 2010-145584 A | 7/2010 |
| JP | 2011-013317 A | 1/2011 |
| JP | 2011-043634 A | 3/2011 |
| JP | 2011-510333 A | 3/2011 |
| JP | 2001-125198 A | 5/2011 |
| JP | 2011-095388 A | 5/2011 |
| JP | 2011-128490 A | 6/2011 |
| JP | 4711155 B2 | 6/2011 |
| JP | 2012-022050 A | 2/2012 |
| JP | 2012-133337 A | 7/2012 |
| TW | I221628 A | 10/2004 |
| WO | WO 2006/046654 A1 | 5/2006 |
| WO | WO 2009/078941 A1 | 6/2009 |

\* cited by examiner

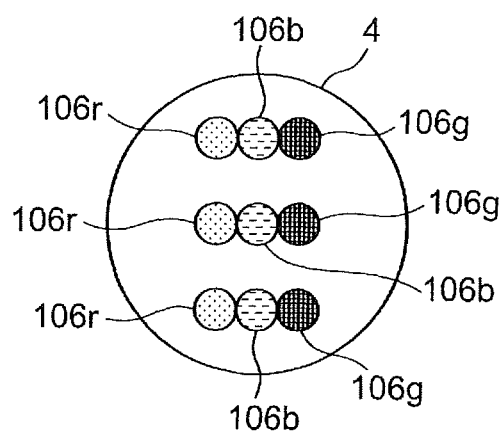 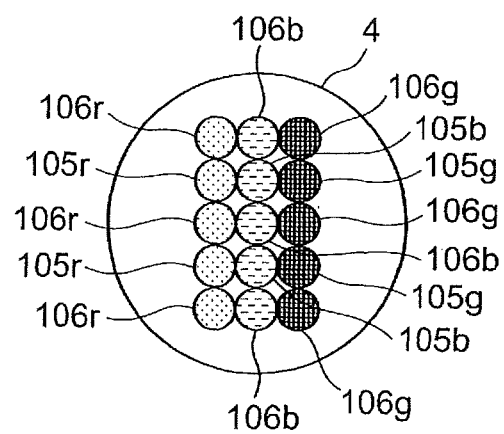
FIG. 12 (A)  FIG. 12 (B)
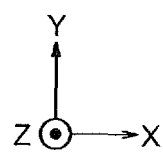

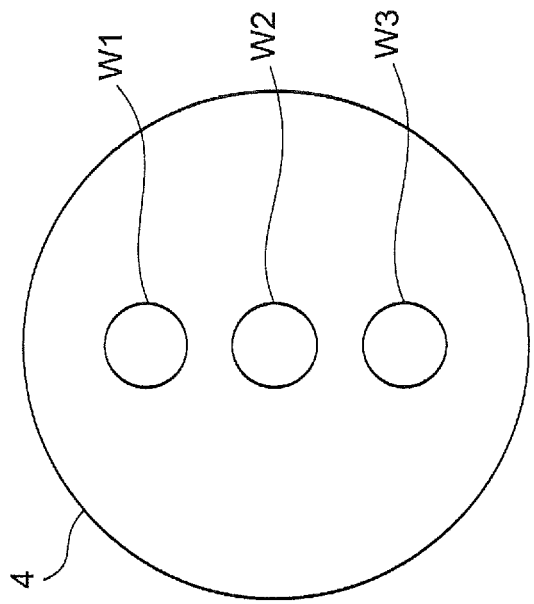
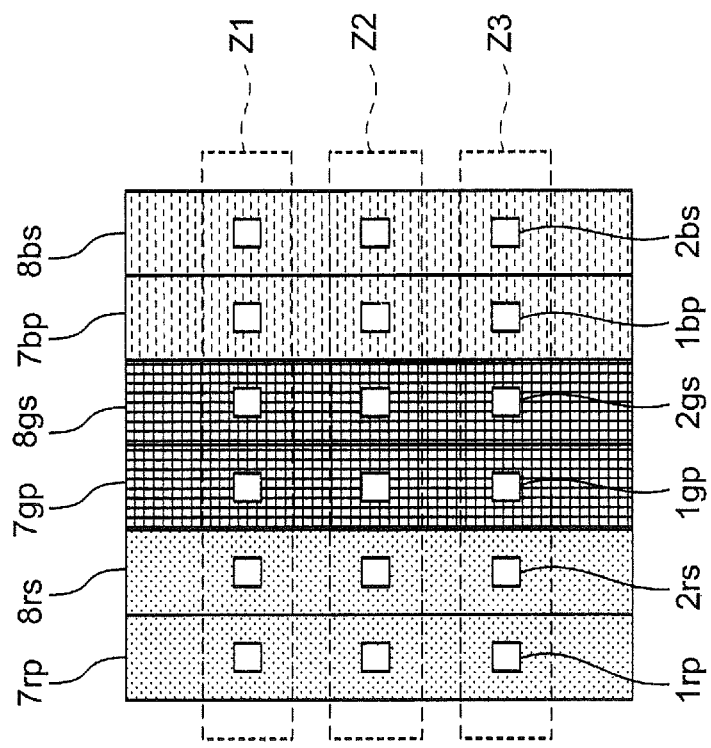
FIG. 26 (A)    FIG. 26 (B)

FIG. 33
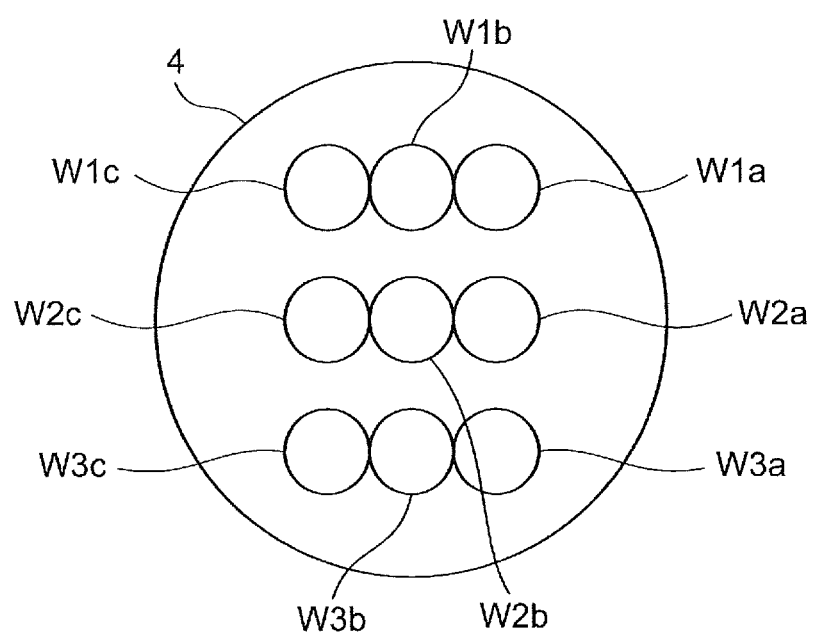
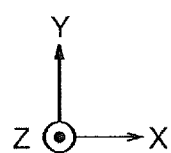

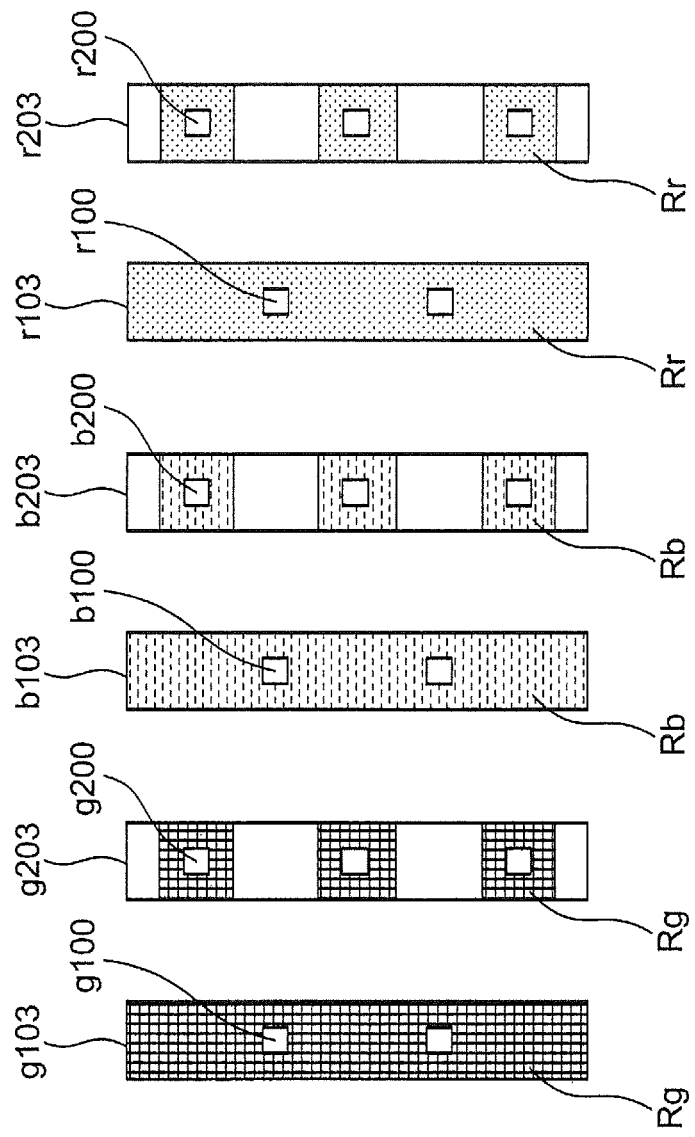
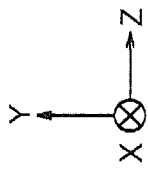
FIG. 35

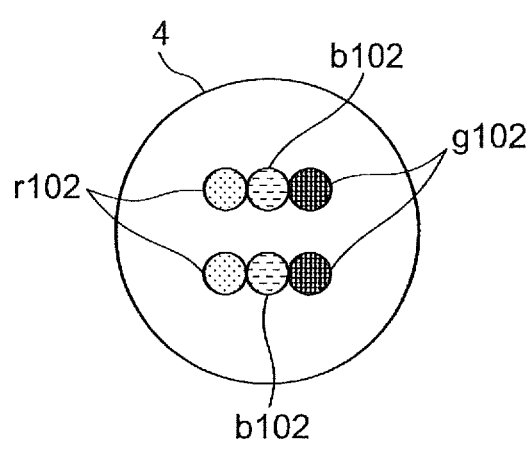 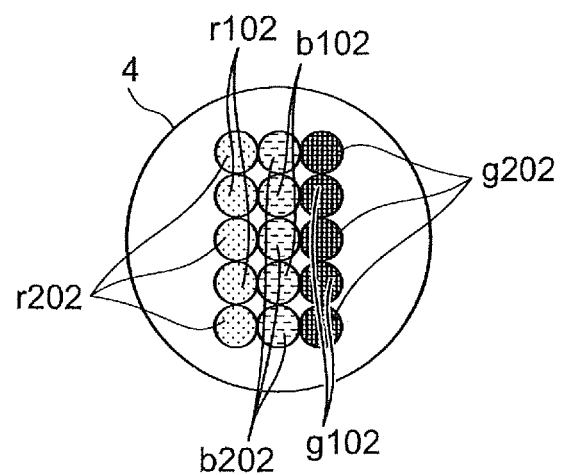
FIG. 36 (A)　　　FIG. 36 (B)

LIGHT SOURCE DEVICE AND PROJECTION-TYPE DISPLAY APPARATUS

TECHNICAL FIELD

The present invention relates to a light source device including a plurality of light sources, and a projection-type display apparatus including the light source device.

BACKGROUND ART

In a projection-type display apparatus, a light source device illuminates a light valve. An image signal is generated by the light valve, and is projected on a screen in an enlarged scale by a projection optical system. The projection-type display apparatus includes a light source (i.e., a light source device) that emits light, an illumination optical system that guides the light to the light valve, and the projection optical system that projects the image signal of the light valve on the screen in an enlarged scale. As the light source of the projection-type display apparatus, a high-pressure mercury lamp and a xenon lamp were mainly used. However, in recent years, projection-type display apparatuses using light sources such as LED (Light Emitting Diode) or LD (Laser Diode) have been developed.

The light sources such as the LED and the LD are dark in brightness as compared with a lamp, and therefore it is necessary to use a plurality of light sources in order to enhance to obtain a high brightness. However, when a plurality of light sources are arranged at constant intervals, a gap is formed between light fluxes emitted by respective light sources, and there is a problem that a light use efficiency decreases. That is, the gap between the light sources that occurs when arranging the respective light sources serves as a non-light emission region. The non-light emission region causes decrease in the light use efficiency. The "non-light emission region" is a region where no light flux exists.

Therefore, in a light source device disclosed by Patent Document 1, a plurality of light sources arranged in rows and columns, a plurality of reflecting mirrors (i.e., a first reflecting mirror group) corresponding to the light sources of respective rows, and a plurality of reflecting mirrors (i.e., a second reflecting mirror group) corresponding to the light sources of respective columns. That is, in Patent Document 1, a plurality of light sources are arranged in rows and columns in a plane, and the mirrors are arranged in a stepwise manner. In a proposed configuration, intervals between light fluxes in a row direction or in a column direction is eliminated, and a light flux reduced in the row direction or a light flux reduced in the column direction is emitted. Furthermore, in Patent Document 2, a configuration of a projection-type display apparatus in which stepwise reflecting mirrors arranged in a plurality of rows is proposed.

PRIOR ART DOCUMENT

Patent Document

Patent Document 1: Japanese Laid-Open Patent Publication No. 2011-13317 (paragraph 0024-0026, FIG. 1)
Patent Document 2: Japanese Laid-Open Patent Publication No. 2011-95388 (FIG. 3)

SUMMARY OF THE INVENTION

Problem to be Solved by the Invention

However, the conventional light source device includes a large number of reflecting mirrors which are arranged corresponding to respective rows and respective columns of the light sources. For this reason, there is a problem that the configuration of the light source device becomes complicated.

The present invention is intended to solve the above problems, and an object of the present invention is to provide the light source device capable of synthesizing light emitted by a plurality of light sources by suppressing occurrence of a gap.

Means of Solving the Problem

In order to solve the above-described problem, a light source device according to the present invention includes a first light source that emits light of a first polarization, and a second light source that emits light of a second polarization whose polarization direction is different from the light of the first polarization by 90 degrees. A combined wavelength band of the light of the first polarization and the light of the second polarization is a first wavelength band. The light source device further includes a third light source that emits light of a third polarization and of a wavelength band which is different from the first wavelength band, and a fourth light source that emits light of a fourth polarization whose polarization direction is different from the light of the third polarization by 90 degrees. A combined wavelength band of the light of the third polarization and the light of the fourth polarization is a second wavelength band which is different from the first wavelength band. A reflecting element reflects the light of the first polarization. A first selective transmission element transmits the light of the first polarization and reflects the light of the second polarization based on the polarization direction of the light. A second selective transmission element transmits combined light of the light of the first polarization and the light of the second polarization, and reflects the light of the third polarization based on the wavelength band of the light. A third selective transmission element transmits the combined light of the light of the first polarization and the light of the second polarization based on the polarization of the wavelength band, transmits the light of the third polarization and reflects the light of the fourth polarization based on the polarization direction of the light. The light of the first polarization, the light of the second polarization and the light of the third polarization passing through the third selective transmission element, and the light of the fourth polarization reflected by the third selective transmission element proceed in the same direction.

A light source device according to the present invention includes a plurality of light source modules. Each light source modules includes a first light source that emits light of a first polarization, a second light source that emits light of a second polarization whose polarization direction is different from the light of the first polarization by 90 degrees, a reflecting element of a plate shape that reflects the light of the first polarization, and a selective transmission element of a plate shape that transmits the light of the first polarization and reflects the light of the second polarization based on the polarization direction of the light. In the light source module, an end portion of the reflecting element and an end portion of the selective transmission element are connected so that a surface of the reflecting element and a surface of the selective transmission element have an angle other than 180 degrees or 0 degree. The light of the first polarization is reflected by the surface of the reflecting element on a side whose angle is smaller than 180 degrees, is incident on the surface of the selective transmission element on a side whose angle is smaller than 180 degrees, and passes through the selective transmission element. The light of the second polarization is reflected by the surface of the selective transmission element on a side whose angle is larger than 180 degrees. The light of the first polarization passing through the selective transmission element and the light of the second polarization reflected by the surface of the selective transmission element are emitted as a light flux proceeding in the same direction. A plurality of light source modules are arranged so that the first light sources are disposed in the same direction with respect to the reflecting elements of the respective light source modules, and so that the second light sources are disposed in the same direction with respect to the selective transmission elements of the respective light source modules. The reflecting element and the selective transmission element of one of the plurality of light source modules are disposed at a shifted position with respect to the other of the plurality of light source modules toward a side where the first light source and the second light source of the one of the plurality of light source modules are disposed.

Effect of the Invention

According to the present invention, use efficiency of light emitted by a plurality of light sources can be enhanced with a simple configuration.

BRIEF DESCRIPTION OF DRAWINGS

FIGS. 12(A) and 12(B) are diagrams showing a distribution of a light flux incident on a condenser lens 4 of the light source device according to Embodiment 6 of the present invention.

FIG. 26(A) is a schematic view showing a positional relationship of light sources and color separation filters according to Embodiment 9 of the present invention, and FIG. 26(B) is a schematic view showing an incidence position of a light flux on a condenser lens.

FIG. 33 is a schematic view showing an incidence position of a light flux on a condenser lens according to Embodiment 11 of the present invention.

FIG. 35 is a schematic view showing an arrangement of a reflecting element a reflecting-transmitting element according to Embodiment 12 of the present invention.

FIGS. 36(A) and 36(B) are schematic views showing an incidence position of a light flux on a condenser lens according to Embodiment 12 of the present invention.

MODE FOR CARRYING OUT THE INVENTION

Embodiment 1

Figure 1:
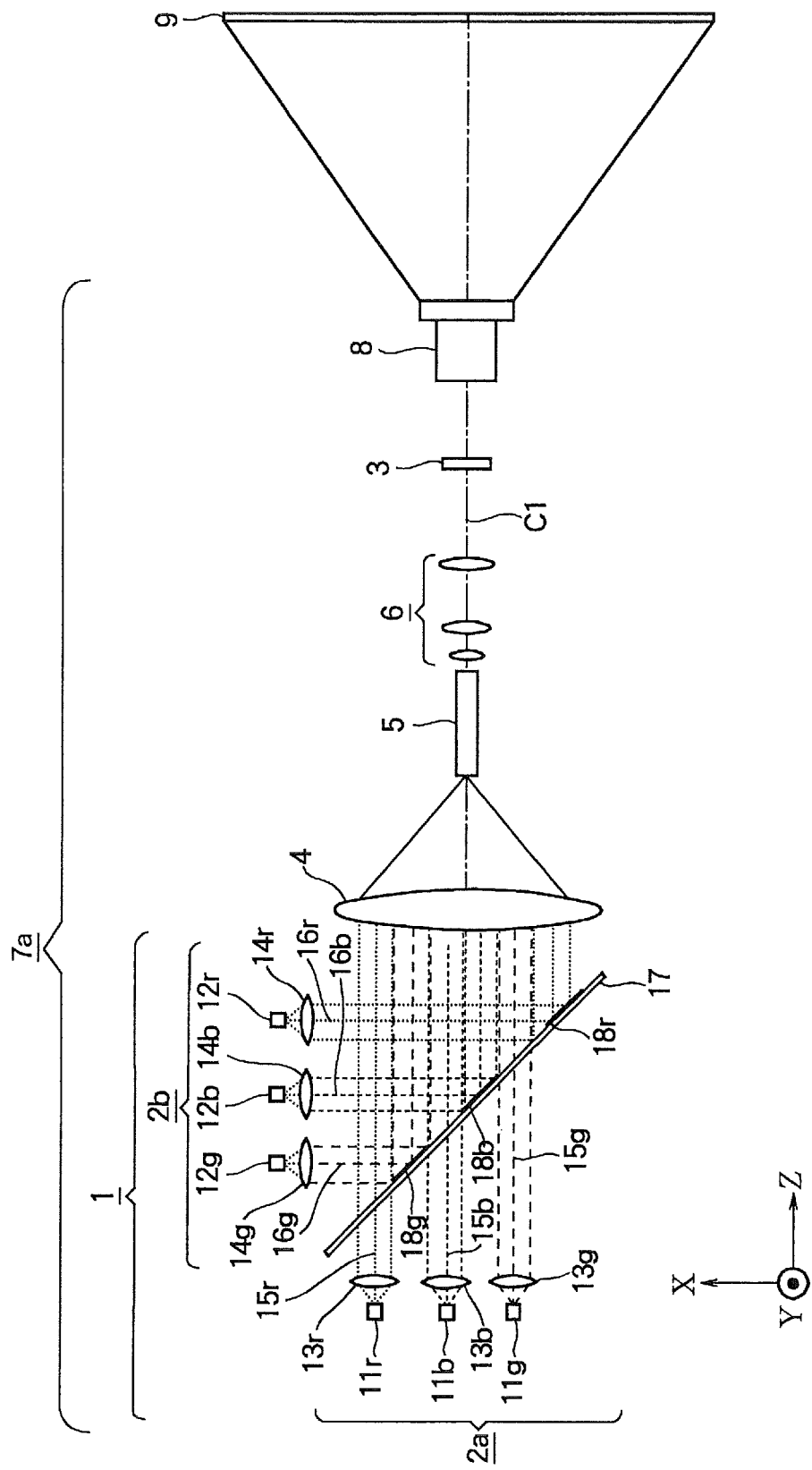
FIG. 1 is a view schematically showing a configuration of a projection-type display apparatus including a light source device according to Embodiment 1 of the present invention.

FIG. 1 is a view showing a configuration of a projection-type display apparatus including a light source device according to Embodiment 1 of the present invention. As shown in FIG. 1, the projection-type display apparatus 7a according to Embodiment 1 include a light source device 1, a condenser lens 4, a light intensity equalizing element 5, a relay lens group (i.e., a relay optical system) 6, an image display element (i.e., a light valve) 3, and a projection optical system 8. The light source device 1 emits a light flux. The condenser lens 4 condenses the light flux emitted by the light source device 1. The light intensity equalizing element 5 equalizes an intensity distribution of the light flux condensed by the condenser lens 4. The relay lens group (i.e., the relay optical system) 6 guides the light flux whose intensity is equalized by the light intensity equalizing element 5 to the image display element 3. The image display element (i.e., the light valve) 3 modulates the light flux from the relay lens group 6 based on input picture signal, and modulates the light flux into image light (i.e., picture light). The projection optical system 8 projects the image light on a screen 9 in an enlarged scale. In this regard, "image light (picture light)" is a light including image information.

Here, the condenser lens 4, the light intensity equalizing element 5, the relay lens group 6, the image display element 3 and the projection optical system 8 have a common (i.e., coaxial) optical axis C1. However, the image display element 3 and the projection optical system 8 may not be on the same axis. Hereinafter, in order to facilitate explanation of figures, explanation will be made with reference to coordinate axes including an X-axis, a Y-axis and a Z-axis that intersect perpendicularly with each other. A direction of the optical axis C1 is defined as a Z direction. A direction from the light source device 1 to the screen 9 is defined as +Z direction, and an opposite direction thereof is defined as −Z direction. A plane perpendicular to the Z direction is defined as an XY plane. In the XY plane, a direction parallel to a horizontal axis of the screen 9 is defined as an X direction. A left side when viewing the screen 9 from the light source device 1 is defined as a +X direction, and a right side when viewing the screen 9 from the light source device 1 is defined as a −X direction. A direction parallel to a vertical axis of the screen 9 is defined as a Y direction. An upward direction is defined as a +Y direction, and a downward direction is defined as a −Y direction. FIG. 1 corresponds to a view of the projection-type display apparatus 7a as seen from above (i.e., the +Y side).

The light source device 1 includes the first light source group 2a and the second light source group 2b. An optical axis of the first light source group 2a and an optical axis of the second light source group 2b are perpendicular to each other.

The first light source group 2a includes a plurality of light sources 11r, 11b and 11g having optical axes in the Z direction. Although the first light source 2a includes three light sources here, the number of the light sources is not limited to three. The light sources 11r, 11b and 11g are arranged in a column in the direction perpendicular to the optical axis C1. Although the light sources 11r, 11b and 11g are arranged in the X direction here, the arranging direction is not limited to the X direction. The light sources 11r, 11b and 11g may be arranged in the Y direction using a reflecting member such as a mirror.

In particular, the light source 11r that emits red light (i.e., light of a red wavelength band), the light source 11b that emits blue light (i.e., light of a blue wavelength band), and the light source 11g that emits green light (i.e., light of a green wavelength band) are arranged in this order from the +X side. The light sources 11r, 11b and 11g emit light in the +Z direction. That is, the light sources 11r, 11b and 11g emit light in the direction toward the condenser lens 4.

The second light source group 2b includes a plurality of light sources 12r, 12b and 12g which have an optical axis of the X direction. Although the second light source 2b includes three light sources here, the number of the light sources is not limited to three. The light sources 12r, 12b and 12g are arranged in a row in parallel with the optical axis C1. In other words, the light sources 12r, 12b and 12g are arranged in a row in the Z direction.

Particularly, the light source 12r that emits red light, the light source 12b that emits blue light, and the light source 12g that emits green light are arranged in this order from the +Z side. The light sources 12r, 12b and 12g emit light in the −X direction.

It is preferred that the light sources 11r, 11b, 11g, 12r, 12b and 12g are constituted by, for example, LDs (Laser Diodes) for example. This is because a directivity of a light flux of the LD is high, and there is an advantage that parallelization of light flux is easy. The "parallelization" is to make a light flux emitted by a light source into parallel light. However, LEDs (Light Emitting Diodes) or EL (Electro-Luminescence) elements may also be used. In the case where the LEDs or the EL elements are used, parallelizing lenses are prepared so as to correspond to the respective light sources. In the case where the LDs are used, parallelizing lenses are prepared so as to correspond to the respective light sources. However, the parallelizing lenses for the LDs are simpler. This is because the LDs have a higher directivity as compared with the LEDs or ELs, and the light emitted by the light source is close to parallel.

Parallelizing lenses 13r, 13b and 13g are provided on the emission sides of the respective light sources 11r, 11b and 11g. The parallelizing lenses 13r, 13b and 13g make the light fluxes emitted by the light sources 11r, 11b and 11g into parallel light fluxes. Similarly, parallelizing lenses 14r, 14b and 14g are provided on the emission sides of the respective light sources 12r, 12b and 12g. The parallelizing lenses 14r, 14b and 14g make the light fluxes emitted by the light sources 12r, 12b and 12g into parallel light fluxes. These parallelizing lenses 13r, 13b, 13g, 14r, 14b and 14g are collectively referred to as parallelizing lens groups (13, 14).

Furthermore, a transmitting-reflecting element 17 as a selective transmission element is provided at an intersecting position where parallel light fluxes 15r, 15b and 15g emitted by the light sources 11r, 11b and 11g and parallel light fluxes 16r, 16b and 16g emitted by the light sources 12r, 12b and 12g intersect each other. Here, the "intersecting position" is a position where the single transmitting-reflecting element 17 transmits the parallel light fluxes 15r, 15b and 15g, and reflects the parallel light fluxes 16r, 16b and 16g so as to make a single light flux. In other words, the "intersecting position" is a position where a single filter transmits one of two light fluxes, reflects the other of the light fluxes, and superimposes the respective light fluxes to form a single light flux. In other words, the "intersecting position" is a position where respective light fluxes are arranged and made into a single light flux. Details of the light source device 1 will be described later. Moreover, an "element" is each component whose function has a meaning with respect to an entire function of an apparatus. In other words, the "element" is each unit part as a component that plays an important role for the entire function.

The light flux emitted by the light source device 1 is condensed by the condenser lens 4 toward the light intensity equalizing element 5. The light intensity equalizing element 5 equalizes the light intensity of the incident light flux in a cross section of the light flux. To be "in cross section of the light flux" is to be in a plane that intersects perpendicularly with the optical axis C1. That is, the light intensity equalizing element 5 has function to reduce illumination unevenness.

Generally, the light intensity equalizing element 5 is made of transparent material such as glass or resin. The light intensity equalizing element 5 is constituted so that inner surfaces of side walls serve as total-reflecting surfaces. The light intensity equalizing element 5 is a pillar-shaped component having a polygonal section. For example, the light intensity equalizing element 5 is a polygonal columnar rod. Here, the "rod" is a stick-shaped member having no space inside thereof. Alternatively, the light intensity equalizing element 5 is formed of a tubular component having light reflecting surfaces (i.e., surface mirrors) inside thereof, and having a polygonal section. The "tubular component" is, for example, a polygonal pipe, for example.

When the light intensity equalizing element 5 is the polygonal columnar rod, the light flux incident on an incident end is reflected a plurality of times by total-reflecting action at interfaces between the transparent material and air, and is emitted from an exit end. When the light intensity equalizing element 5 is the polygonal columnar rod, the light flux incident on the incident end is reflected a plurality of times by reflecting action at inner reflecting surfaces, and is emitted from an exit end. If the light intensity equalizing element 5 has a suitable length in a proceeding direction of the light flux, superimposed irradiation of the vicinity of the exit end of the light intensity equalizing element 5 with the light reflected a plurality of times inside the light intensity equalizing element 5, and therefore substantially uniform intensity distribution is obtained. That is, the intensity distribution of the light emitted by the light intensity equalizing element 5 is more uniform as compared with the intensity distribution of the light incident thereon.

The light flux whose intensity is equalized by the light intensity equalizing element 5 is guided to the image display element 3 by the relay lens group 6 as the relay optical system. Although the relay lens group 6 shown in FIG. 1 includes three lenses, four or more lenses may also be used, or an aspheric lens may also be used. Moreover, it is also possible to guide the light flux to the image display element 3 using a curved mirror.

The image display element (i.e., the light valve) 3 may be either a reflection type or a transmission type. Particularly, the image display element 3 is constituted by, for example, a liquid crystal display element, a digital micro mirror device (DMD) or the like. In the projection-type display apparatus 7 using the light intensity equalizing element 5 as shown in FIG. 1, the polarization direction of the light fluxes that enter into the image display element 3 from the light intensity equalizing element 5 are not exactly the same, and therefore the digital micro mirror device is more preferable. The "light valve" is configured to control or adjust light. That is, the "light valve" is an optical element that controls the light from a light source and it outputs as a picture light.

Figure 2:
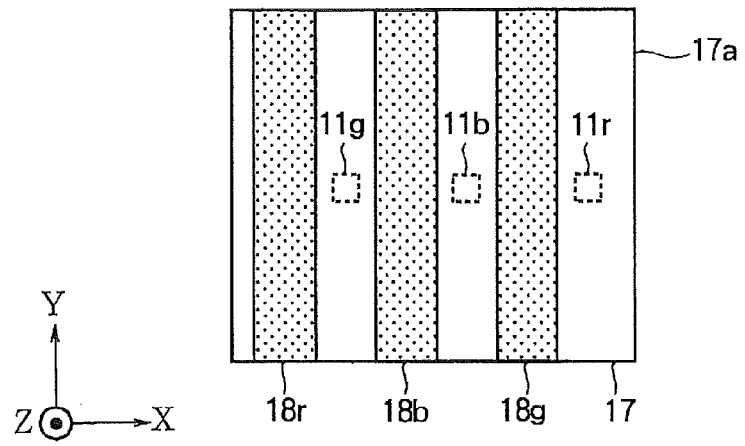
FIG. 2 is a view showing a transmitting-reflecting element according to Embodiment 1 of the present invention as seen from a condenser lens side.

Moreover, a configuration and a function of the light source device 1 will be described in detail. FIG. 2 is a view showing the transmitting-reflecting element 17 as seen from the condenser lens 4 side (i.e., the +Z side in FIG. 1). In FIG. 2, the light sources 11r, 11b and 11g of the first light source group 2a are illustrated with broken lines. The transmitting-reflecting element 17 is formed of a transparent plate 17a such as a glass substrate that transmits light.

The transmitting-reflecting element 17 include reflecting portions 18r, 18b and 18g. The reflecting portions 18r, 18b and 18g reflect the parallel light fluxes 16r, 16b and 16g emitted by the respective light sources 12r, 12b and 12g of the second light source group 2b shown in FIG. 1. That is, the reflecting portion 18r reflects the parallel light flux 16r. The reflecting portion 18b reflects the parallel light flux 16b. The reflecting portion 18g reflects the parallel light flux 16g.

The reflecting portions 18r, 18b and 18g are, for example, reflecting films. The reflecting film is formed of dielectric multilayer film, silver or the like. The reflecting portions 18r, 18b and 18g need only be formed of materials that respectively reflect the parallel light fluxes 16r, 16b and 16g emitted by the light sources 12r, 12b and 12g. For example, the reflecting portion 18r may be formed of material that reflects only red light.

The transmitting-reflecting element 17 has inclination of 45 degrees with respect to the X direction and the Z direction. The transmitting-reflecting element 17 is arranged so that the light emitted from the light sources 12r, 12b and 12g of the second light source group 2b and reflected by the reflecting portions 18r, 18b and 18g proceeds to the condenser lens 4.

With such a configuration, the parallel light fluxes 15r, 15b and 15g that are emitted by the light sources 11r, 11b and 11g of the first light source group 2a and pass through transparent portions of the transmitting-reflecting element 17 and the parallel light fluxes 16r, 16b and 16g that are emitted by the light sources 12r, 12b and 12g of the second light source group 2b and are reflected by the reflecting portions 18r, 18b and 18g of the transmitting-reflecting element 17 are incident on the condenser lens 4. That is, the parallel light fluxes 15r, 15b and 15g are emitted by the light sources 11r, 11b and 11g of the first light source group 2a, and pass through the transparent portions of the transmitting-reflecting element 17. The parallel light fluxes 16r, 16b and 16g are emitted by the light sources 12r, 12b and 12g of the second light source group 2b, and are reflected by the reflecting portions 18r, 18b and 18g of the transmitting-reflecting element 17. Then, the parallel light fluxes 15r, 15b and 15g and the parallel light fluxes 16r, 16b and 16g are incident on the condenser lens 4. The transparent portions of the transmitting-reflecting element 17 are referred to as transmitting portions.

The light fluxes that are incident on the condenser lens 4 from the transmitting-reflecting element 17 are arranged in the order of the light flux 15r, the light flux 16g, the light flux 15b, the light flux 16b, the light flux 15g and the light flux 16r from above in FIG. 1 (i.e., the +X side). These parallel light fluxes are arranged in the X direction and are incident on the condenser lens 4 without leaving a gap, and therefore condensing efficiency by the condenser lens 4 can be enhanced.

Moreover, if the light flux 15r, the light flux 16g, the light flux 15b, the light flux 16b, the light flux 15g, and the light flux 16r are expressed as colors of red, green, blue, blue, green and red. The ""color" is a wavelength band. That is, the light flux with a shorter wavelength incident on a position closer to the optical axis (i.e., the optical axis C1) of the condenser lens 4.

Generally, an influence of a spherical aberration becomes large as an effective outer diameter of the condenser lens 4 becomes larger. For this reason, the light flux incident on a position farther from the optical axis C1 of the condenser lens 4 is condensed closer to the condenser lens 4 in the Z direction. A refractive index of a lens depends on a wavelength. For this reason, with a configuration in which the blue light of a short wavelength having a relatively large refractive index is incident on the vicinity of the optical axis C1, and the red light of a long wavelength having a relatively small refractive index is incident on the farthest position from the optical axis C1, the condensing positions of the light fluxes of the respective colors can be made nearly the same as each other. Further, the condensing efficiency by the condenser lens 4 can be enhanced. Here, the "condensing efficiency" is an efficiency at which the light is condensed toward the light intensity equalizing element 5.

Figure 3:
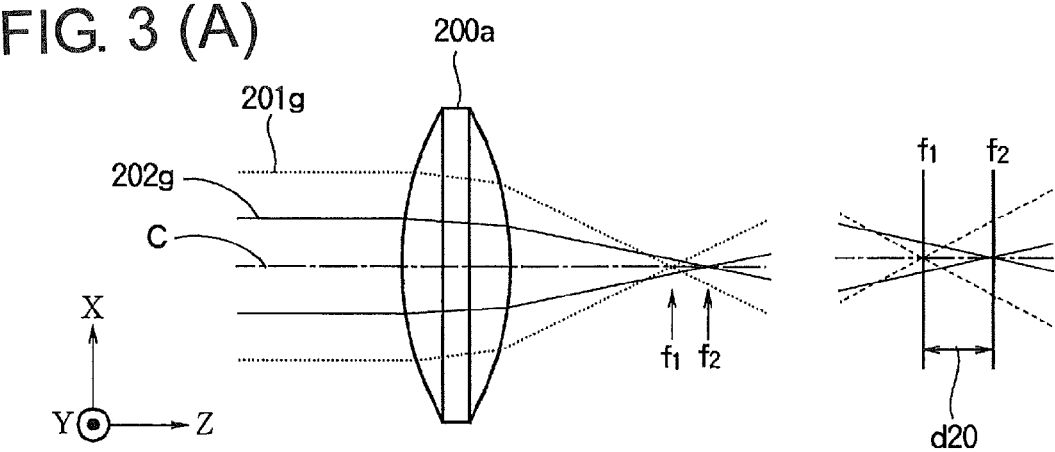
FIGS. 3(A) and 3(B) are schematic views for illustrating a spherical aberration.
Figure 3:
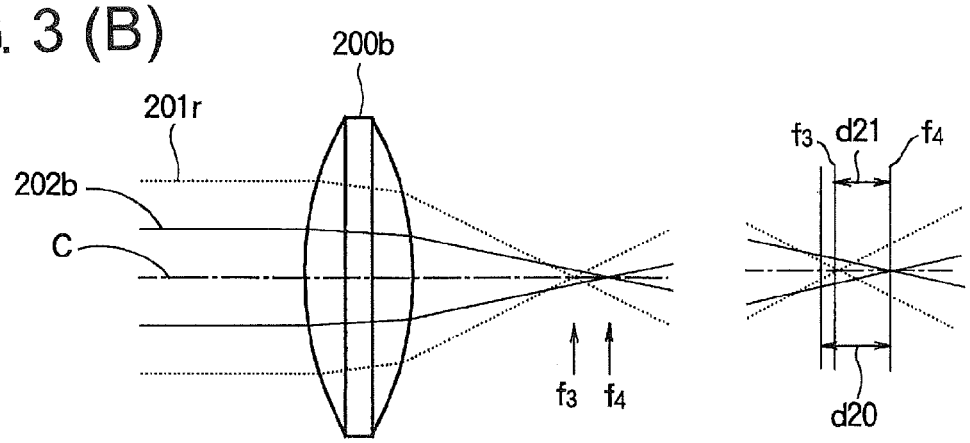

FIG. 3(A) includes a schematic view and an enlarged view for illustrating the above-described spherical aberration. A green light ray 201g incident on a position farther from an optical axis C of a lens 200a is condensed in a condensing position f1 on a front side with respect to a green light ray 202g incident on a position closer to the optical axis C. The "front side" is a "side closer to the condenser lens 200a", i.e., −Z direction. This indicates that a change in incident position in the X position causes a change in condensing position in the Z direction. Here, the "incident position" indicates a distance from the optical axis C to the light incident on the lens 200a. In FIG. 3(A), the condensing positions of the light ray 201g and the light ray 202g are expressed as f1 and f2. An interval between the condensing positions f1 and f2 is set to d20.

In contrast, in FIG. 3(B), a red light ray 201r is incident on a position farther from the optical axis C of a lens 200b. A blue light ray 202b is incident on a position closer to the optical axis C of the lens 200b. As shown in the enlarged view in FIG. 3(B), an interval d21 is an interval between a condensing position f4 of the blue light ray 202b and a condensing position f3 of the red light ray 201r. The interval d20 is an interval between the condensing positions f1 and f2 of the green light rays 201g and 202g shown in FIG. 3(A). Although an influence of the spherical aberration remains, the interval d21 is narrower than the interval d20. Thus, by lengthening the wavelength of the light ray incident on the position farther from the optical axis C of the lens 200b, and by shortening the wavelength of the light ray in the vicinity of the optical axis C, the influence of the spherical aberration can be reduced, and the condensing efficiency by the lens 200b can be enhanced. Here, the light ray having the long wavelength is red light. The light having the short wavelength is blue light.

Referring back to FIG. 1, the first light source group 2a (i.e., the light sources 11r, 11b and 11g) and the second light source group 2b (i.e., the light sources 12r, 12b and 12g) need be arranged so as to leave intervals between the adjacent light sources in order to ensure cooling efficiency of each light source group. If there are such intervals between the light sources, gaps may be formed between the light fluxes emitted by the respective light sources, and therefore the light efficiency may be reduced. This is because as the light flux becomes large, the optical element such as a lens become large.

Therefore, in this Embodiment 1, the gap between the light fluxes emitted by the light sources 11r, 11b and 11g of the first light source group 2a are filled with the light fluxes emitted by the light sources 12r, 12b and 12g of the second light source group 2b. With such a configuration, the light fluxes densely reach the condenser lens 4 with reduced gaps, and therefore light use efficiency can be enhanced. Here, to "enhance light use efficiency" is to increase brightness of a light flux, i.e., to obtain a high brightness. The "brightness" is luminance per unit area, i.e., brightness per unit area of a section of the light flux.

As described above, in this Embodiment 1, the transmitting-reflecting element 17 combines the light fluxes of the first light source group 2a and the second light source group 2b, and guides the combined light fluxes to the condenser lens 4. Therefore, high brightness can be achieved with a simple configuration. Moreover, light use efficiency can be enhanced. Moreover, it is not necessary to adjust a lot of mirrors as in a light source device disclosed by Patent Document 1, and therefore a complicated adjustment operation can be eliminated.

Particularly, the transmitting-reflecting element 17 transmits the light fluxes 15r, 15b and 15g emitted by the respective light sources of the first light source group 2a and reflects the light fluxes 16r, 16b and 16g emitted by the respective light sources of the second light source group 2b. Therefore, the light fluxes emitted by the respective light sources of both of the light source groups 2a and 2b can be combined without leaving gaps. Further, the brightness can be enhanced. Moreover, intervals between the light sources 11r, 11b, 11g, 12r, 12b and 12g can be sufficiently ensured. Therefore, a cooling efficiency can also be enhanced. Moreover, it becomes easy to arrange electronic components for driving the light sources 11r, 11b, 11g, 12r, 12b and 12g. Moreover, it becomes easy to arrange holding members for holding the light sources 11r, 11b, 11g, 12r, 12b and 12g.

Moreover, in this Embodiment 1, the light flux having the shorter wavelength is incident on the position closer to the optical axis of the condenser lens 4. Therefore, the influence of spherical aberration can be reduced, and the condensing efficiency by the condenser lens 4 can be enhanced.

Moreover, the transmitting-reflecting element 17 is obtained by forming the reflecting film on the transparent plate 17a. Therefore, the reflecting film can formed in various shapes. Here, the portion where the reflecting film is provided corresponds to the reflecting portion.

In this regard, in this Embodiment 1, the transmitting-reflecting element 17 is oriented at the angle of 45 degrees with respect to the X direction and the Z direction. However, this angle is not limited to 45 degrees, but can be any angle as long as the light fluxes emitted by the respective light sources of the first light source group 2a and the light fluxes emitted by the respective light sources of the second light source group 2b can be combined.

In this regard, if the optical axes of the light sources 11r, 11b and 11g of the first light source group 2a and the optical axes of the light sources 12r 12b and 12g of the second light source group 2b intersect perpendicularly with each other, it is preferred to orient the transmitting-reflecting element 17 at the angle of 45 degrees with respect to the X direction and the Z direction. This is because the light fluxes emitted by the respective light sources of the first light source group 2a and the light fluxes emitted by the respective light sources of the second light source group 2b can be combined with a simplest device configuration.

Moreover, the optical axes of the light sources 11r, 11b and 11g of the first light source group 2a and the optical axes of the light sources 12r 12b and 12g of the second light source group 2b intersect perpendicularly with each other. However, these optical axes do not necessarily intersect perpendicularly with each other. That is, the light sources may be arranged in any way as long as the light fluxes emitted by the respective light sources of the first light source group 2a and passing through the transmitting-reflecting element 17, and the light fluxes emitted by the respective light sources of the second light source group 2b and reflected by the transmitting-reflecting element 17 proceed toward the condenser lens 4.

In this regard, in this Embodiment 1, the light source device 1 emits the light fluxes of 3 colors. However, the same effect can be obtained even if the light source device emits a monochromatic light flux. The "monochromatic light flux" is emitted in the case where, for example, the first light source group 2a and the second light source group 2b have only red light sources. In this case, it is necessary to combine light from a red light source device, light from a green light source device, and light from a blue light source device. In this case, for example, a color combination mirror may be arranged on an emission side of the light source device 1 so as to combine the light fluxes of the respective colors.

Moreover, the light sources 11r, 11b and 11g are arranged in a row and three columns, and the light sources 12r, 12b and 12g are arranged in a row and in three columns. However, the arrangements are not limited to such an example. For example, the light sources can be arranged in a plurality of rows and plurality of columns. Here, the "row" is a line of the X direction, and the "column" is a line of the Y direction. That is, as shown in FIG. 2, the light sources 11r, 11b and 11g are arranged in a row in the X direction and in three columns in the Y direction.

Moreover, in this Embodiment 1, the light sources 11r, 11b and 11g are arranged at equal intervals, and the light sources 12r, 12b and 12g are arranged at equal intervals. However, the intervals may be changed according to sizes of the light sources. For example, if the length of the light source 11r in the arranging direction (i.e., the X direction) is longer than other light sources 11b and 11g, the interval between the light sources 11b and 11g may be made so as to correspond to the length of the light source 11r.

Embodiment 2

Embodiment 2 is different from Embodiment 1 in arrangement of the light sources of a first light source group 20a and a second light source group 20b and arrangement of transmitting portions and reflecting portions of a transmitting-reflecting element 27. In this Embodiment 2, the components on the emission side of the light source device are the same as the components described in Embodiment 1. The components on the emission side of the light source device are components from the condenser lens 4 to the screen 9 shown in FIG. 1. That is, the components on the emission side of the light source device are the condenser lens 4, the light intensity equalizing element 5, the relay lens group 6, the image display element 3, the projection optical system 8 and the screen 9.

Figure 4:
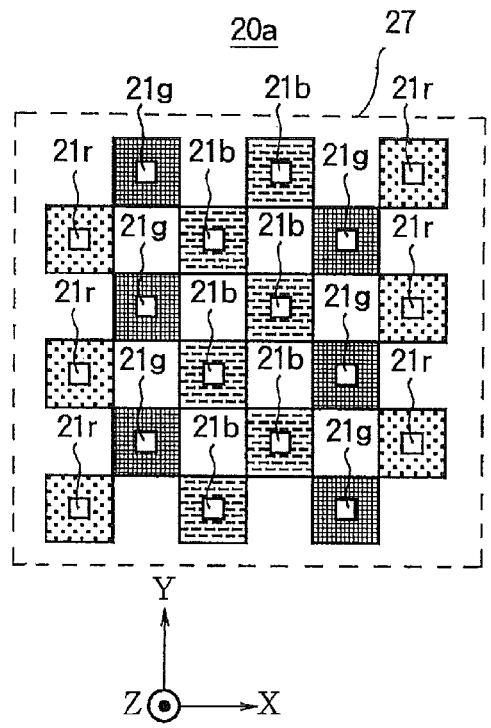
FIG. 4(A) is a view showing a first light source group.
FIG. 4(B) is a view showing a second light source group.
FIG. 4(C) is a view showing a state where these light source groups are combined according to Embodiment 1 of the present invention.
Figure 4:
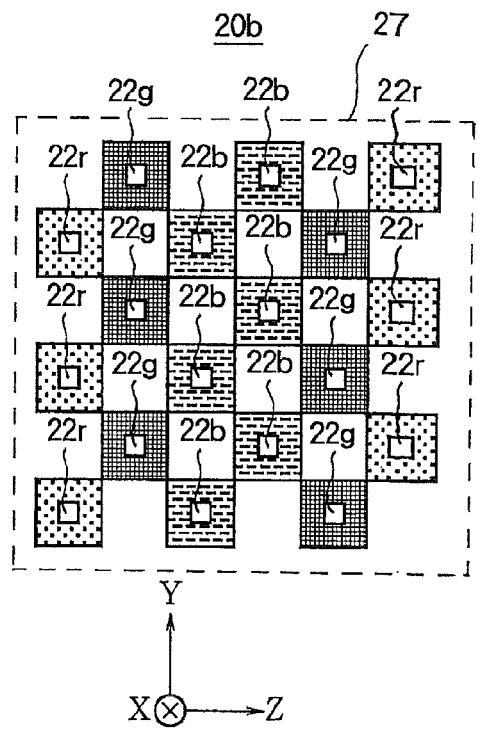
Figure 4:
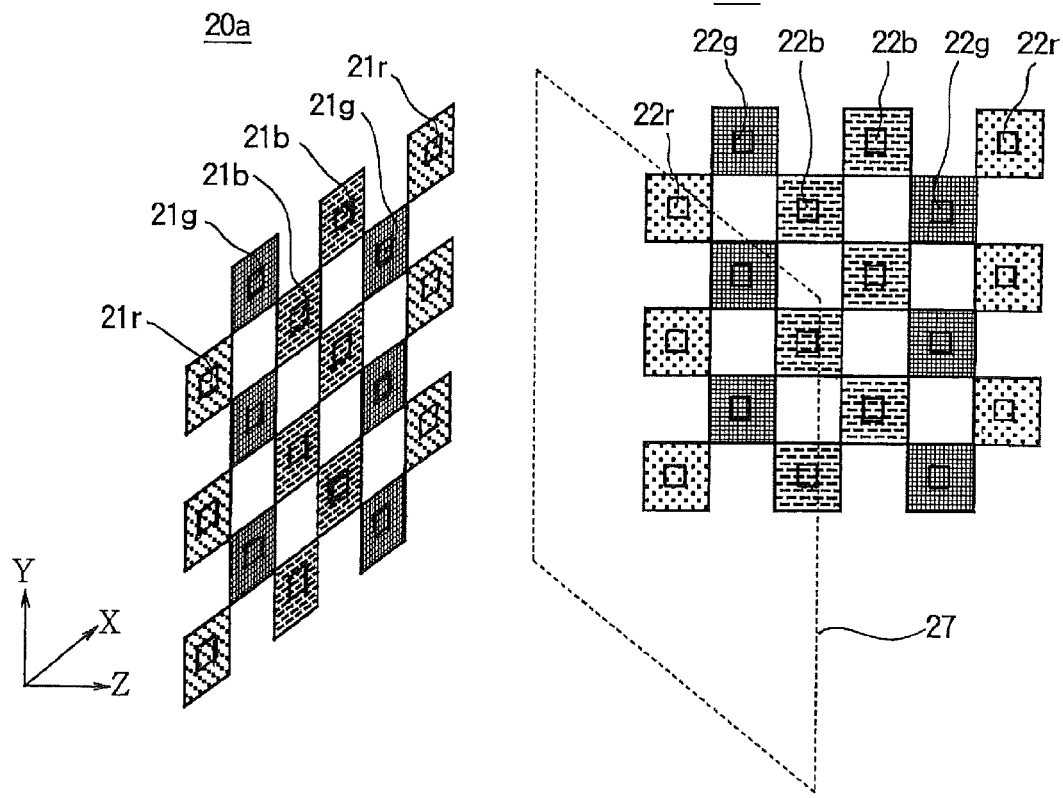

FIG. 4 is a view showing positions of respective light sources 21r, 21b, 21g, 22r, 22b and 22g so as to be superimposed on regions of the transmitting-reflecting element 27 irradiated with the respective parallel light fluxes 15r, 15b, 15g, 16r, 16b and 16g.

In FIG. 4, the transmitting-reflecting element 27 is illustrated as a square using a broken line. Regions irradiated with the parallel light fluxes 15r and 16r are illustrated by patterns in which dots are interspersed in square frames. Hereinafter, the pattern in which dots are interspersed is referred to as a "dot pattern". Regions irradiated with the parallel light fluxes 15g and 16g are illustrated by patterns in which vertical lines and horizontal lines intersect perpendicularly with each other in square frames. Hereinafter, the pattern in which intersect perpendicularly with each other is referred to as a "grid pattern". Regions irradiated with the parallel light fluxes 15b and 16b are illustrated by patterns in which horizontal dashed lines are arranged in square frames. Hereinafter, the pattern in which horizontal dashed lines are arranged is referred to as a "broken stripe pattern".

FIG. 4(A) is a view showing regions of the transmitting-reflecting element 27 irradiated with the parallel light fluxes 15r, 15b and 15g emitted by the light sources 21r, 21b and 21g of the first light source group 20a. FIG. 4(B) is a view showing regions of the transmitting-reflecting element 27 irradiated with the parallel light fluxes 16r, 16b and 16g emitted by the light sources 22r, 22b and 22g of the second light source group 20b. FIG. 4(A) is a view as seen from the +Z direction side. FIG. 4(B) is a view as seen from −X direction side.

In FIG. 4(A) and FIG. 4(B), positions of the light sources 21r, 21b and 21g of the first light source group 20a and positions of the light sources 22r, 22b and 22g of the second light source group 20b are illustrated by squares with black frames. Although the light sources 21r, 21b, 21g, 22r, 22b and 22g are arranged on a back side of the transmitting-reflecting element 27, the light sources 21r, 21b, 21g, 22r, 22b and 22g are illustrated by solid lines in FIG. 4 for facilitating description. The back side is −Z direction side in FIG. 4(A), and is the +X direction side in FIG. 4(B).

As shown in FIG. 4(A), the light sources 21r, 21b and 21g of the first light source group 20a are arranged in six rows and six columns in a plane parallel to the XY plane. Here, the "six rows and six columns" indicates that there are six lines (i.e., rows) in the Y direction and six lines (i.e., columns) in the X direction as shown in FIG. 4(A). As seen from the +Z direction, in the most right hand column (i.e., the +X side), the light sources 21r that emit red light are arranged on the first row, the third row and the fifth row from above (i.e., the +Y side). In the second column from the right, the light sources 21g that emit green light are arranged on the second row, the fourth row and the sixth row from above. In the third column from the right, the light sources 21b that emit blue light are arranged on the first row, the third row and the fifth row from above.

Similarly, in the fourth column from the right, the light sources 21b that emit blue light are arranged on the second row, the fourth row and the sixth row from above. In the fifth column from the right, the light sources 21g that emit green light are arranged on the first row, the third row and the fifth row from above. In the most left hand column (i.e., the −X side), the light sources 21r that emit red light are arranged on the second row, the fourth row and the sixth row from above.

Optical axes of the light sources 21r, 21b and 21g are directed in the Z direction. Moreover, the parallelizing lenses 13r, 13b and 13g (omitted in FIG. 4) described in Embodiment 1 are provided on emission sides of the light sources 21r, 21b and 21g. The number of the parallelizing lenses is six for the light sources of each color, and the total number of the parallelizing lenses is 18.

As shown in FIG. 4(B), the light sources 22r, 22b and 22g of the second light source group 20b are arranged in six rows and six columns in a plane parallel to the YZ plane. Here, "six rows and six columns" indicates that there are six lines (i.e., rows) in the Y direction and six lines (i.e., columns) in the Z direction as shown in FIG. 4(B). As seen from the −X direction, in the most right hand column (i.e., the +Z side), the light sources 22r that emit red light are arranged on the first row, the third row and the fifth row from above (i.e., the +Y side). In the second column from the right, the light sources 22g that emit green light are arranged on the second row, the fourth row and the sixth row from above. In the third column from the right, the light sources 22b that emit blue light are arranged on the first row, the third row and the fifth row from above.

Similarly, in the fourth column from the right, the light sources 22b that emit blue light are arranged on the second row, the fourth row and the sixth row from above. In the fifth column from the right, the light sources 22g that emit green light are arranged on the first row, the third row and the fifth row from above. In the most left hand column (i.e., the −Z side), the light sources 22r that emit red light are arranged on the second row, the fourth row and the sixth row from above.

Optical axes of the light sources 22r, 22b and 22g are directed in the X direction. Moreover, the parallelizing lenses 13r, 13b and 13g (omitted in FIG. 4) described in Embodiment 1 are provided on emission sides of the light sources 22r, 22b and 22g. The number of the parallelizing lenses is six for the light sources of each color, and the total number of the parallelizing lenses is 18.

FIG. 4(C) is a perspective view showing a state where the light source groups 20a and 20b are combined. That is, FIG. 4(C) is a view in which regions of the transmitting-reflecting element 27 irradiated by the light sources 21r, 21b, 21g, 22r, 22b and 22g are projected on a plane parallel to the XY plane and a plane parallel to the YZ plane. The regions irradiated by the first light source group 20a are projected on the plane parallel to the XY plane. The regions irradiated by the second light source group 20b are projected on the plane parallel to the YZ side. The transmitting-reflecting element 27 is illustrated by a square using a broken line. The first light source group 20a having optical axes in the Z direction, and the second light source group 20b having optical axes in the X direction are arranged so as to form an angle of 90 degrees.

The transmitting-reflecting element 27 as a selective transmission element is provided at an intersecting position where the parallel light fluxes 15r, 15b and 15g that are parallelized after being emitted by the first light source group 20a (i.e., the light sources 21r, 21b and 21g) and the parallel light fluxes 16r, 16b and 16g that are parallelized after being emitted by the second light source group 20b (i.e., the light sources 22r, 22b and 22g) intersect each other. Here, the "intersecting position" is a position where the single transmitting-reflecting element 27 transmits the parallel light fluxes 15r, 15b and 15g, and reflects the parallel light fluxes 16r, 16b and 16g so as to form a single light flux.

Figure 5:
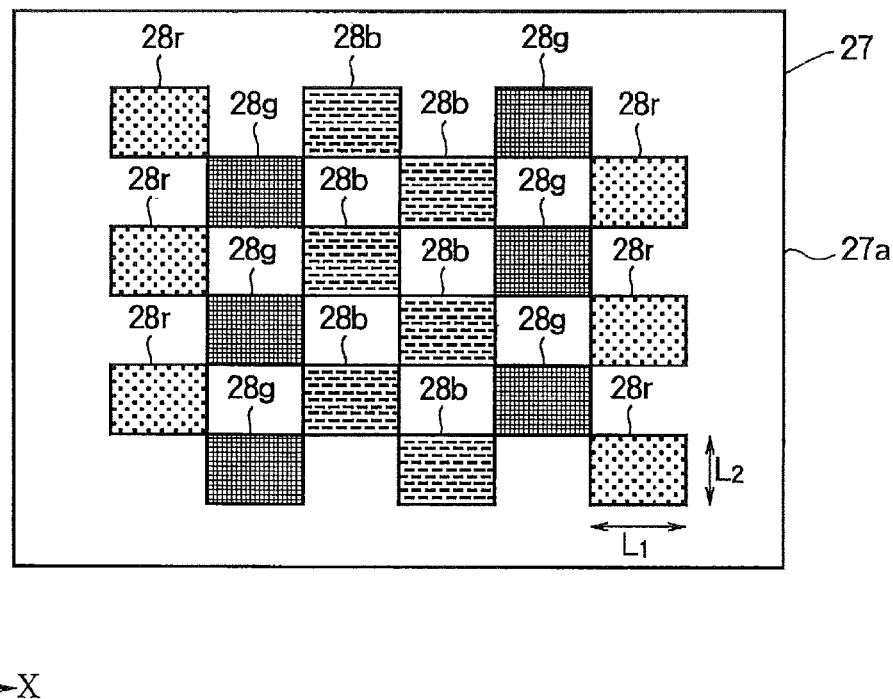
FIG. 5 is a view showing a transmitting-reflecting element according to Embodiment 2 of the present invention as seen from a condenser lens side.

FIG. 5 is a front view showing the transmitting-reflecting element 27. That is, FIG. 5 is a view of the transmitting-reflecting element 27 seen from a direction rotated about a Y axis by 45 degrees from the +X direction as seen in the +Y direction. Similarly, FIG. 5 is a view of the transmitting-reflecting element 27 seen from a direction rotated by 45 degrees from the +Z direction as seen in the +Y direction. For this reason, in coordinates shown in FIG. 5, a left side indicates the +Z direction, and a right side indicates the +X direction. In practice, an X axis and a Z axis indicate directions inclined by 45 degrees toward a near side of the page.

The transmitting-reflecting element 27 includes reflecting portions 28r, 28b and 28g on a transparent plate such as a glass substrate or the like. The reflecting portions 28r, 28b and 28g reflect the light fluxes emitted by the second light source group 20b (i.e., the light sources 22r, 22b and 22g). In FIG. 5, the reflecting portions 28r are illustrated by the "dot patterns". The reflecting portions 28g are illustrated by the "grid patterns". The reflecting portions 28b are illustrated by the "broken stripe patterns".

The transmitting-reflecting element 27 is inclined at an angle of 45 degrees with respect to the X direction and the Z direction. Therefore, a length L1 of each of the reflecting portions 28r, 28b and 28g in the X direction is root-2 times a length L2 in the Y direction.

Portions of the transmitting-reflecting element 27 other than the reflecting portions 28r and 28b are transmitting portions that transmits the parallel light fluxes 15r, 15b and 15g that are emitted by the light sources 21r, 21b and 21g of the first light source group 20a and are parallelized.

With such a configuration, the transmitting-reflecting element 27 transmits the parallel light fluxes 15r, 15b and 15g emitted by the first light source group 20a (i.e., the light sources 21r, 21b and 21g), reflects the parallel light fluxes 16r, 16b and 16g emitted by the second light source group 20b (i.e., the light sources 22r, 22b and 22g), and guides the light fluxes to the condenser lens 4 (FIG. 1).

As was described in Embodiment 1, the respective light sources of the light source groups 20a and 20b need be arranged with certain intervals for cooling. Therefore, by using the transmitting-reflecting element 27 having the transmitting portions and the reflecting portions 28r, 28b and 28g that are alternately arranged, the light fluxes emitted by the respective light sources can be combined without leaving a gap, and therefore a high intensity can be obtained.

Figure 6:
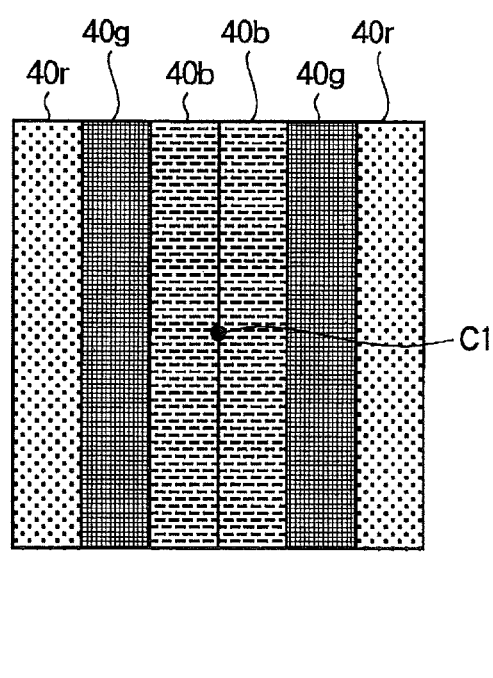
FIG. 6 is a schematic view showing a section of a light flux emitted by a light source device according to Embodiment 2 of the present invention.

FIG. 6 is a schematic view showing the section (i.e., the XY section) of the light flux emitted by the light source device 1. The light flux emitted by the light source device 1 is a combination of the light fluxes reflected by the reflecting portions 28r, 28b and 28g of the transmitting-reflecting element 27 and the light fluxes passing through the transmitting portions of the transmitting-reflecting element 27. Therefore, as shown in FIG. 6, six light flux 40r, the light flux 40g, the light flux 40b, the light flux 40b, the light flux 40g, and the light flux 40r, each having a sectional shape longer in the Y direction and shorter in the X direction, are densely arranged from −X direction toward the +X direction without leaving gaps. In FIG. 6, the "dot patterns" indicate the light fluxes 40r. The "grid patterns" indicate the light fluxes 40g. The "broken stripe patterns" indicate the light fluxes 40b. Moreover, in the section of the light flux shown in FIG. 6, the length in the X direction and the length in the Y direction are approximately the same. In other words, a ratio of the length in the X direction to the length in the Y direction is approximately 1. Here, the light flux is illustrated as a square for convenience sake. However, in practice, the light flux has an almost circular shape. The "for convenience sake" means that it is convenient for description.

Moreover, the light fluxes shown in FIG. 6 are arranged so that the blue light fluxes 40b are closest to the optical axis C1, and the red light flux 40r are farthest from the optical axis C1. Therefore, as was described in Embodiment 1, the condensing efficiency by the condenser lens 4 can be enhanced. Here, the "condensing efficiency" is an efficiency at which the light is condensed toward the light intensity equalizing element 5.

In this Embodiment 2, the light source groups 20a and 20b arranged as shown in FIG. 4(A) and (B) are used. However, the light sources are not limited to such arrangements. That is, when the light fluxes are densely arranged with reduced gaps in the section of the light flux emitted by the transmitting-reflecting element 27, light use efficiency can be enhanced. For example, the red light sources light may be provided in the vicinity of a periphery, and the blue light source may be provided in the vicinity of the center.

As described above, according to this Embodiment 2, even when the light sources are arranged in a plurality of rows and a plurality of columns, the light fluxes emitted by the respective light sources of the first light source group 20a and the second light source group 20b can be combined by the transmitting-reflecting element 27 without leaving gaps. Therefore, high brightness can be achieved. Moreover, light use efficiency can be enhanced. Moreover, it is not necessary to adjust a lot of mirrors as in the light source device disclosed by Patent Document 1, and therefore the complicated adjustment operation can be eliminated.

Moreover, by making the length of the light flux emitted by the light source device 1 in the X direction and the Y direction the same as each other as shown in FIG. 6, the condensing efficiency to the light intensity equalizing element 5 can be enhanced. That is, in Embodiment 1, the light flux emitted by the light source device 1 has the length in the X direction and the length in the Y direction which are different from each other. However, in Embodiment 2, the length of the light flux in the X direction and the length of the light flux in the Y direction are nearly the same as each other. Therefore, the light use efficiency is enhanced. For example, when the light sources are arranged in six rows and six columns, the light use efficiency becomes higher than when the light sources are arranged in four rows and nine columns. Here, the "nearly the same" indicates that the length in the X direction and the length in the Y direction may not be exactly the same as each other since, for example, the LD has different divergence angles in a fast axis direction and in a slow axis direction.

In this regard, in this Embodiment 2, the case where the light source device 1 emits the light fluxes of 3 colors. However, the same effect can be obtained even in the case where the light source device 1 emits a monochromatic light flux. In this case, three light sources are provided. A first light source device emits a red light flux, a second light source device emits a green light flux, and a third light source device emits a blue light flux. In this case, for example, a color combination mirror may be arranged on an emission side of the light source device 1 so as to combine the light fluxes of the respective colors.

Moreover, in this Embodiment 2, the light sources 21r, 21b and 21g of the first light source group 20a and the light sources 22r, 22b and 22g of the second light source group 20b are arranged in the planes which are perpendicularly arranged with each other. The light sources 21r, 21b and 21g of the first light source group 20a are arranged in the XY plane. The light sources 22r, 22b and 22g of the second light source group 20b are arranged in the YZ plane. However, the light sources may be arranged in any way as long as the light fluxes emitted by light source groups 20a and 20b are combined by the transmitting-reflecting element 27.

Embodiment 3

Figure 7:
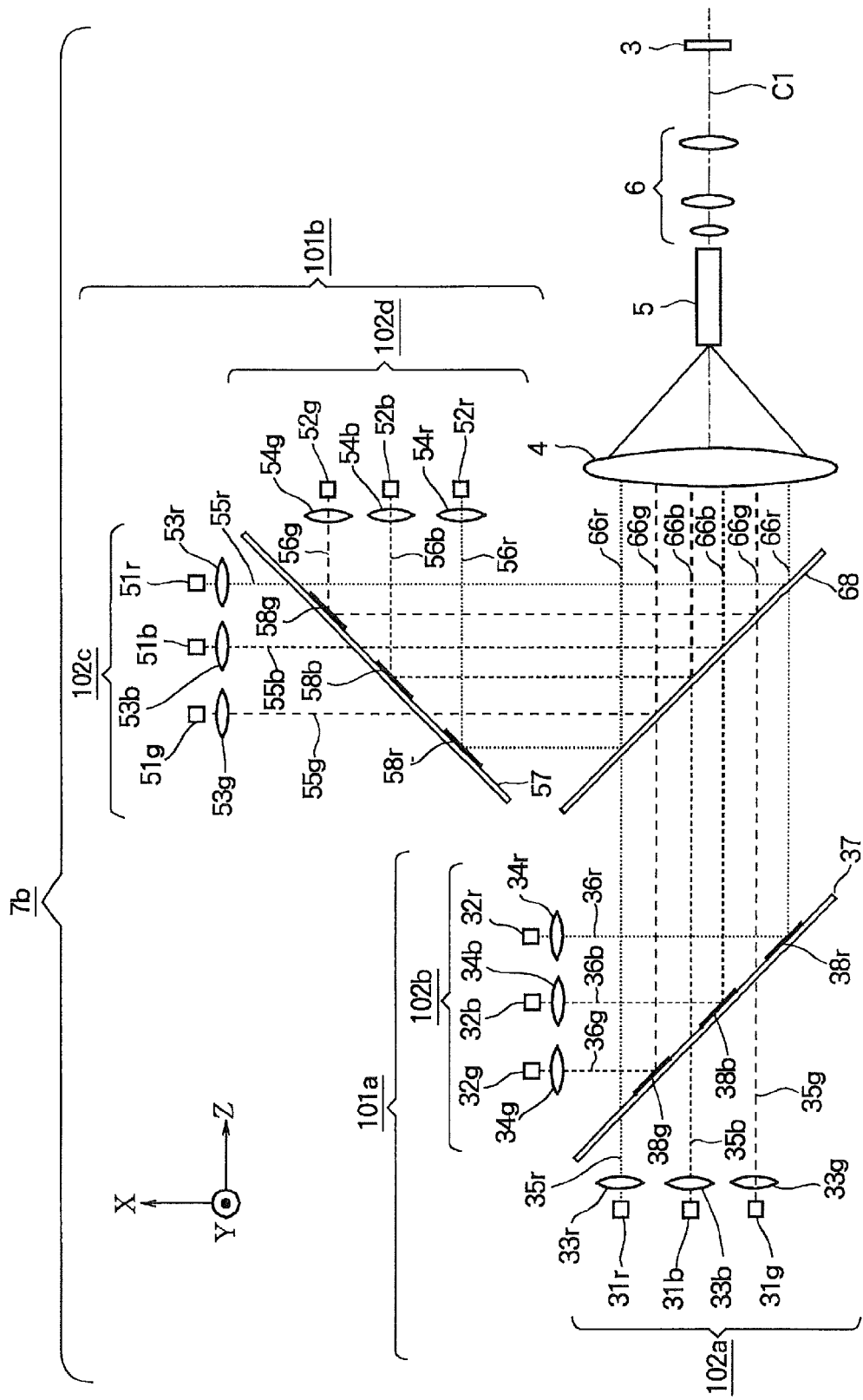
FIG. 7 is a view showing a configuration of a projection-type display apparatus including a light source device according to Embodiment 3 of the present invention.

FIG. 7 is a configuration view showing a configuration of a projection-type display apparatus 7b including a light source device according to Embodiment 3 of the present invention. The light source device according to this Embodiment 3 includes two light source units 101a and 101b, and is configured to combine light fluxes emitted by the two light source units 101a and 101b using a polarization separation element 68. Here, the "light source unit" itself may constitute the light source device 1 as in Embodiment. When a plurality of light source devices are provided for increasing an amount of light, each of the light source devices may be referred to as the light source unit. That is, in Embodiment 3, the light source device 1 described in Embodiment 1 or 2 is described as the light source units 101a and 101b. In the projection-type display apparatus 7b, components on the emission side of the light source device are the same as those of Embodiment 1. The components on the emission side of the light source device are the condenser lens 4, the light intensity equalizing element 5, the relay lens group 6, the image display element 3, the projection optical system 8 and the screen 9. In this regard, the projection optical system 8 and the screen 9 shown in FIG. 1 are omitted in the figure. The "polarization" is light with a vibrating surface in a certain direction. The "polarization separation element" is an element that reflects a part of incident light and transmits a part of the incident light according to a polarization direction.

The first light source unit 101a includes light source groups 102a and 102b. The light source group 102a have optical axes in the Z direction. Moreover, the light source group 102a includes a plurality of light sources 31r, 31b and 31g arranged in the X direction. In FIG. 7, three light sources 31r, 31b and 31g are shown. Moreover, the light source 31r that emits red light, the light source 31b that emits blue light, and the light source 31g that emits green light are arranged in this order from the +X side. The light source group 102a corresponds to the first light source group.

The light source group 102b includes optical axes in the X direction. Moreover, the light source group 102b includes a plurality of light sources 32r, 32b and 32g arranged in the Z direction. In FIG. 7, three light sources 32r, 32b and 32g are shown. Moreover, the light source 32r that emits red light, the light source 32b that emits blue light, and the light source 32g that emits green light are arranged in this order from the +Z side. The light source group 102b corresponds to the second light source group.

The light sources 31r, 31b, 31g, 32r, 32b and 32g emit the light fluxes having specific polarizations. The "specific polarization" is, for example, P-polarization and S-polarization. For example, when the light sources 31r, 31b, 31g, 32r and 32b and 32g emit light of the P-polarization, the light flux reaching the polarization separation element 68 is the light of the P-polarization. In this regard, it is preferred to use LDs capable of emitting light fluxes with aligned polarizations as the light sources 31r, 31b, 31g, 32r, 32b and 32g.

The parallelizing lenses 33r, 33b and 33g are provided on the emission sides of the respective light sources 31r, 31b and 31g. The parallelizing lenses 33r, 33b and 33g make the light fluxes emitted by the light sources 31r, 31b and 31g into parallel light fluxes. Similarly, the parallelizing lenses 34r, 34b and 34g are provided on the emission sides of the respective light sources 32r, 32b and 32g. The parallelizing lenses 34r, 34b and 34g make the light flux emitted by the light sources 32r, 32b and 32g into parallel light fluxes.

A transmitting-reflecting element 37 is provided at an intersecting position where parallel light fluxes 35r, 35b and 35g emitted by the respective light sources 31r, 31b and 31g of the light source group 102a and parallel light fluxes 36r, 36b and 36g emitted by the respective light sources 32r, 32b and 32g of the light source group 102b intersect each other. Here, the "intersecting position" is a position where the transmitting-reflecting element 37 transmits the parallel light fluxes 35r, 35b and 35g and reflects the parallel light fluxes 36r, 36b and 36g so as to make a single light flux. In this regard, in FIG. 7, only center light rays of the respective light fluxes are shown in order not to make the figure complicated. The transmitting-reflecting element 37 has transmitting portions and reflecting portions 38r, 38b and 38g. The transmitting portions transmit the parallel light fluxes 35r, 35b and 35g emitted by the light sources 31r, 31b and 31g. The reflecting portions 38r, 38b and 38g reflect the parallel light fluxes 36r, 36b and 36g emitted by the light sources 32r, 32b and 32g.

The transmitting-reflecting element 37 is obtained by, for example, forming reflecting films using dielectric multilayer film, silver or the like on a transparent plate. The portions where the reflecting films are formed correspond to the reflecting portions 38r, 38b and 38g. In this regard, the reflecting portions 38r, 38b and 38g may be configured to reflect only light of a respectively specific color.

The second light source unit 101b has the light source groups 102c and 102d. The light source group 102c has an optical axis of the X direction. Moreover, the light source group 102c includes a plurality of light sources 51r, 51b and 51g arranged in the Z direction. The light source group 102c corresponds to the first light source group. In FIG. 7, three light sources 51r, 51b and 51g are shown. Moreover, the light source 51r that emits red light, the light source 51b that emits blue light, and the light source 51g that emits green light are arranged in this order from the +Z side.

The light source group 102d have optical axes in the Z direction. Moreover, the light source group 102d includes a plurality of light sources 52r, 52b and 52g arranged in the X direction. The light source group 102d corresponds to the second light source group. In FIG. 7, three light sources 52r, 52b and 52g are shown. Moreover, the light source 52g that emits green light, the light source 52b that emits blue light, the light source 52r that emits red light are arranged in this order from the +X side.

The light sources 51r, 51b, 51g, 52g, 52b and 52r of the second light source unit 101b emit the light fluxes whose polarization direction is different by 90 degrees from the polarization direction of the light fluxes emitted by the respective light sources of the above described first light source unit 101a. That is, when the respective light sources of the first light source unit 101a emit the light of P-polarization, the respective light sources of the second light source unit 101b emit the light of S-polarization. Moreover, when the respective light sources of the first light source unit 101a emit the light of S-polarization, the respective light sources of the second light source unit 101b emit the light of P-polarization. In this regard, it is preferred to use LDs capable of emitting the light fluxes with aligned polarizations as the light sources 51r, 51b, 51g, 52g, 52b and 52r.

The parallelizing lenses 53r, 53b and 53g are provided on the emission sides of the respective light sources 51r, 51b and 51g. The parallelizing lenses 53r, 53b and 53g make light fluxes emitted by the light sources 51r, 51b and 51g into parallel light fluxes 55r, 55b and 55g. Similarly, the parallelizing lenses 54g, 54b and 54r are provided on the emission sides of the respective light sources 52g, 52b and 52r. The parallelizing lenses 54g, 54b and 54r make light fluxes emitted by the light sources 52g, 52b and 52r into parallel light fluxes 56g, 56b and 56r.

The transmitting-reflecting element 57 is provided at an intersecting position where the parallel light fluxes 55r, 55b and 55g emitted by respective light sources of the light source group 102c and the parallel light fluxes 56g, 56b and 56r emitted by respective light sources of the light source group 102d intersect each other. Here, the "intersecting position" is a position where the single transmitting-reflecting element 57 transmits the parallel light fluxes 55r, 55b and 55g and reflects the parallel light fluxes 56g, 56b and 56r so as to make a single light flux. The transmitting-reflecting element 57 includes transmitting portions and the reflecting portions 58g, 58b and 58r. The transmitting portions transmit the parallel light fluxes 55r, 55b and 55g emitted by the light sources 51r, 51b and 51g. The reflecting portions 58g, 58b and 58r reflect the parallel light fluxes 56g, 56b and 56r emitted by the light sources 52g, 52b and 52r.

The transmitting-reflecting element 57 is obtained by, for example, forming reflecting films using dielectric multilayer film, silver or the like on a transparent plate. The portions where the reflecting films are provided correspond to the reflecting portions 58g, 58b and 58r. In this regard, the reflecting portions 58g, 58b and 58r may be configured to reflect only light of respective specific colors.

The polarization separation element 68 is provided at an intersecting position where the light fluxes emitted by the first light source unit 101a proceeds in the +Z direction, and the light fluxes emitted by the second light source unit 101b proceeds in the −X direction intersect each other. Here, "the intersecting position" is a position where the single polarization separation element 68 transmits the light fluxes proceeding in the +Z direction, and reflects the light fluxes proceeding in the −X direction so as to make a single light flux. The polarization separation element 68 has characteristics to transmit light of specific polarization (for example, light of P-polarization) and to reflect light having a polarization (for example, light of S-polarization) whose polarization direction is different from the light of the specific polarization by 90 degrees.

Here, the polarization separation element 68 transmits the light fluxes emitted by the first light source unit 101a, and reflects the light fluxes emitted by the second light source unit 101b. That is, the light fluxes emitted by the first light source unit 101a are light of P-polarization. Moreover, the light fluxes emitted by the second light source unit 101b are light of S-polarization. With such a configuration, the light fluxes emitted by the first light source unit 101a pass through the polarization separation element 68, and reaches the condenser lens 4. The light fluxes emitted by the second light source unit 101b are reflected in the Z direction by the polarization separation element 68, and reach the condenser lens 4.

Moreover, the polarization separation element 68 is constituted so as to transmit or reflect the light fluxes of the same colors emitted by the light source units 101a and 101b at the same positions. That is, for example, the light fluxes (i.e., light of P-polarization) emitted by the light source 31r of the first light source unit 101a passes through a certain position on the polarization separation element 68. Further, the light flux (i.e., light of S-polarization) emitted by the light source 52r of the second light source unit 101b is reflected at the same position on the polarization separation element 68. That is, the light flux passing through the polarization separation element 68, and the light flux reflected by the polarization separation element 68 proceeds on the same light path. Therefore, the light flux (red light) 66r in which the light of P-polarization and the light of S-polarization are combined reaches the condenser lens 4.

Similarly, the light flux (green light) 66g in which the light of P-polarization and the light of S-polarization are combined, and the light flux (blue light) 66b in which the light of P-polarization and the light of S-polarization are combined reach the condenser lens 4.

In this way, the two light source units 101a and 101b are used for Embodiment 3. If light sources whose polarization directions are selectable are used (for example, LDs) in the two light source units 101a and 101b, it becomes possible to obtain brightness nearly twice as high as that in Embodiment 1. Further, the high brightness of the projection-type display apparatus is obtained.

Moreover, as shown in FIG. 7, gaps between the parallel light fluxes 35r, 35b and 35g emitted by respective light sources 31r, 31b and 31g of the light source group 102a are filled with the parallel light fluxes 36r, 36b and 36g emitted by respective light sources 32r, 32b and 32g of the light source group 102b. Moreover, gaps between the parallel light fluxes 55r, 55b and 55g emitted by respective light sources 51r, 51b and 51g of the light source group 102c are filled with the parallel light fluxes 56g, 56b and 56r emitted by respective light sources 52g, 52b and 52r of the light source group 102d.

For this reason, the light flux reaching the condenser lens 4 becomes dense, since the gaps therein are reduced. Therefore, light use efficiency can be enhanced.

As described above, according to this Embodiment 3, the light fluxes emitted by the light source groups 102a and 102b are combined by the transmitting-reflecting element 37 in the first light source unit 101a. Also, the light fluxes emitted by light source groups 102c and 102d are combined by the transmitting-reflecting element 57 in the second light source unit 101b. Further, the light fluxes emitted by these light source units 101a and 101b are combined by the polarization separation element 68. Therefore, high brightness can be achieved. Moreover, light use efficiency can be enhanced. Moreover, it is not necessary to adjust a lot of mirrors as in the light source device disclosed by Patent Document 1, and therefore the complicated adjustment operation can be eliminated.

In this regard, the light sources 31r, 31b and 31g of the light source group 102a, the light sources 32r, 32b and 32g of the light source group 102b, the light sources 51r, 51b and 51g of the light source group 102c, and the light sources 52g, 52b and 52r of the light source group 102d are respectively arranged in one row and in three columns in this example. However, the light source may be arranged in a plurality of rows and a plurality of columns as in Embodiment 2. With such a configuration, a size in the X direction and a size in the Y direction (i.e., a size in a vertical direction and a size in a horizontal direction) of a section of the light flux emitted by the light source device can be made nearly the same as each other. Therefore, condensing efficiency by the condenser lens 4 can be enhanced, and high brightness can be achieved. That is, as in Embodiment 2, the size of the light flux in the X direction and the size of the light flux in the Y direction are nearly the same as each other, and therefore the light use efficiency is enhanced. For example, when the light sources are arranged in six rows and six columns, the light use efficiency becomes higher than when the light sources are arranged in four rows and nine columns. Here, the "nearly the same" indicates that the size in the X direction and the size in the Y direction may not be exactly the same as each other since, for example, the LD has different divergence angles in a fast axis direction and in a slow axis direction.

Moreover, in this Embodiment 3, description has been made to the case where the light source device emits the light fluxes of 3 colors. However, the same effect can be obtained even if the light source device emits a monochromatic light flux. In this case, for example, a color combination mirror may be arranged on the emission side of the light source device 1 so as to combine the light fluxes of the respective colors.

Embodiment 4

Figure 8:
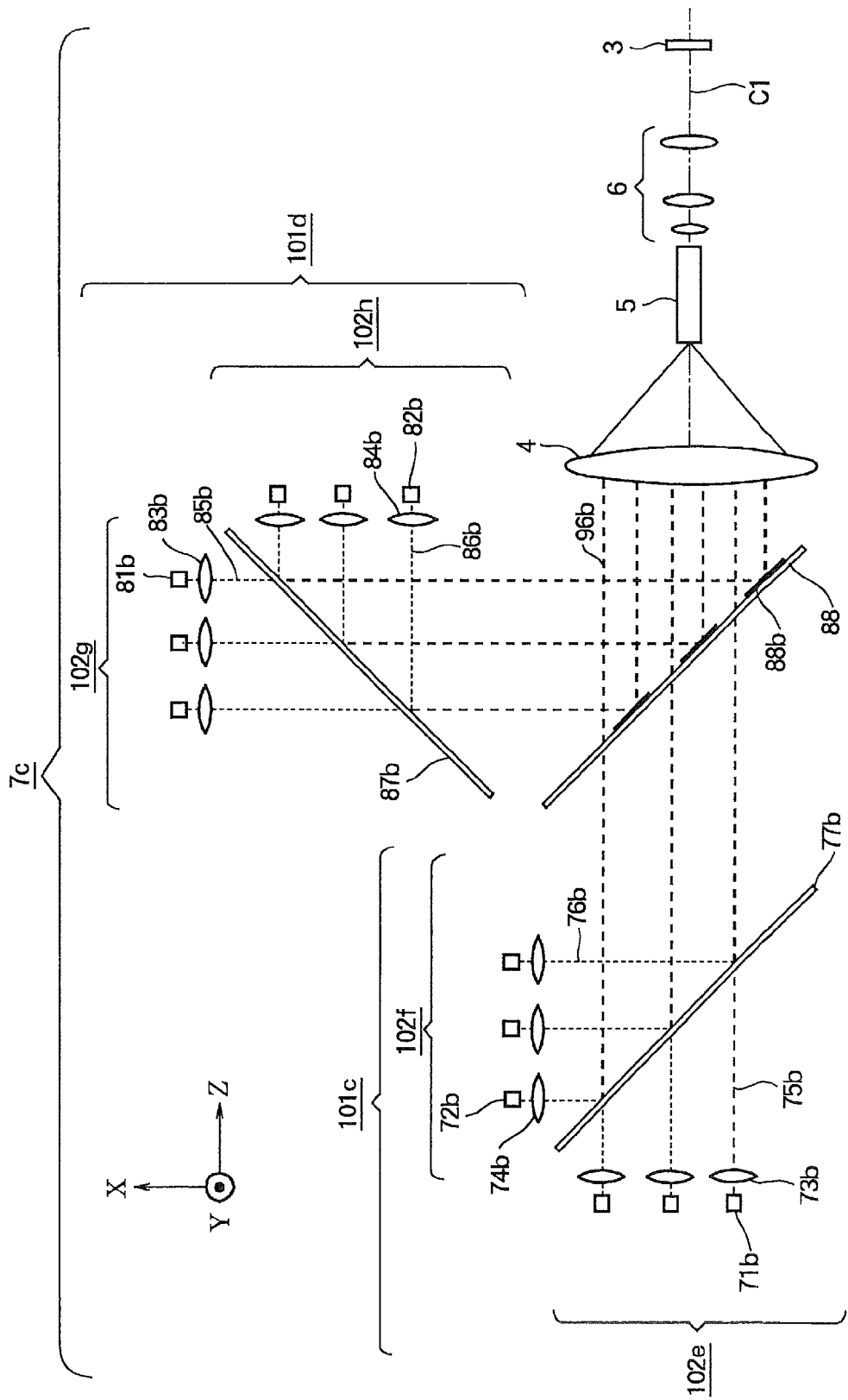
FIG. 8 is a view showing a configuration of a projection-type display apparatus including a light source device according to Embodiment 4 of the present invention.

FIG. 8 is a configuration view showing a configuration of a projection-type display apparatus 7c including a light source device according to Embodiment 4 of the present invention. The light source device according to Embodiment 4 includes two light source units 101c and 101d. Moreover, the light source device includes a transmitting-reflecting element 88. The respective light source units 101c and 101d are configured so as to combine light fluxes emitted by light source groups 102e and 102f and light source groups 102g and 102h using polarization separation elements 77b and 87b as a selective transmission element. Further, the light fluxes combined by the respective light source units 101c and 101d are further combined by the transmitting-reflecting element 88. In the projection-type display apparatus 7c, the components on the emission side of the light source device are the same as those of Embodiment 1. The components on the emission side of the light source device are the condenser lens 4, the light intensity equalizing element 5, the relay lens group 6, the image display element 3, the projection optical system 8 and the screen 9. In this regard, the projection optical system 8 and the screen 9 which are shown in FIG. 1 are omitted in the figure.

Embodiment 4 shows that the transmitting-reflecting elements 37 and 57 described in Embodiment 3 can be replaced by the polarization separation elements 77b and 87b. Moreover, Embodiment 4 shows that the polarization separation element 68 described in Embodiment 3 can be replaced by the transmitting-reflecting element 88. That is, Embodiment 4 shows that the transmitting-reflecting element and the polarization separation element are mutually exchangeable or selectable.

In this regard, the light source device of Embodiment 4 is so that configured the light fluxes combined by the light source units 101c and 101d are further combined by the transmitting-reflecting element 88. However, each of the light source units 101c and 101d can serve as a light source device by itself. That is, the light source unit 101c can serve as a light source device that combines the light fluxes emitted by the light sources 71b and 72b using the polarization separation element 77b. Moreover, the light source unit 101d can serve as a light source device that combines the light fluxes emitted by the light sources 81b and 82b using the polarization separation element 87b. These light source devices serves as light sources that emit monochromatic light. In Embodiment 4, the light source units 101c and 101d serve as light source devices that emit blue light.

For example, as for a blue LD, blue light has an intensity distribution having a peak wavelength of approximately 450 nm and 460 nm. As for a green LD, green light has an intensity distribution having a peak wavelength of approximately 530 nm. As for a red LD, red light has an intensity distribution having a peak wavelength of approximately 640 nm. A width of a wavelength band of light of LD is generally 10 nm or less. The width of the wavelength band of the light of the LD is preferably shorter than 5 nm when using the transmitting-reflecting element.

In the light source device of this Embodiment 4, an effect is obtained particularly when all of the light sources emit the light fluxes of the same (i.e., monochromatic) color. Here, description will be made of the case where the respective light sources of the light source groups 102e and 102f of the first source unit 101c and the respective light sources of the light source groups 102g and 102h of the second source unit 101d all emit blue light.

The first light source unit 101c includes the light source groups 102e and 102f. Moreover, the first light source unit 101c includes the polarization separation element 77b. The light source group 102e includes optical axes in the Z direction, and includes a plurality of light sources 71b arranged in the X direction. The light source group 102e corresponds to the first light source group. In FIG. 8, three light sources 71b are shown. Moreover, the light source group 102f includes optical axes in the X direction, and includes a plurality of light sources 72b arranged in the Z direction. The light source group 102f corresponds to the second light source group. In FIG. 8, three light source 72b are shown.

The light source 71b emits blue light (i.e., a first light flux) having a specific polarization (for example, P-polarization). The light source 72b emits blue light (i.e., a second light flux) having a polarization (for example, S-polarization) whose polarization direction is different from that of the light source 71b by 90 degrees. In this regard, it is preferred to use LDs capable of emitting light fluxes with aligned polarizations as the light sources 71b and 72b. The "LDs" are laser as described above.

Three parallelizing lenses 73b are provided on the emission sides of the respective three light sources 71b. The parallelizing lenses 73b make light fluxes emitted by the light sources 71b into parallel light fluxes 75b. Similarly, three parallelizing lenses 74b are provided on the emission sides of the respective three light source 72b. The parallelizing lenses 74b make light fluxes emitted by the light sources 72b into parallel light fluxes 76b.

The polarization separation element 77b is provided at an intersecting position where the parallel light fluxes 75b emitted by the respective light sources 71b of the light source group 102e and the parallel light fluxes 76b emitted by the respective light sources 72b of the light source group 102f intersect each other. Here, "the intersecting position" is a position where the single polarization separation element 77b transmits the parallel light fluxes 75b, and reflects the parallel light fluxes 76b so as to make a single light flux. In this regard, in FIG. 8, only center light rays of the respective light fluxes are shown in order not to make the figure complicated. The polarization separation element 77b has characteristics to transmit light of a specific polarization (i.e., light of a first polarization, for example, light of P-polarization) and reflecting the light whose polarization direction is different from the light of the specific polarization by 90 degrees (i.e., light of a second polarization, for example, light of S-polarization). Here, the polarization separation element 77b transmits the parallel light fluxes 75b (i.e., light of P-polarization) emitted by the respective light sources 71b of the light source group 102e and reflects the parallel light fluxes 76b (i.e., light of S-polarization) emitted by the respective light sources 72b of the light source group 102f.

Therefore, the parallel light fluxes 75b (i.e., the light of P-polarization) emitted by the respective light sources 71b of the light source group 102e pass through the polarization separation element 77b and reach the transmitting-reflecting element 88. Moreover, the parallel light fluxes 76b (i.e., the light of S-polarization) emitted by the respective light sources 72b of the light source group 102f are reflected in the Z direction by the polarization separation element 77b and reach the transmitting-reflecting element 88.

That is, the parallel light fluxes 75b (i.e., the light of P-polarization) and the parallel light fluxes 76b (i.e., the light of S-polarization) are incident on the polarization separation element 77b. The polarization separation element 77b transmits the parallel light fluxes 75b, and reflects the parallel light fluxes 76b so as to combine the parallel light fluxes 75b and the parallel light fluxes 76b on the same light path.

The second light source unit 101d includes the light source groups 102g and 102h. Moreover, the second light source unit 101d includes the polarization separation element 87b. The light source group 102g has optical axes in the X direction, and includes a plurality of light sources 81b arranged in the Z direction. The light source group 102g corresponds to a first light source group. In FIG. 8, three light sources 81b are shown. Moreover, the light source group 102h includes optical axes in the Z direction, and includes a plurality of light sources 82b arranged in the X direction. The light source group 102h corresponds to a second light source group. In FIG. 8, three light sources 82b are shown.

The light source 81b emits blue light (i.e., a first light flux) having a specific polarization (for example, P-polarization). The light source 82b emits blue light (i.e., a second light flux) having a polarization (for example, S-polarization) whose polarization direction is different from that of the light source 81b. In this regard, In this regard, it is preferred to use LDs capable of emitting light fluxes with aligned polarizations as the light sources 81b and 82b.

Three parallelizing lenses 83b are provided on the emission sides of the respective three light sources 81b. The parallelizing lenses 83b make light fluxes emitted by the light sources 81b into parallel light fluxes 85b. Similarly, three parallelizing lenses 84b on the emission sides of the respective three light sources 82b. The parallelizing lenses 84b make the light fluxes emitted by the light sources 82b into the parallel light fluxes 86b.

The polarization separation element 87b is provided at an intersecting position where the parallel light flux 85b emitted by the light sources 81b of the light source group 102g and the parallel light fluxes 86b emitted by the respective light sources 82b of the light source group 102h intersect each other. Here, the "intersecting position" is a position where the single polarization separation element 87b transmits the parallel light fluxes 85b and reflects the parallel light fluxes 86b so as to make a single light flux. The polarization separation element 87b has the characteristics to transmit light of a specific polarization (for example, light of P-polarization), and reflecting light having a polarization (for example, light of S-polarization) whose polarization direction is different from the light of the specific polarization by 90 degrees. Here, the polarization separation element 87b transmits the parallel light fluxes 85b (i.e., the light of P-polarization) emitted by the light source group 102g, and reflects the parallel light fluxes 86b (i.e., the light of S-polarization) emitted by the light source group 102h.

Therefore, the parallel light flux 85b (i.e., the light of P-polarization) emitted by the light source group 102g transmits the polarization separation element 87b and reaches the transmitting-reflecting element 88. Moreover, the parallel light fluxes 86b (i.e., the light of S-polarization) emitted by the light source group 102h are reflected in the −X direction by the polarization separation element 87b and reaches the transmitting-reflecting element 88.

That is, the parallel light fluxes 85b (i.e., light of P-polarization) and the parallel light fluxes 86b (i.e., light of S-polarization) are incident on the polarization separation element 87b. The polarization separation element 87b transmits the parallel light fluxes 85b, reflects the parallel light fluxes 86b, and combines the parallel light fluxes 85b and the parallel light fluxes 86b on the same light path.

The transmitting-reflecting element 88 is provided at an intersecting position where the light fluxes emitted by the first light source unit 101c and the light fluxes emitted by the second light source unit 101d intersect each other. The "intersecting position" is a position where the single transmitting-reflecting element 88 transmits the light fluxes emitted by the first light source unit 101c and reflects the light fluxes emitted by the second light source unit 101d so as to make a single light flux. The transmitting-reflecting element 88 includes transmitting portions that transmit the light fluxes emitted by the first light source unit 101c, and the reflecting portions 88b that reflect the light fluxes emitted by the second light source unit 101d.

The transmitting-reflecting element 88 is obtained by forming reflecting films using dielectric multilayer film, silver or the like on a transparent plates such as a glass substrate.

The light fluxes emitted by the first light source unit 101c transmit the transmitting-reflecting element 88, proceeds in the +Z direction, and is incident on the condenser lens 4. The light fluxes emitted by the second light source unit 101d are reflected in the +Z direction by the reflecting portion 88*b* of the transmitting-reflecting element 88, and is incident on the condenser lens 4.

In this way, according to Embodiment 4, the first light source unit 101*c* is configured so that the light fluxes 75*b* and 76*b* emitted by the respective light sources of the light source groups 102*e* and 102*f* are combined by the polarization separation element 77*b*. Moreover, the second light source unit 101*d* is configured so that the light fluxes 85*b* and 86*b* emitted by the respective light source groups 102*g* and 102*h* by the polarization separation element 87*b*. Furthermore, the light fluxes emitted by the light source units 101*c* and 101*d* are combined by the transmitting-reflecting element 88. Therefore, high brightness can be achieved. Moreover, light use efficiency can be enhanced.

Moreover, it is not necessary to adjust a lot of mirrors as in the light source device disclosed by Patent Document 1, and therefore the complicated adjustment operation can be eliminated.

Moreover, in the respective light source units 101*c* and 101*d*, the light fluxes are combined using the polarization separation elements 77*b* and 87*b*, and therefore the light fluxes can be combined on the same light path. Thereby, as was described in Embodiment 3, brightness of the light fluxes emitted by the respective light sources unit can be nearly doubled.

Furthermore, the gaps between the light fluxes emitted by the first light source unit 101*c* are buried by the light fluxes emitted by the second light source unit 101*d* with an action of the transmitting-reflecting element 88. Therefore, gaps in the light fluxes reaching the condenser lens 4 are reduced. Moreover, the light flux that reaches the condenser lens 4 is in a dense state. Therefore, light use efficiency can be enhanced.

Moreover, in the projection-type display apparatus configured to output green light by irradiating a phosphor using LD, it is necessary to enhance brightness of the monochromatic LD, as described in Patent Document 1. Since the light source device of this Embodiment 4 can enhance light use efficiency, it becomes possible to achieve high brightness without increasing the brightness of the light source itself.

In this regard, description has been made of the case where all of the light sources emit the light fluxes of the same color (i.e., the blue light flux). However, this embodiment is not to such a configuration. It is also possible to use light sources that emit light fluxes of a plurality of colors, as long as the polarization directions of the light fluxes emitted by the light source groups 102*e* and 102*f* are different from each other by 90 degrees, and the polarization directions of the light fluxes emitted by the light source groups 102*g* and 102*h* are different from each other by 90 degrees.

Moreover, when the light source device emits a light flux of a single color using light sources emitting light fluxes of a plurality of colors, for example, a color combination mirror may be arranged on an emission side of the light source device 1.

In this regard, in this example, the light sources 71*b* of the light source group 102*e*, the light sources 72*b* of the light source group 102*f*, the light sources 81*b* of the light source group 102*g*, and the light sources 82*b* of the light source group 102 are respectively arranged in a row and three columns. However, as in Embodiment 2, the light sources can be arranged in a plurality of rows and a plurality of columns as in Embodiment 2. With such a configuration, the size of the light flux in the X direction and the size of the light flux in the Y direction (i.e., the size in the vertical direction and the size in the horizontal direction) can be made nearly the same as each other. Therefore, the light use efficiency is enhanced. For example, when the light sources are arranged in six rows and six columns, the light use efficiency becomes higher than when the light sources are arranged in four rows and nine columns. Here, the "nearly the same" indicates that the size in the X direction and the size in the Y direction may not be exactly the same as each other since, for example, the LD has different divergence angles in a fast axis direction and in a slow axis direction.

Moreover, by making the polarization directions of the light outputted by the light source groups 102*e*, 102*f*, 102*g* and 102*h* the same as each other, the light source groups 102*e*, 102*f*, 102*g* and 102*h* can be made of same components. For example, it is also possible to provide λ/2-phase-difference plates on immediately rear of the light source groups 102*e* and 102*f*. The λ/2-phase-difference plates rotate the light fluxes by 90 degrees. With such a configuration, the four light source groups can be achieved using the same light sources.

Embodiment 5

Embodiment 5 includes the same components as that of Embodiment 4 except for configurations of the polarization separation elements 77*b* and 87*b*. The polarization separation elements 77*b* and 87*b* described in Embodiment 4 are reflection-type polarization separation elements of a reflection mode. Generally, a reflection-type polarization separation element has a reflectance and a transmittance in a range from 80% to 90%, and therefore there is a comparative loss of light amount. That is, there is a non-negligible loss of light amount. In this Embodiment 5, color separation filters formed of dielectric multilayer films are used as the polarization so as to reduce the loss of light amount.

In Embodiment 5, components except for the polarization separation elements 77*b* and 87*b* are the same the same as those of Embodiment 4. The components except for the polarization separation elements 77*b* and 87*b* are the light sources 71*b*, 72*b*, 81*b* and 82*b*, the parallelizing lenses 73*b*, 74*b*, 83*b* and 84*b*, the transmitting-reflecting elements 88, the condenser lens 4, the light intensity equalizing element 5, the relay lens group 6, the image display element 3, the projection optical system 8, and the screen 9. In this regard, in FIG. 8, the projection optical system 8 and the screen 9 shown in FIG. 1 are omitted.

Figure 9:
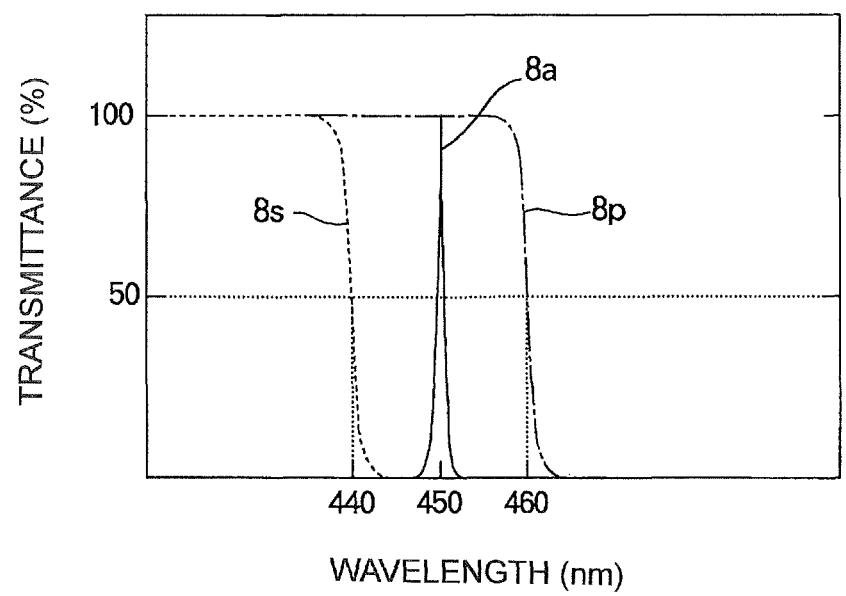
FIG. 9 is a view showing transmission characteristics of a color separation filter of a light source device with respect to a wavelength according to Embodiment 5 of the present invention.

FIG. 9 is a diagram showing transmission characteristics of a blue color separation filter with respect to a wavelength. A curve 8*a* shown by a solid line in FIG. 9 represents a light intensity distribution of blue light whose peak wavelength is 450 nm. In general, a width of a wavelength band of the blue light of the LD.

A curve 8*p* shown by a chain line in FIG. 9 represents transmission characteristics of a color separation filter for light of P-polarization. Moreover, a curve 8*s* shown by a broken line in FIG. 9 represents transmission characteristics for light of S-polarization. FIG. 9 shows that the color separation filter transmits the light flux of P-polarization having the wavelength of approximately 460 nm or less, and reflects the light flux of P-polarization having the wavelength of approximately 460 nm or longer. FIG. 9 also shows that the color separation filter transmits the light flux of S-polarization having the wavelength of approximately 440 nm or less, and reflects the light flux of P-polarization having the wavelength of approximately 440 nm or longer. Here, the reason where it is described that, for example, "the light flux of approximately 460 nm or less" is that the curve 8*p* shown by the alternate long and short dash line is slightly inclined at a falling part. Numerals such as 460 nm or the like indicate values where the transmittance is 50%.

From the characteristics shown in FIG. 9, the color separation filter transmits the blue light (whose peak wavelength is 450 nm) of P-polarization, and reflects the blue light of S-polarization. By using such a color separation filter, the transmittance of approximately 99% and the reflectance of approximately 98% can be obtained. Therefore, the light source device with high light use efficiency is achieved.

Here, although the peak wavelength of the blue light is 450 nm, it is also possible to use blue light whose peak wavelength is 460 nm, and use a color separation filter that transmits the light of P-polarization whose peak wavelength is 460 nm, and reflects the light of S-polarization whose peak wavelength is 460 nm. With such a configuration, it becomes possible to use light of a longer wavelength side. Moreover, as compared with the case where the light has the peak wavelength of 450 nm, it becomes possible to display a color closer to blue as when a lamp is used as the light source. In this regard, the light whose peak wavelength is 450 nm becomes purply-blue. The above-described color separation filter need only have characteristics obtained by shifting the characteristics shown in FIG. 9 to the longer wavelength side by 10 nm. In this case, the light of P-polarization whose peak wavelength is 460 nm passes, and the light of S-polarization is reflected.

In this regard, the curve 8p representing the transmittance of the light of P-polarization through the color separation filter and the curve 8s representing the transmittance of the light of S-polarization through the color separation filter are preferably as sharp as possible. Although a difference between half-value positions of the curve 8p and the curve 8s is 20 nm in FIG. 9, the difference is not limited to 20 nm. If is preferable that the difference is larger. The "half-value position" is a value of the wavelength when the transmittance is 50%.

As described above, according to this Embodiment 5, the color separation filters are used as the polarization separation elements 77b and 87b (FIG. 8) described with Embodiment 4. Therefore, the transmittance and reflectance of the light flux can be enhanced, and light use efficiency can further be enhanced.

Although the LDs emitting blue light have been described in this Embodiment 5 described LD that emits blue light, polarization separation can similarly be performed even when the LD that emits green light or the LD that emits red light are used.

Figure 18:
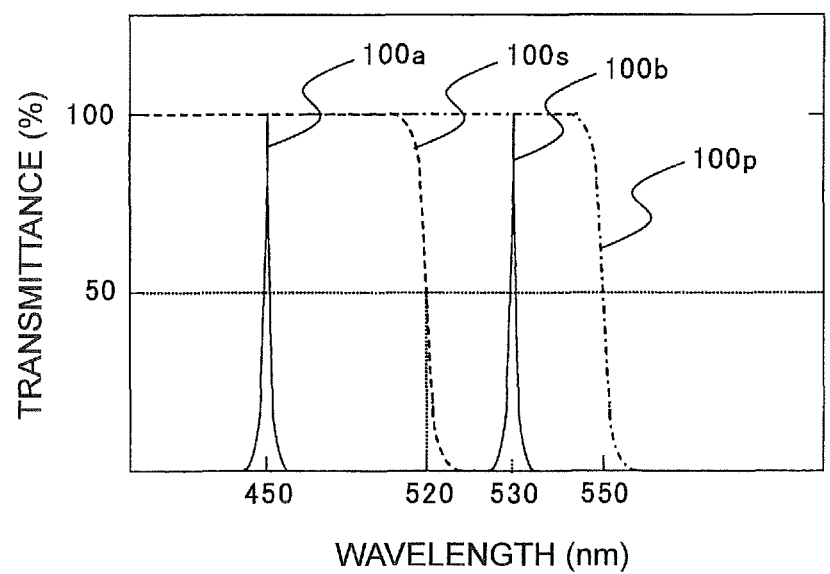
FIG. 18 is a view showing transmission characteristics of a color separation filter 317g2 of the light source device according to Embodiment 7 of the present invention.
Figure 20:
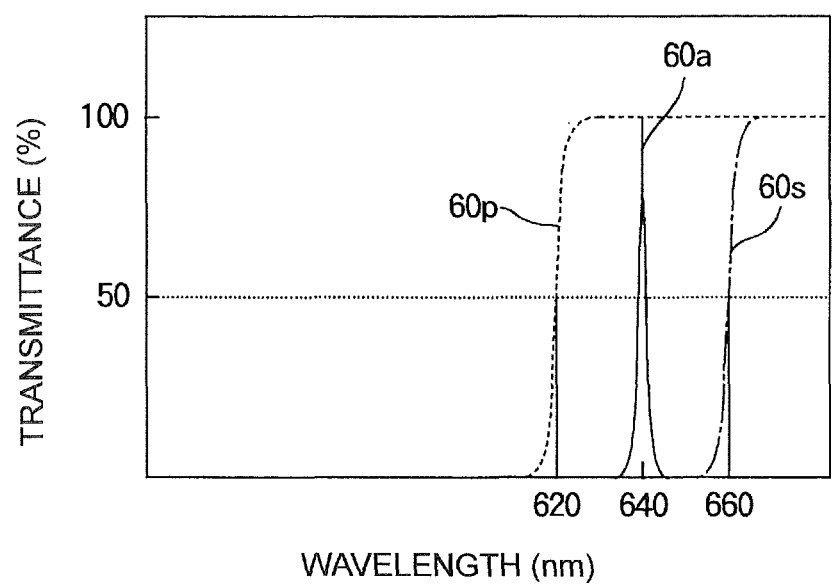
FIG. 20 is a view showing transmission characteristics of a color separation filter 417r of the light source device according to Embodiment 8 of the present invention.

Moreover, although the color separation filters are used as the polarization separation elements 77b and 87b (FIG. 8) of Embodiment 4, it is possible to use the color separation filter as the polarization separation element 68 (FIG. 7) of Embodiment 3. In the case of FIG. 7, three light sources are provided. In this case, the polarization separation element 68 has color separation filters of different properties in respective regions corresponding to red light, blue light and green light. For example, the region corresponding to red light having the peak wavelength of 640 nm has the characteristics as shown in FIG. 20. The region corresponding to green light having the peak wavelength at 530 nm has the characteristics as shown in FIG. 18. The region corresponding to blue light having the peak wavelength at 450 nm has the characteristics as shown in FIG. 9.

Embodiment 6

Figure 10:
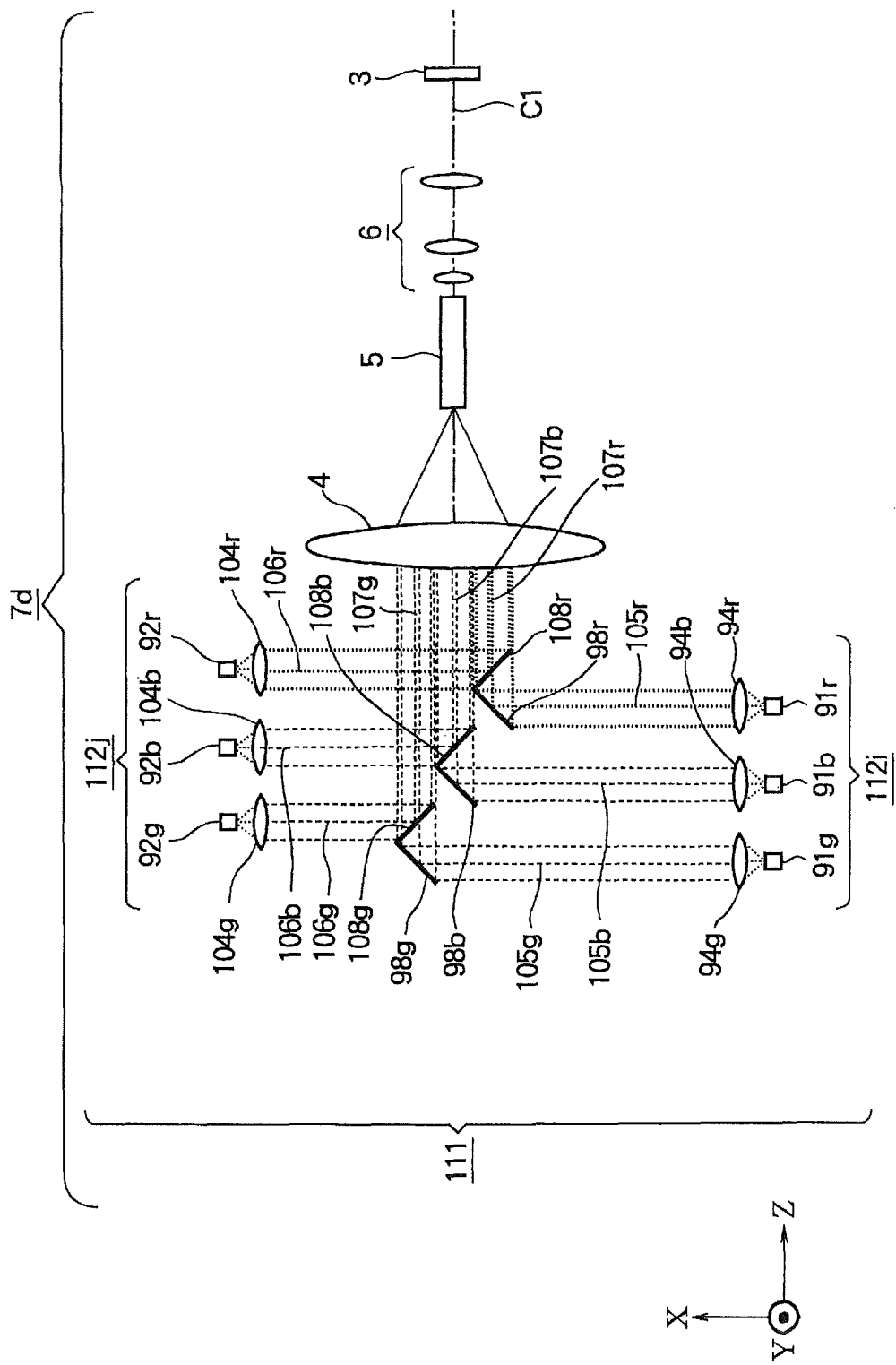
FIG. 10 is a view showing a configuration of a projection-type display apparatus including a light source device according to Embodiment 6 of the present invention.

FIG. 10 is a view showing a configuration of a projection-type display apparatus 7d including a light source device 111 according to Embodiment 6 of the present invention. In the projection-type display apparatus 7d, components on the emission side of the light source device are the same as those of Embodiment 1. The components on the emission side of the light source device are the condenser lens 4, the light intensity equalizing element 5, the relay lens group 6, the image display element 3, the projection optical system 8, and the screen 9. In this regard, the projection optical system 8 and the screen 9 shown in FIG. 1 are omitted.

In Embodiment 6 is, the transmitting-reflecting element 17 of the light source device 1 shown in Embodiment 1 is replaced with the reflecting elements 98r, 98b and 98g (described later) and the transmitting-reflecting elements 108r, 108b and 108g (described later). The position of the light source group 2a of Embodiment 1 is changed to a position facing the light source group 112j. In Embodiment 6, the light source group 112i faces the light source group 112j.

As shown in FIG. 10, the light source device 111 of the projection-type display apparatus 7d according to this Embodiment 6 has the first light source group 112i and the second light source group 112j. The first light source group 112i has optical axes in the X direction. Moreover, the first light source group 112i includes a plurality of light sources 91r, 91b and 91g arranged in the YZ plane. The second light source group 112j has optical axes in the X direction. Moreover, the second light source group 112j includes a plurality of light sources 92r, 92b and 92g arranged in the YZ plane.

Figure 11:
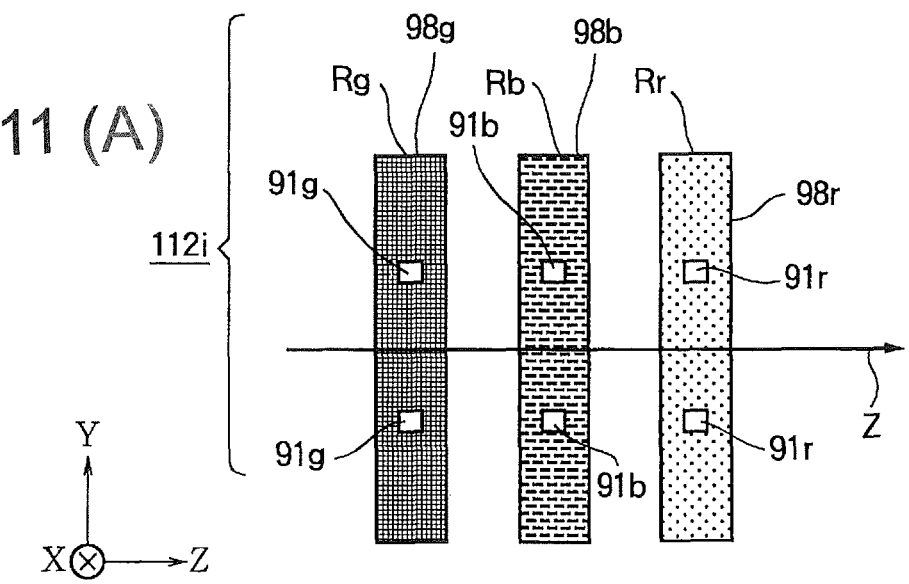
FIGS. 11(A) and 11(B) are views showing a positional relationship of light sources, reflecting elements and transmitting-reflecting elements of the light source device according to Embodiment 6 of the present invention.
Figure 11:
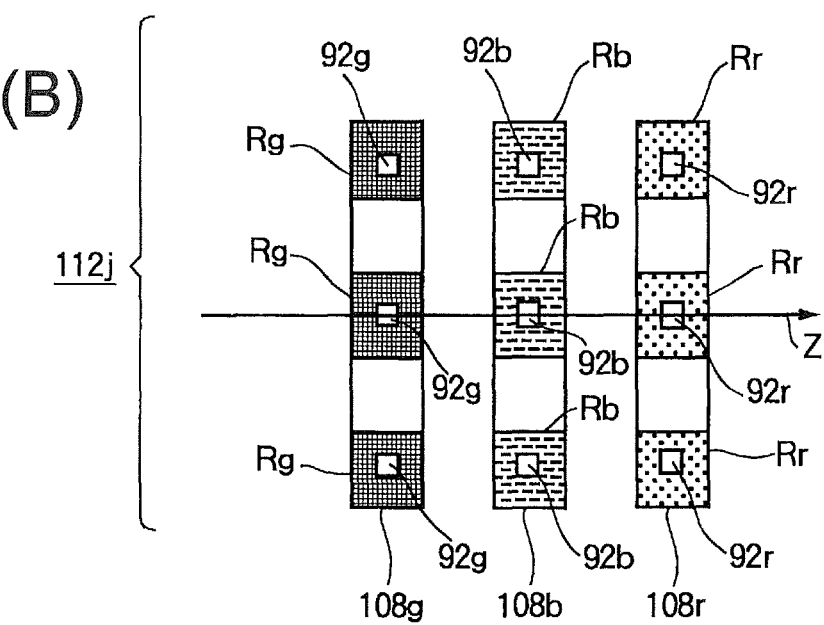

FIG. 11 includes views showing positional relationship of light sources 91r, 91b, 91g, 92r, 92b and 92g, the reflecting elements 98r, 98b and 98g (described later) and the transmitting-reflecting elements 108r, 108b and 108g (described later) as seen from −X side. FIG. 11(A) is a view showing a positional relationship of the light sources 91r, 91b and 91g and the reflecting elements 98r, 98b and 98g. FIG. 11(B) is a view showing a positional relationship of the light sources 92r, 92b and 92g and the transmitting-reflecting elements 108r, 108b and 108g. In this regard, parallelizing lenses 94r, 94b, 94g, 104r, 104b and 104g are omitted, since they are not necessary in explaining. In FIG. 11, the reflecting portions Rr are shown by dot patterns. The reflecting portions Rb are shown by broken stripe patterns. The reflecting portions Rg are shown by grid patterns.

As shown in FIG. 11(A), the light sources 91r, 91b and 91g of the first light source group 112i are arranged in two rows in the Y direction and in three columns in the Z direction. In contrast, as shown in FIG. 11(B), the light sources 92r, 92b and 92g of the second light source group 112j are arranged in three rows in the Y direction and in three columns in the Z direction (i.e., three rows and three columns).

As shown in FIG. 10, the parallelizing lenses 94r, 94b and 94g are provided on the respective emission sides (i.e., the +X direction sides) of the light sources 91r, 91b and 91g of the first light source group 112i. Reflecting elements 98r, 98b and 98g are provided on the respective emission sides (i.e., the +X direction sides) of the parallelizing lenses 94r, 94b and 94g. The reflecting elements 98r, 98b and 98g reflect parallel light fluxes 105r, 105b and 105g toward the condenser lens 4. That is, the reflecting elements 98r, 98b and 98g reflect the parallel light fluxes 105r, 105b and 105g in the +Z direction.

The parallelizing lenses 104r, 104b and 104g are provided on the respective emission sides (i.e., the −X direction sides) of the light sources 92r, 92b and 92g of the second light source group 112j. The transmitting-reflecting elements 108r, 108b and 108g are provided on the respective emission sides (i.e., the −X direction sides) of the parallelizing lenses 104r, 104b and 104g. The reflecting elements 108r, 108b and 108g reflect parallel light fluxes 106r, 106b and 106g toward the condenser lens 4. That is, the reflecting portions Rr, Rb and Rg of the reflecting elements 108r, 108b and 108g reflect the parallel light fluxes 106r, 106b and 106g in the +Z direction.

FIG. 11(A) is a view showing the reflecting elements 98r, 98b and 98g as seen from the −X direction. FIG. 11(B) is a view showing the transmitting-reflecting elements 108r, 108*b* and 108*g* as seen from the −X direction. In FIG. 11(A), the respective light sources 91*r*, 91*b* and 91*g* of the first light source group 112*i* are illustrated so that positional relationship with the reflecting elements 98*r*, 98*b* and 98*g* can be appreciated. In FIG. 11(B), the respective light sources 92*r*, 92*b* and 92*g* of the second light source group 112*j* are illustrated so that positional relationship with the transmitting-reflecting elements 108*r*, 108*b* and 108*g* can be appreciated. The light sources 91*r*, 91*b*, 91*g*, 92*r*, 92*b* and 92*g* are illustrated by squares with black frames. In this regard, in FIG. 11(B), the light sources 92*r*, 92*b* and 92*g* are provided on backside (i.e., the +X direction side) of the transmitting-reflecting elements 108*r*, 108*b* and 108*g*. However, in the figure, the light sources 92*r*, 92*b* and 92*g* are shown by solid line in order to clarify the positional relationship.

As shown in FIG. 11(A), the reflecting elements 98*r*, 98*b* and 98*g* have rectangular shapes elongated in the Y direction. The reflecting elements 98*r*, 98*b* and 98*g* are arranged at equal intervals in the Z direction.

Moreover, as shown in FIG. 10, an end of the transmitting-reflecting element 108*g* in the −X direction and an end of the transmitting reflecting element 108*b* in the +X direction are aligned on the X coordinate. Similarly, an end of the transmitting-reflecting element 108*b* in the −X direction and an end of the transmitting-reflecting element 108*r* in the +X direction are aligned on the X coordinate. Here, the term "aligned" includes a gap or overlapping due to variations of components and variations in assembling.

The reflecting elements 98*r*, 98*b* and 98*g* are obtained by, for example, forming the reflecting portions Rr, Rb and Rg using reflecting films or the like on the surface of transparent plates such as glass. The reflecting portions Rr, Rb and Rg are respectively formed on entire surfaces of the reflecting elements 98*r*, 98*b* and 98*g*.

As shown in FIG. 11(B), the transmitting-reflecting elements 108*r*, 108*b* and 108*g* have rectangular shapes elongated in the Y direction. Moreover, the transmitting-reflecting elements 108*r*, 108*b* and 108*g* are arranged at equal intervals in the Z direction.

The transmitting-reflecting elements 108*r*, 108*b* and 108*g* are obtained by, for example, forming the reflecting portions Rr, Rb and Rg using reflecting films or the like on the surface of transparent plates such as glass. The reflecting portion Rr, Rb and Rg are formed on regions of the transmitting-reflecting elements 108*r*, 108*b* and 108*g* on which the light fluxes emitted by the light sources 92*r*, 92*b* and 92*g* are incident. Regions of the transmitting-reflecting elements 108*r*, 108*b* and 108*g* where the reflecting portion Rr, Rb and Rg are not formed correspond to regions that transmit light fluxes. The "regions that transmit light fluxes" is transmitting portions.

With such a configuration, the parallel light fluxes 105*r*, 105*b* and 105*g* emitted by the light sources 91*r*, 91*b* and 91*b* of the first light source group 112*i* are reflected in the +Z direction by the reflecting elements 98*r*, 98*b* and 98*g*, pass through transmitting-reflecting elements 108*r*, 108*b* and 108*g*, and are incident on the condenser lens 4.

Moreover, the parallel light fluxes 106*r*, 106*b* and 106*g* emitted by the light sources 92*r*, 92*b* and 92*g* of the second light source group 112*j* are reflected in the +Z direction by the transmitting-reflecting elements 108*r*, 108*b* and 108*g*, and are incident on the condenser lens 4.

FIG. 12 includes diagrams showing a distribution of the light flux incident on the condenser lens 4. FIG. 12(A) is a diagram showing a distribution of the light flux incident on the condenser lens 4 when only the second light source group 112*j* of the light source groups 112*i* and 112*j* is used. FIG. 12(B) is a diagram showing a distribution of the light flux incident on the condenser lens 4 when both of the first light source group 112*i* and the second light source group 112*j* as in this Embodiment 6.

As shown in FIG. 12(A), when only the second light source group 112*j* is used, the red, blue and green light fluxes 106*r*, 106*b* and 106*g* emitted by the light sources 92*r*, 92*b* and 92*g* (i.e., a total of nine light sources) are incident on an incident surface of the condenser lens 4. On the incident surface, the red, blue and green light fluxes 106*r*, 106*b* and 106*g* emitted by the light sources 92*r*, 92*b* and 92*g* are arranged in three rows in the Y direction and in the three columns in the X direction (i.e., three rows and three columns). Although the light fluxes 106*r*, 106*b* and 106*g* are densely arranged in the X direction, gaps are formed in the Y direction, and therefore light use efficiency is not good.

In contrast, in this Embodiment 6, the first light source group 112*i* and the second light source group 112*j* are used. In this case, the red, blue and green light fluxes 105*r*, 105*b* and 105*g* emitted by a total of six light sources 91*r*, 91*b* and 91*g* are incident so as to fill gaps between the light fluxes 106*r*, 106*b* and 106*g* in the Y direction. The red, blue and green light fluxes 105*r*, 105*b* and 105*g* are arranged in two rows in the Y direction and three columns in the X direction (i.e., two rows and three columns). The light fluxes are incident on the incident surface of the condenser lens 4 with reduced gaps, light use efficiency can be enhanced.

As described above, in this Embodiment 6, the light fluxes emitted by the respective light sources of the first light source group 112*i* and the light fluxes emitted by the respective light sources of the second light source group 112*j* are combined. Therefore, the gaps between the light fluxes incident on the incident plane of the condenser lens 4 can be reduced, and the light source device with high light use efficiency can be achieved.

Moreover, the first light source group 112*i* and the second light source group 112*j* emit the light fluxes in the mutually opposite directions (i.e., the X direction). However, the light sources 91*r*, 91*b* and 91*g* and the light sources 92*r*, 92*b* and 92*g* are arranged in mutually shifted positions in the Z direction. Therefore, the parallel light fluxes 105*r*, 105*b* and 105*g* and the parallel light fluxes 106*r*, 106*b* and 106*g* can be prevented from reaching opposing light sources. Therefore, it becomes possible to prevent decrease in lifetime of the light sources due to heat caused by the light flux emitted by the opposing light sources.

Moreover, the light source groups 112*i* and 112*j* are provided so as to face each other, and therefore the light fluxes can be densely distributed on the condenser lens 4. For example, in the first light source group 112*i* of FIG. 10, the distribution of the light flux on the condenser lens 4 becomes dense in the X direction. That is, the light sources 91*r*, 91*b* and 91*g* of the first light source group 112*i* of FIG. 10 are arranged with gaps. Therefore, the parallel light fluxes 105*r*, 105*b* and 105*g* have gaps in the Z direction. However, the parallel light fluxes 105*r*, 105*b* and 105*g* are reflected by the reflecting elements 98*r*, 98*b* and 98*g*, and are incident on the condenser lens 4 so that gaps in the X direction are eliminated. In contrast, for example, in the case of the first light source group 2*a* of FIG. 1, gaps are generated between the parallel light fluxes 15*r*, 15*b* and 15*g* in the X direction when the parallel light fluxes 15*r*, 15*b* and 15*g* are incident on the condenser lens 4. Therefore, when using the same number of light sources, the widths of the light fluxes condensed onto the condenser lens can be narrowed in this embodiment 6. Therefore, the size of the condenser lens 4 can be reduced. That is, the reflecting elements 98*r*, 98*b* and 98*g* do not only have function to reflect the parallel light fluxes 105*r*, 105*b* and 105g, but also have function to convert the parallel light fluxes 105r, 105b and 105g with gaps into the parallel light fluxes 105r, 105b and 105g with no gap.

In this regard, in this Embodiment 6, the optical axes of the respective light sources of the first light source group 112i and the optical axes of the respective light sources of the second light source group 112j are parallel. However, even when both optical axes are not parallel, the respective light sources of both the light source groups 112i and 112j may be arranged so that the light fluxes combined by the reflecting elements 98r, 98b and 98g and the transmitting-reflecting elements 108r, 108b and 108g proceed to the condenser lens 4.

Moreover, the reflecting elements 98r, 98b and 98g have no transmitting portion, and therefore the reflecting films with high reflectance can be used. Therefore, light use efficiency can be enhanced.

Moreover, although the red, blue and green light sources are used here, the same effect is obtained when a monochromatic light source is used.

Moreover, polarization separation elements can be used as the transmitting-reflecting elements 108r, 108b and 108g. In this case, it is preferred that the polarization direction of the light fluxes emitted by the respective light sources of the first light source group 112i are different from the polarization direction of the light fluxes emitted by the respective light sources of the second light source group 112j by 90 degrees. Furthermore, when the polarization directions of the first light source group 112i and the second light source group 112j are different from each other by 90 degrees, the whole surfaces of the transmitting-reflecting elements 108r, 108b and 108g can be used as polarization separation films. With such a configuration, among the light fluxes 105r, 105b and 105g emitted by the first light source group 112i, parts of the light fluxes reflected by the reflecting portions Rr, Rb and Rg of the transmitting-reflecting elements 108r, 108b and 108g and failing to enter the condenser lens 4 may reach the condenser lens 4. The decrease in light use efficiency when using the transmitting-reflecting elements 108r, 108b and 108g is caused by variations in components, variations in assembling of a product or the like. If the variations in the components and the variations in assembling of the product and the like are taken into consideration, light use efficiency can be made higher by using the polarization separation elements than when the transmitting-reflecting element is used. In this case, if the peak wavelength of the red light is 640 nm, the transmitting-reflecting element 108r need only have the transmittance characteristics of FIG. 20 throughout the surfaces thereof. If the peak wavelength of the green light is 530 nm, the transmitting-reflecting element 108g need only have the transmittance characteristics of FIG. 18 throughout the surfaces thereof. If the peak wavelength of the blue light is 450 nm, the transmitting-reflecting element 108b need only have the transmittance characteristics of FIG. 9 throughout the surfaces thereof.

Moreover, in this Embodiment 6, as shown in FIG. 11(A), although the light sources 91r, 91b and 91g of the first light source group 112i are arranged by two rows in the Y direction, the light sources can be arranged in three rows or more.

Moreover, if aberration that occurs when the light flux is incident on a position on the condenser lens 4 farther from the optical axis is taken into consideration, light use efficiency can be enhanced by making the light fluxes incident on the condenser lens 4 at portions closer to the optical axis C1. Therefore, it is preferred that the number of the light sources in the X direction and in the Y direction are the same as each other as shown in FIG. 12(B) when all of the light sources of the light source groups 112i and 112j are overlapped with each other on the incident surface of the converging lens 4. Therefore, for example, the arrangement in six rows and six columns is more preferable than the arrangement in four rows and nine columns in terms of enhancement of light use efficiency.

Moreover, the first light source group 112i and the second light source group 112j may be monochromatic light sources for exciting phosphors. In this case, the phosphors may be provided on condensing positions of the light fluxes, and may emit light fluxes of colors (wavelengths) different from the monochromatic light condensed on the phosphors.

Embodiment 7

Figure 13:
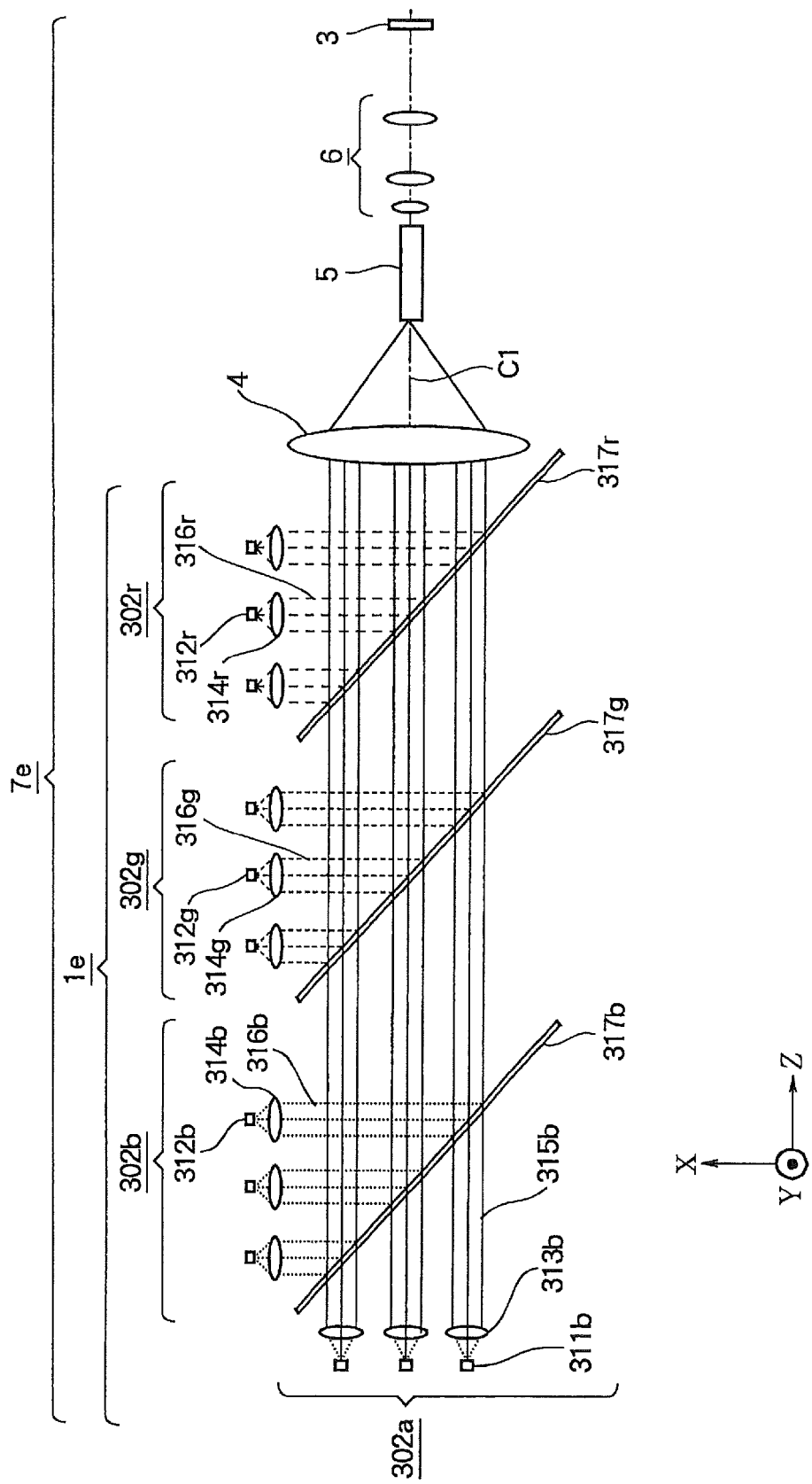
FIG. 13 is a view schematically showing a configuration of a projection-type display apparatus including a light source device according to Embodiment 7 of the present invention.

FIG. 13 is a schematic view showing a configuration of a projection-type display apparatus 7e including a light source device 1e according to Embodiment 7 of the present invention. This Embodiment 7 relates to the above described Embodiment 5.

In Embodiment 7, a plurality of configurations in each of which the parallel light fluxes 75b and the parallel light fluxes 76b of the light source unit 101c are combined as described in Embodiment 4. That is, a color separation filter 317g is provided in a proceeding direction of the light fluxes emitted by a color separation filter 317b, and combines the light fluxes 316g. Moreover, a color separation filter 317r is provided in a proceeding direction of the light fluxes emitted by the color separation filter 317g, and combines the light fluxes 316r.

As shown in FIG. 13, the projection-type display apparatus 7e according to Embodiment 7 includes the light source device 1e, the condenser lens 4, the light intensity equalizing element 5, the relay lens group 6, the image display element (light valve) 3, and the projection optical system (i.e., projection lens) 8. The light source device 1e emits a light flux. The condenser lens 4 condenses the light flux emitted by the light source device 1e. The light intensity equalizing element 5 equalizes the intensity distribution of the light flux condensed by the condenser lens 4. The relay lens group 6 guides the light flux whose intensity is equalized by the light intensity equalizing element 5 to the image display element 3. The image display element (i.e., the light valve) 3 modulates the light flux from the relay lens group 6 based on input picture signal, and converts the light flux into image light. The projection optical system (i.e., the projection lens) 8 projects image light on the screen 9 (FIG. 1) in an enlarged scale. Here, the screen 9 and the projection optical system 8 shown in FIG. 1 are omitted. The light valves 3 may be either a reflection type or a transmission type. In the projection-type display apparatus 7e, components on the emission side of the light source device are the same as those of Embodiment 1. The components on the emission side of the light source device are the condenser lens 4, the light intensity equalizing element 5, the relay lens group 6, the image display element 3, the projection optical system 8 and the screen 9.

The light source device 1e includes the light source groups 302a and 302b (i.e., the first light source group 302a and the second light source group 302b) that emit blue light, and light source groups 302g that emit green light (i.e., the third light source group 302g) and the light source group 302r that emits red light (i.e., the fourth light source group 302r). The light source group 302b, the light source group 302g and the light source group 302r are arranged in this order from the −Z direction toward the +Z direction along the Z direction which is a proceeding direction of the light emitted by the light source group 302a.

The light source group 302a includes a plurality of light sources 311b. Here, the number of the light sources 311b is three. The respective light sources 311b emit light of P-polarization. The light sources 311b emit light fluxes (i.e., blue light fluxes) whose peak wavelength is approximately 450 nm. The light sources 311b have optical axes in the Z direction. The light sources 311b are arranged in a row in the X direction. Moreover, parallelizing lenses 313b are provided on emission sides of the respective light sources 311b. The parallelizing lenses 313b make the light fluxes emitted by the respective light sources 311b into the parallel light fluxes 315b. "Approximately 450 nm" means the vicinity of a center from 440 nm to 460 nm in a range of the transmission characteristics of the color separation filter for the blue light with respect to the wavelength shown in FIG. 14.

The light source group 302b includes a plurality of light sources 312b. Here, the number of the light sources 312b is three. The respective light sources 312b emit light of S-polarization. The light sources 312b emit the light fluxes (blue light fluxes) whose peak wavelength is approximately 450 nm. The respective light sources 312b have optical axes in the X direction. The light sources 312b are arranged in a row in the Z direction. Moreover, parallelizing lenses 314b are provided on emission sides of the respective light sources 312b. The parallelizing lenses 314b make light fluxes emitted by the respective light sources 312b into the parallel light fluxes 316b. "Approximately 450 nm" means the vicinity of a center from 440 nm to 460 nm in a range of the transmission characteristics of the color separation filter for the blue light with respect to the wavelength shown in FIG. 14.

The color separation filter 317b as a polarization separation element is provided at an intersecting position where the parallel light fluxes 315b (i.e., the first light fluxes) emitted by the respective light sources 311b of the light source group 302a and the parallel light fluxes 316b (i.e., the second light fluxes) emitted by the respective light sources 312b of the light source group 302b intersect each other. Here, the "intersecting position" is a position where the single color separation filter 317b transmits the parallel light fluxes 315b and reflects the parallel light fluxes 316b so as to make a single light flux. The color separation filter 317b transmits the light of P-polarization from the respective light sources 311b of the light source group 302a, and reflects the light of S-polarization from the respective light sources 312b of the light source group 302b. With such a configuration, the blue light emitted by the light source group 302a, and passing through the parallelizing lens 313b, and the blue light emitted by the light source group 302b and passing through the parallelizing lens 314b are combined on the same light path, and proceeds in the +Z direction. In this way, light use efficiency is enhanced by combining the light fluxes of the same wavelength on the same light path.

In this embodiment, the light sources 311b and 312b are all blue LDs, and emit the light flux having the same wavelength band. However, the wavelength bands of the light flux emitted by the light sources 311b and 312b may be slightly different. That is, the color separation filter 317b transmits the light fluxes of the light source group 302a (i.e., the light sources 311b), and reflects the light fluxes of the light source group 302b (i.e., the light sources 312b). In this regard, the wavelength band of the blue light emitted by the light sources 311b and 312b is a wavelength band whose peak is approximately 450 nm and whose width is 10 nm or less. The "approximately 450 nm" means the vicinity of a center from 440 nm to 460 nm in a range of the transmission characteristics of the color separation filter for the blue light with respect to the wavelength shown in FIG. 14.

Figure 14:
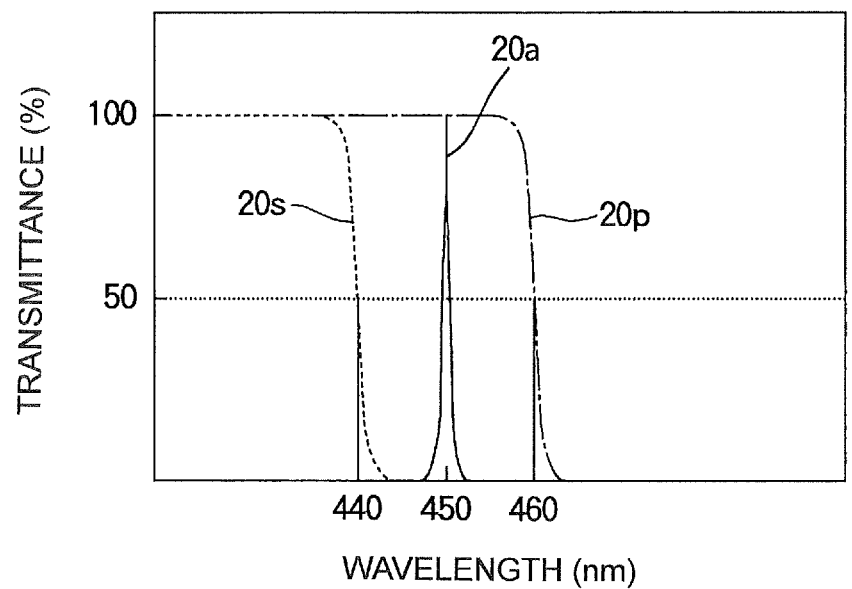
FIG. 14 is a view showing transmission characteristics of a color separation filter 317b of the light source device according of Embodiment 7 of the present invention.

FIG. 14 is a diagram showing transmission characteristics of the blue color separation filter 317b. A curve 20a shown by a solid line in FIG. 14 represents a light intensity distribution of a blue light whose peak wavelength is 450 nm. A curve 20p shown with a chain line represents transmission characteristics for light of P-polarization. A curve 20s shown by a broken line represents transmission characteristics for light of S-polarization. With such characteristics, the color separation filter 317b transmits the light of P-polarization and reflects the light of S-polarization as described above.

Referring back to FIG. 13, the light source group 302g has a plurality of light sources 312g. Here, the number of the light sources 312g is three. Each light source 312g is constituted by, for example, a green LD, and emits a light flux (i.e., a green light flux) whose peak wavelength is approximately 530 nm. The light flux emitted by the light sources 312g is the light of P-polarization or the light of S-polarization. Each light source 312g has an optical axis in the X direction. The light sources 312g are arranged in a row in the Z direction. Moreover, parallelizing lenses 314g are provided on emission sides of respective light sources 312g. The parallelizing lenses 314g makes the light fluxes emitted by the respective light sources 312g into parallel light fluxes 316g. In addition, a wavelength band of the green light emitted by the light sources 312g has a peak of approximately 530 nm, and a width of 10 nm or less. The "approximately 530 nm" means that the wavelength is longer than a range (up to 510 nm) of the transmission characteristics of the green color separation filter with respect to the wavelength shown in FIG. 15.

A color separation filter 317g as a polarization separation element (i.e., a first selective transmission element) is provided at an intersecting position where the light fluxes 316g (i.e., the third light flux) emitted in the direction of the –X direction from the respective light sources 312g and the light fluxes combined by the color separation filter 317b and proceeding in the +Z direction are combined. Here, the "intersection position" is a position where the single color separation filter 317b transmits the light fluxes combined by the color separation filter 317b and proceeding in the +Z direction and reflects the light fluxes 316g so at to make a single light flux.

The color separation filter 317g reflects the light fluxes 316g emitted by respective light sources 312g of the light source group 302g, and transmits the light fluxes combined by the color separation filter 317b and proceeding in the +Z direction. The green light emitted by the respective light sources 312g of the light source group 302g and passing through the parallelizing lenses 314g and the blue light from the color separation filter 317b are combined on the same light path and proceed in the +Z direction.

Figure 15:
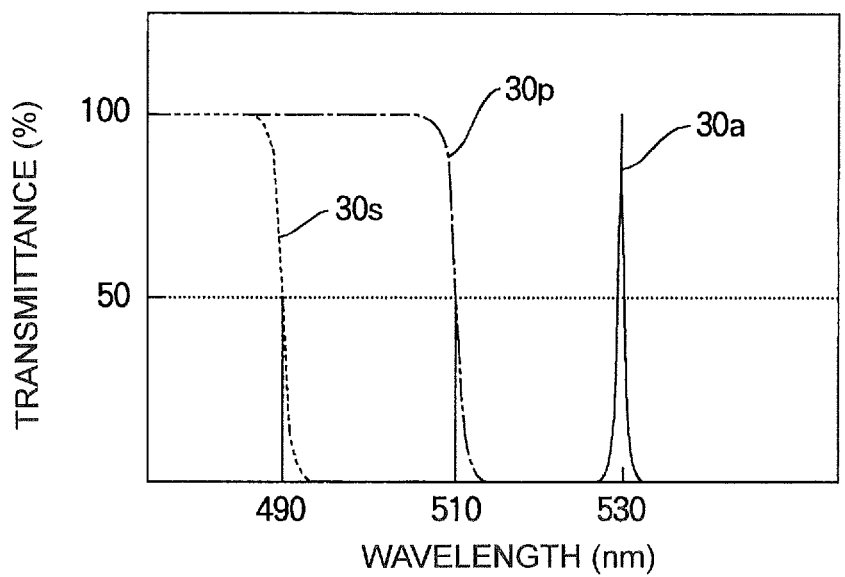
FIG. 15 is a view showing transmission characteristics of a color separation filter 317g of the light source device according to Embodiment 7 of the present invention.

FIG. 15 is a diagram showing transmission characteristics of the green color separation filter 317g. A curve 30a shown by a solid line in FIG. 15 represents a light intensity distribution of green light whose peak wavelength is 530 nm. A curve 30p shown by a chain line represents transmission characteristics for the light of P-polarization. A curve 30s shown by a broken line represents transmission characteristics for the light of S-polarization. The color separation filter 317g has transmittance of 0% for the light of P-polarization (i.e., transmission characteristics of the curve 30p) and for the light of S-polarization (i.e., transmission characteristics of the curve 30s). That is, the green color separation filter 317g transmits the light of P-polarization whose wavelength is 510 nm or less, and transmits the light of S-polarization whose wavelength is 490 nm or less. For this reason, the transmittance for the green light whose peak wavelength is 530 nm is approximately 0%. Therefore, in either case where the light fluxes (i.e., green light fluxes) of the light source group 302g has P-polarization or S-polarization, the green color separation filter 317g reflects the light fluxes. Moreover, the color separation filter 317g transmits light flux having the wavelength of 490 nm or less, and therefore transmits the blue light from the above described color separation filter 317b. In this way, the green light from the light source groups 302g and the blue light from the color separation filter 317b can be combined on the same optical path.

In this regard, the characteristics of the color separation filter 317g is not limited to the characteristics shown in FIG. 15. For example, the characteristics of the color separation filter 317g may be such that the characteristics of the color separation filter 317b (FIG. 14) is shifted toward the longer wavelength side by approximately 20 nm.

Referring back to FIG. 13, the light source group 302r includes a plurality of light sources 312r. Here, the number of the light sources 312r is three. Each light source 312r is constituted by, for example, a red LD, and emits a light flux (i.e., a red light flux) whose peak wavelength is approximately 640 nm. The light fluxes emitted by the light sources 312r have P-polarization or light of S-polarization. Each light source 312r has an optical axis in the X direction. The light sources 312r are arranged in a row in the Z direction. Moreover, the parallelizing lenses 314r are provided on emission side of the respective light sources 312r. The parallelizing lenses 314r make the light flux emitted by the respective light sources 312r into the parallel light fluxes 316r. In this regard, the wavelength band of the red light emitted by the light sources 312r has a peak of approximately 640 nm, and a width of 10 nm or less. The "approximately 640 nm" means that the wavelength is longer than 600 nm a range (up to 600 nm) of the transmission characteristics of the red color separation filter with respect to the wavelength shown in FIG. 16.

A color separation filter 317r as a polarization separation element (i.e., a second selective transmission element) is provided at an intersecting position where the light fluxes 316r (i.e., red light fluxes or fourth light fluxes) emitted from the respective light sources 312r of the light source group 302r and the light fluxes (i.e., the blue light fluxes and the green light fluxes) combined by the above described color separation filter 317g and proceeding in the +Z direction. Here, the "intersecting position" is a position where the single color separation filter 317g transmits the light fluxes combined by the color separation filter 317g and proceeding in the +Z direction, and reflects the light fluxes 316r so as to make a single light flux.

Figure 16:
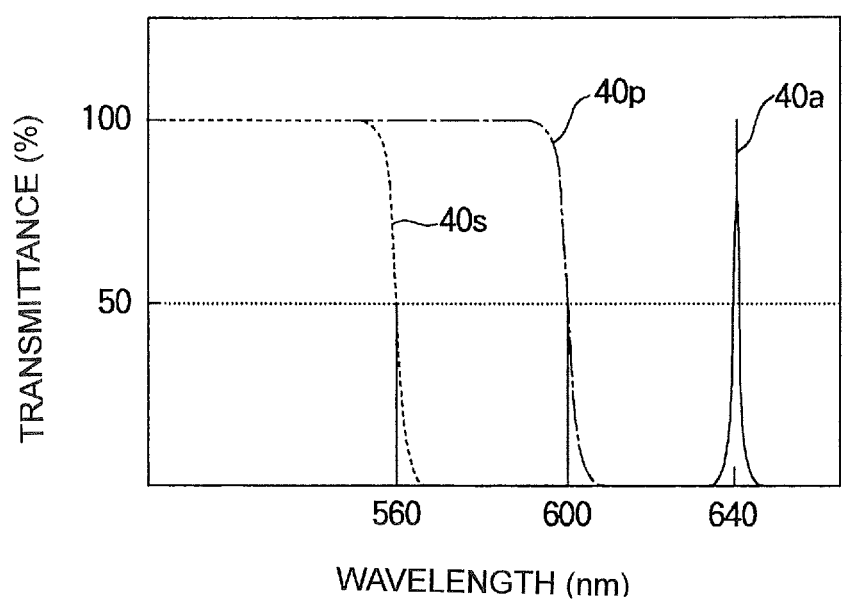
FIG. 16 is a view showing transmission characteristics of a color separation filter 317r of the light source device according to Embodiment 7 of the present invention.

FIG. 16 is a diagram showing transmission characteristics of the red color separation filter 317r. A curve 40a shown by a solid line in FIG. 16 represents a light intensity distribution of red light whose peak wavelength is 640 nm. A curve 40p shown by a chain line represents transmission characteristics for the light of P-polarization. A curve 40s shown by a broken line represents transmission characteristics for the light of S-polarization. The red color separation filter 317r transmits the light of P-polarization having the wavelength of 600 nm or less (i.e., transmission characteristics of the curve 40p) and transmits the light of S-polarization having the wavelength of 560 nm or less (i.e., transmission characteristics of the curve 40s). Therefore, in either case where the light fluxes (i.e., red light fluxes) of the light source group 302r has P-polarization or S-polarization, the red color separation filter 317r reflects the light fluxes. Moreover, the color separation filter 317r transmits light flux having the wavelength of 560 nm or less, and therefore transmits the blue light and green light from the above described color separation filter 317r. In this way, the red light from the light source groups 302r and the blue and green light from the color separation filter 317g can be combined on the same optical path.

In this regard, the characteristics of the color separation filter 317r is not limited to the characteristics shown in FIG. 16. For example, the characteristics of the color separation filter 317r may be such that the characteristics of the color separation filter 317g (FIG. 15) is shifted toward the longer wavelength side by approximately 60 nm.

In this way, in Embodiment 7 of the present invention, the light source groups 302b, 302g and 302r are arranged in the proceeding direction of the light fluxes emitted by the light source group 302a (i.e., the +Z direction). Further, the light fluxes of these light source groups 302a, 302b, 302g and 302r are combined by the color separation filters 317b, 317g and 317r. Therefore, the blue light, the green light and the red light can be combined efficiently, and high brightness can be obtained. Moreover, light use efficiency can be enhanced by use of the color separation filters.

In this regard, three light source groups 302b, 302g and 302r (i.e., the second light source group 302b, the third light source group 302g, and the fourth light source group 302r) are arranged along the proceeding direction of the light emitted by the light source group 302a (i.e., the first light source group 302a). However, the number of the arranged light source groups is not limited to three. The number need only be one or more.

Figure 17:
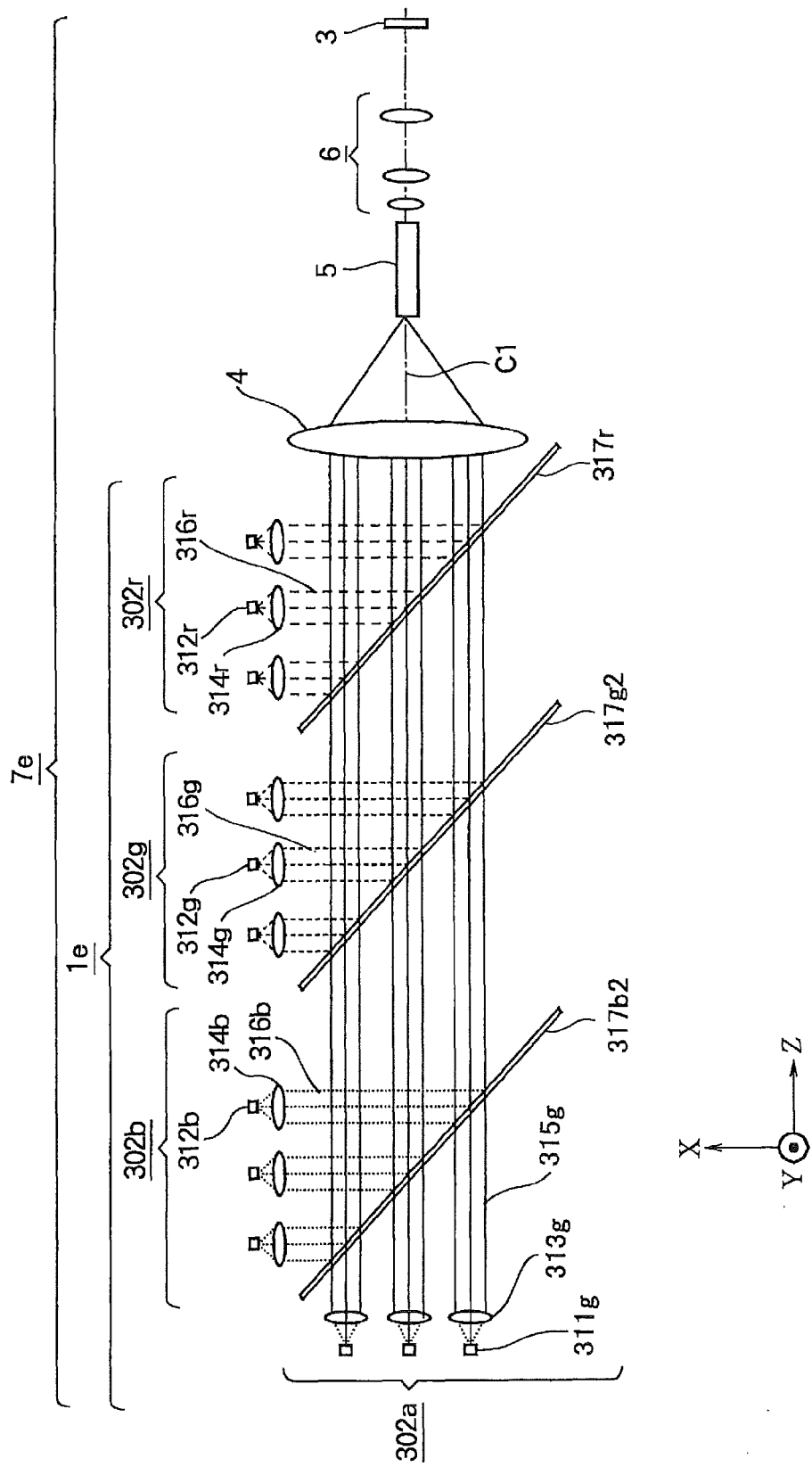
FIG. 17 is a view schematically showing another configuration example of the projection-type display apparatus including the light source device according to Embodiment 7 of the present invention.

In Embodiment 7, the blue light of P-polarization and the blue light of S-polarization are combined. However, it is also possible to combine the green light of P-polarization and the green light of S-polarization. FIG. 17 is a schematic view of a configuration in such a case. Unlike in FIG. 13, the light sources 312b may emit either light of P-polarization or light of S-polarization. Furthermore, the light sources 311b of FIG. 13 are replaced with the light sources 311g emitting the green light of P-polarization in FIG. 17.

Figure 22:
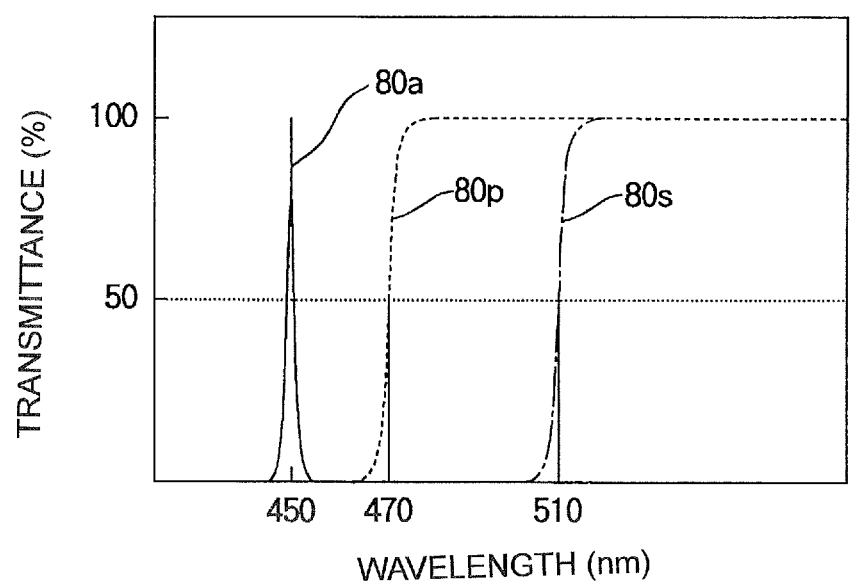
FIG. 22 is a view showing transmission characteristics of a color separation filter 417b of the light source device according to Embodiment 8 of the present invention.

The color separation filter 317b2 has the same characteristics as the color separation filter 417b shown in FIG. 19 (described later in Embodiment 8). The characteristics of the color separation filter 417b (i.e., the color separation filter 317b2) is shown in FIG. 22. As shown in FIG. 22, it is appreciated that the color separation filter 312g has transmittance of 0% for the light of P-polarization and for the light of S-polarization, and reflects the light. That is, the blue light (i.e., the parallel light flux 316b) emitted by the light sources 312b is reflected by the color separation filter 317b2. Moreover, the transmittance is 100% for the green light sources 311g whose peak wavelength is 530 nm in either case where the green light has P-polarization or S-polarization. Here, it is assumed that the light emitted by the light source 311g has P-polarization, in consideration of combination by the color separation filter 317g2. The light fluxes emitted by the light sources 311g are made into parallel light fluxes by the parallelizing lenses 313g, and pass through the color separation filter 317b2.

Next, the light as a result of combination of the blue light and the green light is incident on the color separation filter 317g2. The green light (i.e., the parallel light fluxes 316g) emitted by the light sources 312g of the light source group 302g are also incident on the color separation filter 317g2.

FIG. 18 shows characteristics of the color separation filter 317g2. A curve 100a shown by a solid line in FIG. 18 represents a light intensity distribution of the blue light whose peak wavelength is 450 nm. A curve 100b shown as another solid line represents a light intensity distribution of a green light whose peak wavelength is 530 nm. A curve 100p shown by a chain line represents transmission characteristics for light of P-polarization. A curve 100s shown by a broken line represents transmission characteristics for light of S-polarization. Since the color separation filter 317g2 transmits light whose wavelength is 520 nm or less regardless of polarization, it is appreciated that the color separation filter 317g2 transmits the blue light. Moreover, the light whose peak wavelength is 530 nm emitted by the light source 311g has P-polarization, and therefore passes through the color separation filter 317g2. Furthermore, the light whose peak wavelength is 530 nm emitted by the light sources 312g is reflected if the light has S-polarization. Therefore, as for the green light, it is assumed that the light of the light sources 311g has P-polarization, and the light of the light sources 312g has S-polarization. Therefore, the blue light, the green light of P-polarization and the green light of S-polarization are combined by passing through or being reflected by the color separation filter 317g2.

The light combined by the color separation filter 317g2 is incident on the color separation filter 317r. The red light emitted by the light sources 312r of the light source group 302r (i.e., the parallel light flux 316r) is also incident on the color separation filter 317r. The configuration of the color separation filter 317r is as described in Embodiment 7. In this way, the red light is further combined by the color separation filter 317r, and the light of three colors is incident on the condenser lens 4.

In this regard, the polarization separation element is used in Embodiment 7 as a selective transmission element. However, if an arrangement of respective light fluxes is chosen appropriately, a transmitting-reflecting element can be used as the selective transmission element. That is, the light source groups 302a and 302b and the color separation filter 317b may be replaced with the light source groups 102e and 102f and the color separation filter 77b of the light source unit 101c shown in FIG. 8 of Embodiment 4. Moreover, it is conceived that the light source unit 101d shown in FIG. 8 of Embodiment 4 is replaced with the light source group 302g. Then, it is appreciated that replacement of the color separation filter 317g shown in FIG. 13 with the transmitting-reflecting element 88 shown in FIG. 8 is easy. However, when the selective transmission element is used as the transmitting-reflecting element, the selective transmission element cannot combine the parallel light fluxes 315b, 316b and 316g as the color separation filter can. Therefore, a resulting configuration is that the gaps between the parallel light fluxes 315b and 316b are filled with the parallel light fluxes 316g. With such a configuration, the gaps in the light flux reaching the condenser lens 4 can be eliminated. Further, the light flux reaching the condenser lens 4 are in a dense state. Therefore, light use efficiency can be enhanced.

Similarly, it is assumed that the light fluxes incident on the transmitting-reflecting element 88 shown in FIG. 8 of Embodiment 4 from the −Z direction is replaced with the light fluxes incident on the color separation filter 317r shown in FIG. 13 from the −Z direction. Moreover, it is assumed that the light source unit 101d shown in FIG. 8 of Embodiment 4 is replaced with the light source group 302r. Then, it can be understood that the color separation filter 317r shown in FIG. 13 can be easily replaced with the transmitting-reflecting element 88 shown in FIG. 8. In this regard, when a selective transmission element is used as a transmitting-reflecting element, the parallel light fluxes 315b, 316b and 316g and the parallel light flux 316r cannot be combined as when the color separation filter is used. That is, a resulting configuration is that gaps between the parallel light fluxes 315b, 316b and 316g are filled with the parallel light fluxes 316r. With such a configuration, the gaps of the light fluxes that reach the condenser lens 4 are eliminated. Moreover, the light fluxes that reach the condenser lens 4 are in a dense state. Therefore, light use efficiency can be enhanced.

Embodiment 8

Figure 19:
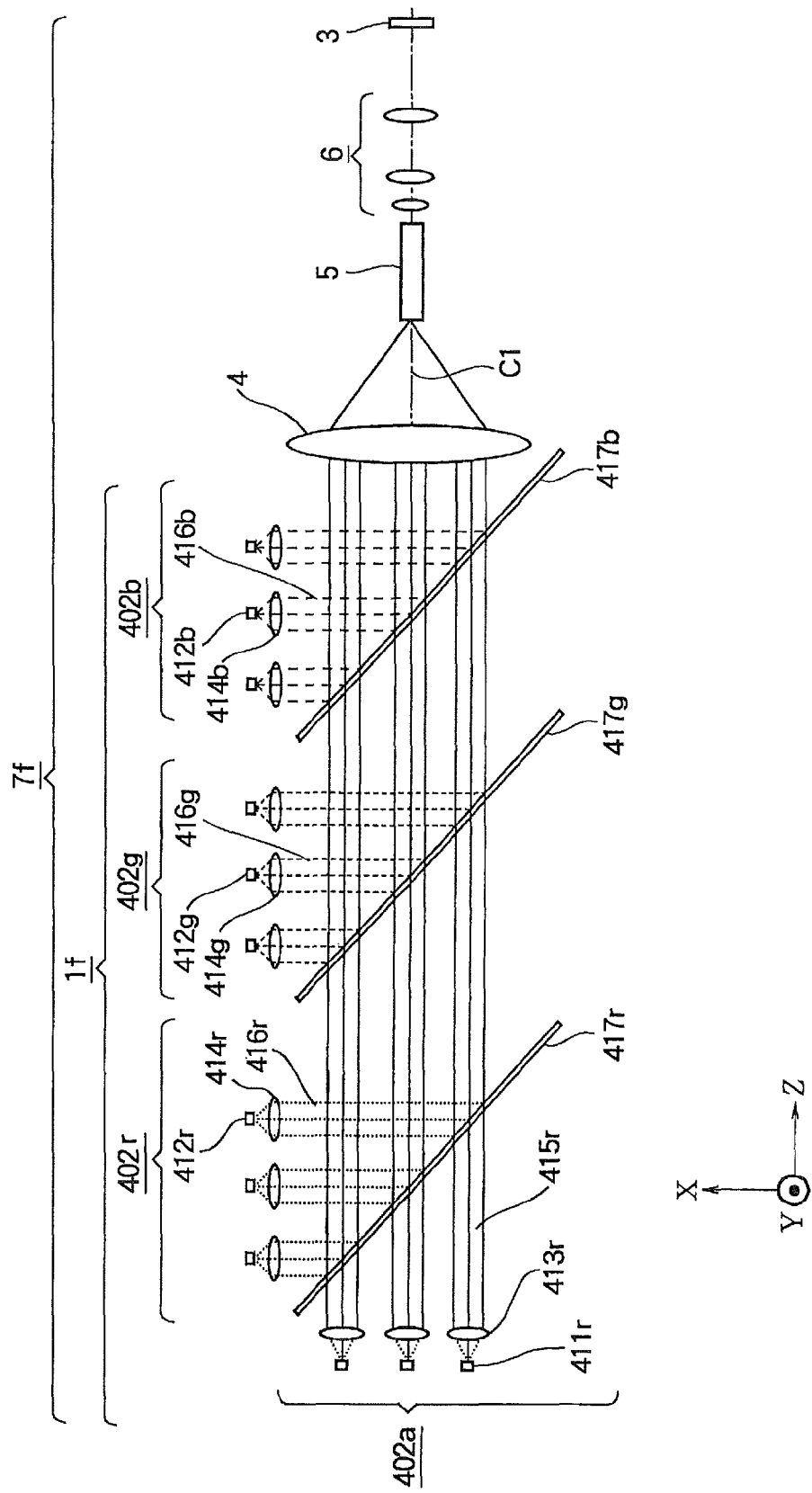
FIG. 19 is a view schematically showing a configuration of a projection-type display apparatus including a light source device according to Embodiment 8 of the present invention.

FIG. 19 is a schematic view showing a configuration of a projection-type display apparatus 7f including a light source device if according to Embodiment 8 of the present invention. This Embodiment 8 relates to the above described Embodiment 7. In Embodiment 7, the light source group 302b, 302g and 302r are arranged in an order: the light source group 302b, the light source group 302g and the light source group 302r, in a descending order of distance from the condenser lens 4. In contrast, in Embodiment 8, the light source group 302b, 302g and 302r are arranged in an order: the light source group 302r, the light source group 302g and the light source group 302b, in a descending order of distance from the condenser lens 4. In this way, Embodiment 8 shows that the order of arrangements of the light source groups 302b, 302g and 302r having the different wavelength bands can be changed. In the projection-type display apparatus 7f of Embodiment 8, component on the emission side of the light source device are the same as those of Embodiment 7 (FIG. 13), i.e., the same as those of Embodiment 1. The components on the emission side of the light source device are the condenser lens 4, the light intensity equalizing element 5, the relay lens group 6, the image display element 3, the projection optical system 8, and the screen 9. In this regard, the projection optical system 8 and the screen 9 shown in FIG. 1 are omitted.

The light source device if includes the light source groups 402a and 402r that emit red light, and a light source group 402g that emits green light and the light source group 402b that emits blue light. The light source group 402r, the light source group 402g and the light source group 402b are arranged in this order from −Z direction toward the +Z direction along the Z direction. A proceeding direction of the light emitted by the light source group 402a is the +Z direction.

The light source group 402a includes a plurality of light sources 411r. Here, the number of the light sources 411r is three. The light sources 411r emit light of P-polarization. The light sources 411r emit the light (i.e., red light) whose peak wavelength is approximately 640 nm. The light sources 411r have optical axes in the Z direction. The light sources 411r are arranged in a row in the X direction. Moreover, parallelizing lenses 413r are provided on emission sides (i.e., the +Z direction sides) of the respective light sources 411r. The parallelizing lenses 413r make the light fluxes emitted by the light sources 411r into the parallel light fluxes 415r.

The light source group 402r includes a plurality of light sources 412r. Here, the number of the light sources 412r is three. The light sources 412r emit light of S-polarization whose peak wavelength is approximately 640 nm (i.e., red light). The light sources 412r have optical axes in the X direction. The light sources 412r are arranged in a row in the Z direction. Moreover, parallelizing lenses 414r are provided on emission sides (i.e., the −X direction sides) of the light sources 412r. The parallelizing lenses 414r makes light fluxes emitted by the light sources 412r into the parallel light fluxes 416r.

A color separation filter 417r as a polarization separation element is provided at an intersecting position where the light fluxes 415r (i.e., a first light flux) emitted by the respective light sources 411r of the light source groups 402a and the light fluxes 416r (i.e., a second light flux) emitted by the respective light sources 412r of the light source group 402r intersect each other. Here, the "intersecting position" is a position where the single color separation filter 417r transmits the light fluxes 415r and reflects the light fluxes 416r so as to make a single light flux. The color separation filter 417r transmits the light of P-polarization from the respective light sources 411r of the light source group 402a, and reflects the light of S-polarization from the respective light sources 412r of the light source group 402r. With such a configuration, the red light emitted by the light source group 402a and passing through the parallelizing lens 413r, and the red light emitted by the light source group 402r and passing through the parallelizing lenses 414r are combined on the same light path, and proceeds in the +Z direction.

In this embodiment, both of the light sources 411r and 412r are red LDs, and emit the light fluxes of the same wavelength band. However, the wavelength bands of the light fluxes emitted by the light sources 411r and 412r may be slightly different. That is, the color separation filter 417r need only be able to transmit the light fluxes of the light source group 402a (i.e., the light sources 411r), and reflect the light fluxes of the light source group 402r (i.e., the light sources 412r).

FIG. 20 is a view showing transmission characteristics of the red color separation filter 417r. A curve 60a shown by a solid line in FIG. 20 represents the light intensity distribution of a red light with a peak wavelength of 640 nm. A curve 60p shown by a broken line represents transmission characteristics for light of P-polarization. The red color separation filter 417r transmits the light of P-polarization having the wavelength of 620 nm or more. A curve 60s shown by a chain line represents transmission characteristics for light of S-polarization. The red color separation filter 417r transmits the light of S-polarization having the wavelength of 660 nm or more. With such characteristics, the color separation filter 417r transmits the red light of P-polarization whose peak wavelength is 640 nm, and reflects the red light of S-polarization whose peak wavelength is 640 nm.

In this regard, in FIG. 20, the transmission characteristics of the color separation filter 417r for the light having polarization has a width of ±20 nm with respective to 640 nm. However, the width is not limited to ±20 nm, but may be ±10 nm or less, or may be ±20 nm or more. That is, the color separation filter 417r may have any characteristics as long as the light fluxes of the light source group 402a and the light fluxes of the light source group 402r can be combined.

Referring back to FIG. 19, the light source group 402g includes a plurality of light sources 412g. Here, the number of the light sources 412g is three. Each light sources 412g is constituted by, for example, a green LD, and emits the light fluxes (i.e., the green light fluxes) whose peak wavelength is approximately 530 nm. The light fluxes emitted by the light sources 412g have P-polarization or S-polarization. The light sources 412g have optical axes in the X direction. The light sources 412g are arranged in a row in the Z direction. Moreover, parallelizing lenses 414g are provided on emission sides (i.e., the −X direction sides) of the respective light sources 412g. The parallelizing lenses 414g make the light fluxes emitted by the light sources 416g into parallel light fluxes.

The color separation filter 417g as a polarization separation element (i.e., a first selective transmission element) is provided at an intersecting position where the light fluxes 416g (i.e., the third light flux) emitted by the respective light sources 412g of the light source group 402g and the light fluxes combined by the color separation filter 417r and proceeding in the +Z direction intersect each other. Here, the "intersecting position" is a position where the single color separation filter 417g transmits the light fluxes combined by the color separation filter 417r and proceeding in the +Z direction, and reflects the light fluxes 416g so as to make a single light flux.

The color separation filter 417g reflects the light flux emitted by 412g of each light source of 402g of light source groups, and transmits the light fluxes combined by the color separation filter 417r and proceeding in the +Z direction. The green light emitted by the respective light sources 412g of the light source group 402g and passing through the parallelizing lenses 414g is combined with the red light from the color separation filter 417r on the same light path, and proceeds in the +Z direction.

Figure 21:
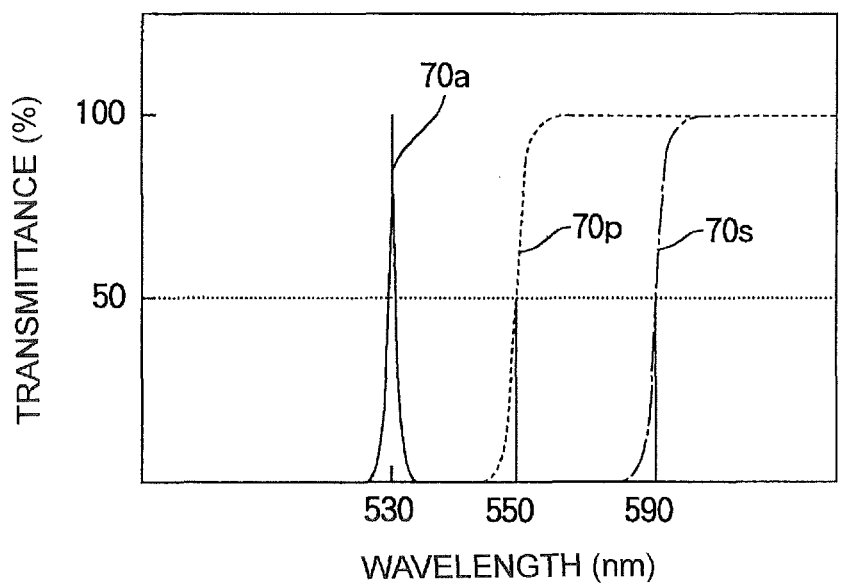
FIG. 21 is a view showing transmission characteristics of a color separation filter 417g of the light source device according to Embodiment 8 of the present invention.

FIG. 21 is a view showing transmission characteristics of the green color separation filter 417g. A curve 70a shown by a solid line in FIG. 21 represents a light intensity distribution of green light whose peak wavelength is 530 nm. A curve 70p shown by a dashed line represents transmission characteristics for light of P-polarization. The color separation filter 417g transmits the light of P-polarization whose wavelength is 550 nm or more. A curve 70s shown by a chain line represents transmission characteristics for light of S-polarization. The color separation filter 417g transmits the light of S-polarization whose wavelength is 590 nm or more. The color separation filter 417g has a transmittance of approximately 0% for green light whose peak wavelength is 530 nm in either case where the light has P-polarization (transmission characteristics of the curve 70p) or S-polarization (transmission characteristics of the curve 70s). Therefore, even when the light from of the light source group 402 (i.e., the green light) has the light of P-polarization or S-polarization, the light is reflected by the color separation filter 417g. Moreover, the color separation filter 417g transmits light whose wavelength is 590 nm or more, and therefore transmits the red light from the color separation filter 417r. In this way, the green light from the light source group 402g is combined with the red light from the color separation filter 417r on the same light path.

In this regard, the characteristics of the color separation filter 417g is not limited to the characteristics shown in FIG. 21. For example, the characteristics of the color separation filter 417g may be such that the characteristics of the color separation filter 417r (FIG. 20) is shifted to the shorter wavelength side by 40 nm.

Returning to FIG. 19, the light source group 402b includes a plurality of light sources 412b. Here, the number of the light sources 412b is three. Each light source 412b is constituted by, for example a blue LD, and emits a light flux having a peak wavelength of approximately 450 nm (i.e., blue light). The light fluxes emitted by the light sources 412b have P-polarization or S-polarization. The light sources 412b have optical axes in the X direction. The light sources 412b are arranged in a row in the Z direction. Moreover, the parallelizing lenses 414b are provided at emission sides (i.e., the −X direction side) of the light sources 412b. The parallelizing lenses 414b make light fluxes emitted by the respective light sources 412b into the parallel light fluxes 416b.

A color separation filter 417b as a polarization separation element (i.e., a second selective transmission element) is provided at a position where the light fluxes (i.e., the blue light fluxes) emitted by the light sources 412b of the light source group 402b and the light fluxes (i.e., the red light fluxes and the green light fluxes) combined with the color separation filter 417g described above and proceeding in the +Z direction intersect each other. Here, the "intersecting position" is a position where the single color separation filter 417b transmits the light fluxes combined by the color separation filter 417g and proceeding in the +Z direction, and reflects the light fluxes 416b so as to make a single light flux.

The color separation filter 417b reflects the light fluxes emitted by the respective light sources 412b of the light source group 402b and transmits the light fluxes combined by the color separation filter 417g and proceeding in the +Z direction. The blue light emitted by the respective light sources 412b of the light source group 402b and passing through the parallelizing lens 414b is combined with the red light and the green light from the above-described color separation filter 417g, and proceeds in the +Z direction. In this way, the blue light, the green light and the red light combined by the color separation filter 417b are incident on the condenser lens 4.

FIG. 22 is a view showing transmission characteristics of the blue color separation filter 417b. A curve 80a shown by a solid line in FIG. 22 represents a light intensity distribution of blue light whose peak wavelength is of 450 nm. A curve 80p shown by a broken line represents transmission characteristics for light of P-polarization. The color separation filter 417b transmits light of P-polarization having a wavelength of 470 nm or more. A curve 80s shown by a chain line represents transmission characteristics for light of S-polarization. The color separation filter 417b transmits the light of S-polarization having a wavelength of 510 nm or more. The color separation filter 417b has transmittance of approximately 0% either in case where the light has P-polarization (i.e., transmission characteristics of the curve 80p) or S-polarization (i.e., transmission characteristics of 80s of curves). Therefore, even when the light flux (i.e., the blue light flux) from the light source group 402b has P-polarization or S-polarization, the light flux is reflected. Moreover, the color separation filter 417b transmits light having a wavelength of 510 nm or more, and therefore transmits the red light and the green light from the color separation filter 417g. In this way, the blue light from the light source group 402b is combined with the red light and the green light from the color separation filter 417g on the same light path.

Therefore, according to Embodiment 8, the light source groups 402r, 402g and 402b are arranged along the proceeding direction (i.e., the +Z direction) of the light fluxes emitted by the light source group 402a. Moreover, the light fluxes of the light source groups 402a, 402r, 402g and 402b are combined by the color separation filters 417r, 417g and 417b. For this reason, the red light, the green light and the blue light can be combined, and high brightness can be achieved. Moreover, light use efficiency can be enhanced by use of the color separation filters 417r, 417g, and 417b.

Here, three light source groups 402r, 402g and 402b (i.e., the second light source group 402r, the third light source group 402g, and the fourth light source group 402b) are arranged along the proceeding direction (i.e., the +Z direction) of the light emitted by the light source group 402a (i.e., the first light source group). However, the number of the arranged light source groups is not only three. The number need only be one or more.

Figure 23:
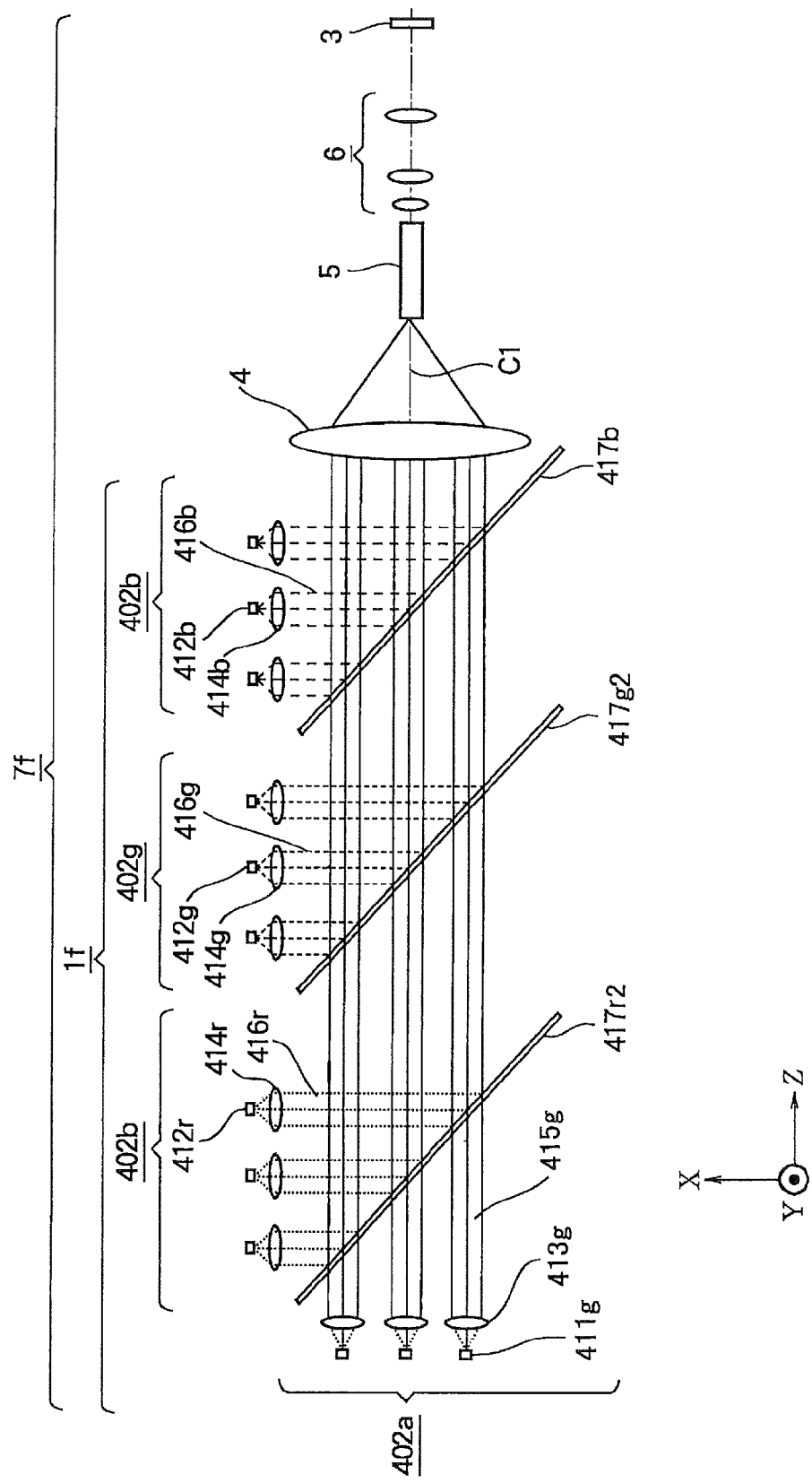
FIG. 23 is a view schematically showing another configuration example of the projection-type display apparatus including the light source device according to Embodiment 8 of the present invention.

In this embodiment, description has been made to the case where the red light of P-polarization of the red light of S-polarization were combined. However, it is also possible to combine the green light of P-polarization and the green light of S-polarization. FIG. 23 is a schematic view showing a configuration in that case. Unlike in the light source device 1f of FIG. 19, the light sources 412r may emit either the light of P-polarization or the light of S-polarization. Furthermore, in the light source device 1f of FIG. 23, light sources 411g that emit green light of P-polarization are provided, instead of the light sources 411r of the light source device 1f of FIG. 19.

The color separation filter 417r2 need only have the same characteristics as that of the color separation filter 317r (FIG. 13) of Embodiment 7. As shown in FIG. 16, the red light (640 nm) is reflected in either case where the red light has P-polarization or S-polarization. Furthermore, the green light 411g of P-polarization whose peak wavelength is 530 nm passes since the wavelength is less than 600 nm or less. That is, the color separation filter 417r2 transmits the green light emitted by the respective light sources 411g of the light source group 402a, and reflects the red light emitted by the respective light sources 412r of the light source group 402b. That is, the red light and the green light are combined by the color separation filter 417r2.

Next, combined light of the red light and the green light is incident on the color separation filter 417g2. Green light (i.e., parallel light fluxes 416g) emitted by the respective light sources 412g of the light source group 402g are also incident on the color separation filter 417g2.

Figure 24:
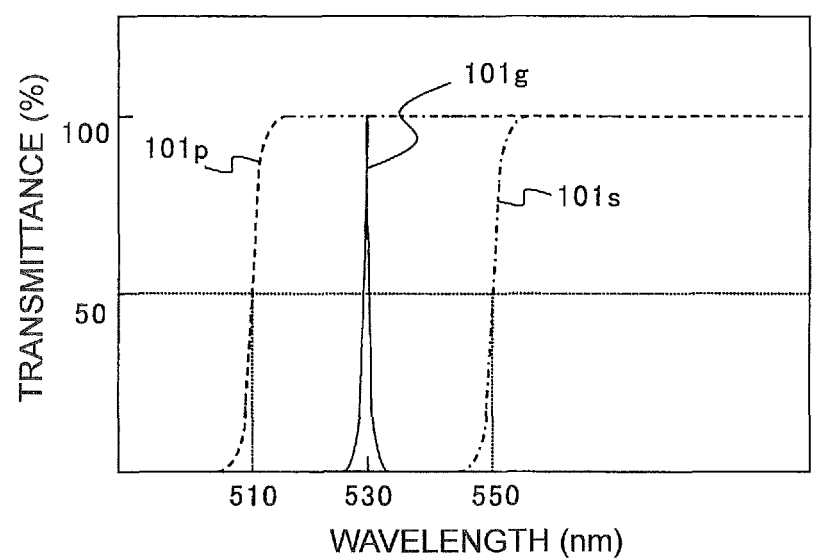
FIG. 24 is a view showing transmission characteristics of a color separation filter 417g2 of the light source device according to Embodiment 8 of the present invention.

FIG. 24 shows characteristics of the color separation filter 417g2. A curve 101g shown by a solid line in FIG. 24 represents a light intensity distribution of green light whose peak wavelength is 530 nm. A curve 101p shown by a broken line represents a transmission characteristics for light of P-polarization. The color separation filter 417g2 transmits the light of P-polarization having a wavelength of 510 nm or more. A curve 101s shown by a chain line represents transmission characteristics for light of S-polarization. The color separation filter 417g2 transmits the light of S-polarization having a wavelength of 550 nm or more. Since the color separation filter 417g2 transmits light having a wavelength of 550 nm or more, the color separation filter 417g2 transmits the red light. The light of the light sources 411g whose peak wavelength is 530 nm transmits the color separation filter 417g2, since the light has P-polarization. As for the light of the light sources 412g having the peak wavelength in 530 nm, the light of S-polarization is reflected by the color separation filter 417g2. Therefore, the light sources 411g are configured to emit the light of P-polarization, so that the color separation filter 417g2 transmits the green light of the light sources 411g. The light sources 412g are configured to emit the light of S-polarization, so that the color separation filter 417g2 reflects the green light of the light sources 412g. Therefore, the red light, the green light of P-polarization and the green light of S-polarization are combined.

The light combined by the color separation filter 417g2 is incident on the color separation filter 417b. Blue light (i.e., the parallel light fluxes 416b) emitted by the light source 412b of the light source group 402b are also incident on the color separation filter 417b. The configuration of the color separation filter 417b is as described in Embodiment 8. In this way, the combined red and green light is further combined with the blue light by the color separation filter 417b, the light of three colors is incident on the condenser lens 4.

In this regard, the polarization separation element is used as the selective transmission element in Embodiment 8. However, if an arrangement of respective light fluxes is chosen appropriately, it is also possible to use a transmitting-reflecting element as the selective transmission element.

Embodiment 9

Figure 25:
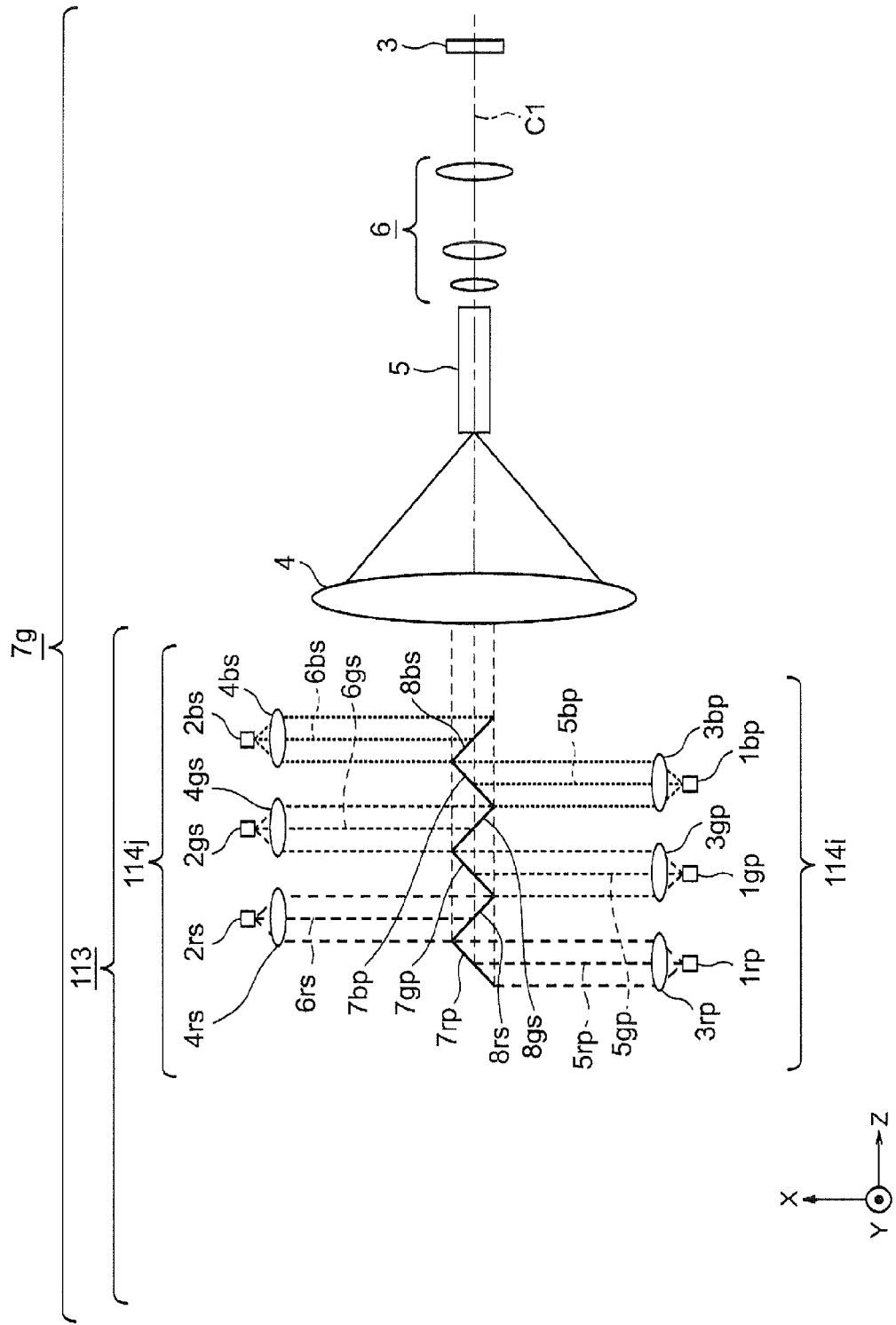
FIG. 25 is a view showing a configuration of a projection-type display apparatus including a light source device according to Embodiment 9 of the present invention.

FIG. 25 is a schematic view showing a configuration of a projection-type display apparatus 7g including a light source device 113 according to Embodiment 9 of the present invention. FIG. 26(A) is a schematic view showing a positional relationship of light sources and color separation filters as seen from the −X direction. FIG. 26(B) is a schematic showing incident positions of light fluxes W1, W2 and W3 on the condensing lens 4 as seen from +Z direction.

In the projection-type display apparatus 7g, the components on the emission side of the light source device 113 are the same as those described in Embodiment 1. The components on the emission side of the light source device are components from the condensing lens 4 to the screen 9 shown in FIG. 1. That is, the components on the emission side of the light source device are the condenser lens 4, the light intensity equalizing element 5, the relay lens group 6, the image display element 3, the projection optical system 8, and the screen 9. In this regard, in FIG. 25, the projection optical system 8 and the screen 9 are omitted.

As shown in FIG. 25, the light source device 113 of the projection-type display apparatus 7g of Embodiment 9 includes a first light source group 114i and a second light source group 114j.

The first light source group 114i have optical axes in the X direction. The first light source group 114i includes a plurality of light sources 1rp, 1gp and 1bp. Respectively three light sources 1rp, 1gp and 1bp are arranged in the Y direction in the YZ plane. That is, three light sources 1rp are arranged in the Y direction. Three light sources 1gp are arranged in the Y direction. Three light sources 1bp are arranged in the Y direction.

The second light source group 114j has optical axes in the X direction. The second light source group 114j includes a plurality of light source 2rs, 2gs and 2bs. Respectively three light source 2rs, 2gs and 2bs are arranged in the Y direction in the YZ plane. That is, the light sources 2rs are arranged in the Y direction. The light sources 2gs are arranged in the Y direction. The light sources 2bs are arranged in the Y direction.

Here, the light sources 1rp and the light sources 2rs are red light sources. The light sources 1gp and light sources 2gs are green light sources. The light sources 1bp and light sources 2bs are blue light sources.

The light sources 1rp, 1gp and 1bp of the first light source group 114i are arranged in three rows in the Z direction and in a column in the Y direction. Moreover, the light sources 2rs, 2gs and 2bs of the second light source group 114j are also arranged in three rows in the Z direction and in a column in the Y direction. Here, the "row" is a line of the Y direction, and the "column" is a line of the Z direction.

Parallelizing lenses 3rp, 3gp and 3bp are provided on emission sides (i.e., the +X direction sides) of the light sources 1rp, 1gp and 1bp of the first light source group 114i. Color separation filters 7rp, 7gp and 7bp are provided on emission sides (i.e., the +X direction sides) of the parallelizing lenses 3rp, 3gp and 3bp. The color separation filters 7rp, 7gp and 7bp reflect the parallel light fluxes 5rp, 5gp and 5bp of the light sources 1rp, 1gp and 1bp in a direction toward the condenser lens 4 (the +Z direction).

Moreover, the color separation filters 7rp, 7gp and 7bp transmit light of specific wavelengths. That is, the color separation filters 7rp, 7gp and 7bp have function to transmit or reflect light depending on its wavelength. In this regard, the color separation filters 7rp, 7gp and 7bp may have a polarization separating function. The polarization separating function is a function to transmit or reflect light depending on its polarization direction. Moreover, the color separation filter 7rp need only have reflecting function. This is because the color separation filter Trp reflects the parallel light fluxes 5rp to the condenser lens 4, and does not transmit other light.

Parallelizing lenses 4rs, 4gs and 4bs are provided on emission sides (i.e., the −X direction sides) of the light source 2rs, 2gs and 2bs of the second light source group 114j. Color separation filters 8rs, 8gs and 8bs are provided on emission sides (i.e., the −X direction sides) of the parallelizing lenses 4rs, 4gs and 4bs. The color separation filters 8rs, 8gs and 8bs reflect parallel light fluxes 6rs, 6gs, and 6bs of the light source 2rs, 2gs and 2bs in the direction toward the condenser lens 4 (the +Z direction). The color separation filters 8rs, 8gs and 8bs have polarization separating function. Moreover, the color separation filter 8rs, 8gs and 8bs transmit light of specific wavelengths. That is, the color separation filters 8rs, 8gs and 8bs have function to transmit or reflect light depending on the polarization direction and the wavelength of the light.

The color separation filters 7rp, 7gp, 7bp, 8rs, 8gs and 8bs have plate shapes. The color separation filters 7rp, 7gp and 7bp are provided in parallel to a plane obtained by rotating the XY plane by 45 degrees clockwise as seen from the +Y direction. The color separation filters 8rs, 8gs and 8bs are provided in parallel to a plane obtained by rotating the XY plane by 45 degrees counterclockwise as seen from the +Y direction.

An end surface of the color separation filter Trp in the +Z direction is connected to an end surface of the color separation filter 8rs in the −Z direction. An end surface of the color separation filter 8rs in the +Z direction is connected to an end surface of the color separation filter 7gp in the −Z direction. An end surface of the color separation filter 7gp in the +Z direction is connected to an end surface of the −Z direction of the color separation filter 8gs. The end surface of the color separation filter 8gs in the +Z direction is connected to an end surface of the color separation filter 7bp in the −Z direction. An end surface of the color separation filter 7bp in the +Z direction is connected to an end surface of the color separation filter 8bs in the −Z direction.

The respective color separation filters are connected in this way for the purpose of reducing the size of the light source device 113 in the Z direction. The respective color separation filters are not necessarily connected in terms of superimposing the light fluxes from the respective light sources. Embodiment 9 will be described using an example of a configuration advantageous for reducing the size of the light source device 113.

Moreover, the color separation filters 7rp, 7gp, 7bp, 8rs, 8gs and 8bs are arranged on the same optical axis. In FIG. 25, the color separation filters 7rp, 7gp, 7bp, 8rs, 8gs and 8bs are arranged on the optical axis C1. That is, centers on planes of the color separation filters 7rp, 7gp, 7bp, 8rs, 8gs and 8bs are located on the optical axis C1.

Here, characteristics of the color separation filters 7rp, 7gp, 7bp, 8rs, 8gs and 8bs will be described. The color separation filter Trp is, for example, a reflecting film that reflects red light whose peak wavelength is approximately 640 nm. For example, the color separation filter Trp has transmission characteristics shown in FIG. 16. The color separation filter of FIG. 16 transmits the light of S-polarization whose wavelength is 560 nm or less, and reflects the light of P-polarization whose wavelength is 600 nm or less.

The color separation filter 7gp transmits the red light whose wavelength is approximately 640 nm, and reflects the green light whose peak wavelength is approximately 530 nm, for example. For example, the color separation filter 7gp has the transmission characteristics shown in FIG. 21. The color separation filter of FIG. 21 reflects the light of S-polarization whose wavelength is 590 nm or more, and transmits the light of P-polarization whose wavelength is 550 nm or more.

The color separation filter 7bp transmits the red light whose peak wavelength is approximately 640 nm and the green light whose peak wavelength is approximately 530 nm, and reflects the blue light whose peak wavelength is approximately 450 nm, for example. For example, the color separation filter 7bp has the transmission characteristics shown in FIG. 22. The color separation filter of FIG. 22 transmits the light of S-polarization whose wavelength is 510 nm or more, and reflects the light of P-polarization whose wavelength is 470 nm or more.

Moreover, the color separation filter 8rs transmits the red light of P-polarization whose peak wavelength is approximately 640 nm, and reflects the red light of S-polarization whose peak wavelength is approximately 640 nm, for example. For example, the color separation filter 8*rs* has the transmission characteristics shown in FIG. 20. The color separation filter of FIG. 20 transmits the light of S-polarization whose peak wavelength is 660 nm or more, and transmits the light of P-polarization whose wavelength is 620 nm or more.

The color separation filter 8*gs* transmits the red light whose peak wavelength is approximately 640 nm, and reflects the green light of S-polarization, for example. For example, the color separation filter 8*gs* has the transmission characteristics shown in FIG. 24. The color separation filter of FIG. 24 transmits the light of S-polarization whose wavelength is 550 nm or more, and transmits the light of P-polarization whose wavelength is 510 nm or more.

The color separation filter 8*bs* transmits the red light whose peak wavelength is approximately 640 nm and the green light whose peak wavelength is approximately 530 nm, and reflects the blue light of S-polarization whose peak wavelength is approximately 450 nm. For example, the color separation filter 8*bs* has the transmission characteristics shown in FIG. 27. The color separation filter of FIG. 27 transmits the light of S-polarization whose peak wavelength is 460 nm or more, and transmits the light of P-polarization whose wavelength is 430 nm or more.

Figure 27:
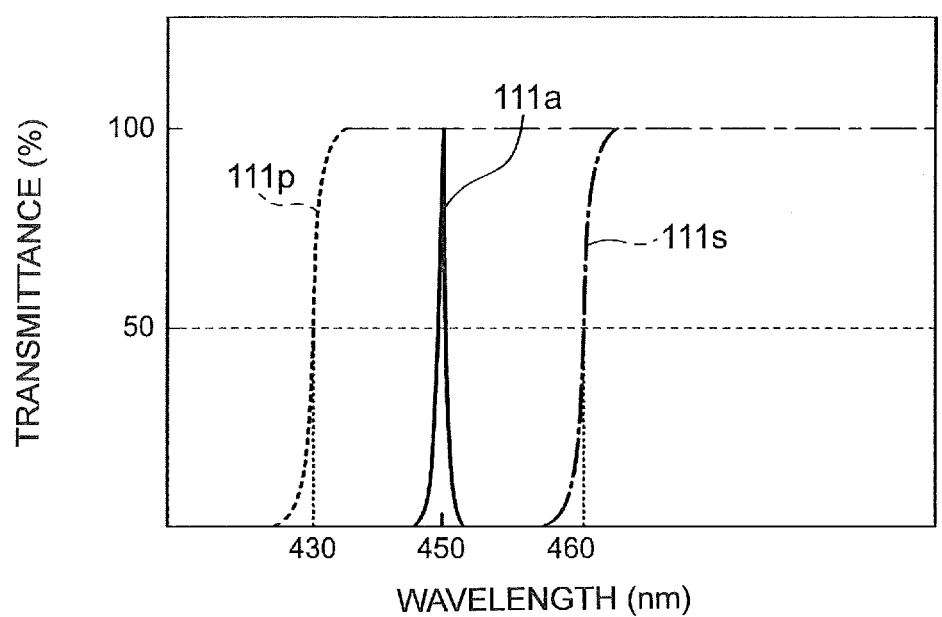
FIG. 27 is a view showing transmission characteristics of a color separation filter of the light source device according to Embodiment 9 of the present invention.

FIG. 27 is a view showing transmission characteristics of the color separation filter. A curve 111*a* shown by a solid line in FIG. 27 represents a light intensity distribution of a blue light whose peak wavelength is 450 nm. A curve 111*p* shown by a broken line represents transmission characteristics for light of P-polarization. A curve 111 shown by a chain line represent transmission characteristics for light of S-polarization. With such characteristics, the color separation filter transmits the blue light of P-polarization whose peak wavelength is 450 nm, and reflects the blue light of S-polarization whose peak wavelength is 450 nm.

According to the transmission characteristics of the color separation filter of FIG. 27, the color separation filter transmits the light whose wavelength is 460 nm or more, and therefore the color separation filter transmits the red light and the green light. Moreover, the color separation filter transmits the light of P-polarization whose wavelength is 430 nm or more, and therefore the color separation filter transmits the blue light of P-polarization whose peak wavelength is 450 nm, and reflects the blue light of S-polarization whose peak wavelength is 450 nm.

Referring back to FIG. 25, the light source 2*rs* emits the light whose polarization direction is different from the polarization direction of the light of the light source 1*rp* by 90 degrees. The light source 2*gs* emits the light whose polarization direction is different from the polarization direction of the light of the light source 1*gp* by 90 degrees. The light source 2*bs* emits the light whose polarization direction is different from the polarization direction of the light of the light source 1*bp* by 90 degrees.

The parallel light flux 5*rp* emitted by the light source 1*rp* is reflected by the color separation filter Trp toward the condenser lens 4. The parallel light flux 6*rs* emitted by light source 2*rs* is reflected by the color separation filter 8*rs* toward the condenser lens 4. The parallel light flux 5*rp* reflected by the color separation filter Trp transmits the color separation filter 8*rs* based on the polarization direction of the light. The parallel light fluxes 5*rp* and 6*rs* correspond to light of a first wavelength band.

The Parallel light flux 5*gp* emitted by the light source 1*gp* is reflected by color separation filter 7*gp* toward the condenser lens 4. The parallel light flux 6*gs* emitted by light source 2*gs* is reflected by color separation filter 8*gs* toward the condenser lens 4. The parallel light flux 5*gp* reflected by the color separation filter 7*gp* transmits the color separation filter 8*gs* based on the polarization direction of the light. The parallel light fluxes 5*gp* and 6*gs* correspond to light of a second wavelength band. The parallel light fluxes 5*rp* and 6*rs* transmit the color separation filters 7*gp* and 8*gs* based on the wavelength band of the light.

The parallel light flux 5*bp* emitted by the light source 1*bp* is reflected by color separation filter 7*bp* toward the condenser lens 4. The parallel light flux 6*bs* emitted by light source 2*bs* is reflected by color separation filter 8*bs* toward the condenser lens 4. The parallel light flux 5*bp* reflected by the color separation filter 7*bp* transmits the color separation filter 8*bs* based on the polarization direction of the light. The parallel light fluxes 5*bp* and 6*bs* correspond to light of a third wavelength band. The parallel light fluxes 5*rp* and 6*rs* and the parallel light fluxes 5*gp* and 6*gs* pass through the color separation filters 7*bp* and 8*bs* based on the wavelength band of the light.

The parallel light flux 5*rp*, the parallel light flux 6*rs* and the parallel light flux 5*gp* passing through the color separation filter 8*gs*, and the parallel light flux 6*gs* reflected by the color separation filter 8*gs* proceed in the same direction. That is, the parallel light flux 5*rp*, the parallel light flux 6*rs* and the parallel light flux 5*gp* passing through the color separation filter 8*gs*, and the parallel light flux 6*gs* reflected by the color separation filter 8*gs* proceed toward the condenser lens 4.

Moreover, the parallel light flux 5*rp*, parallel light flux 6*rs*, parallel light flux 5*gp*, parallel light flux 6*gs* and parallel light flux 5*bp* passing through the color separation filter 8*bs*, and the parallel light flux 6*bs* reflected by the color separation filter 8*bs* proceed in the same direction. That is, parallel light flux 5*rp* parallel light flux 6*rs*, parallel light flux 5*gp*, parallel light flux 6*gs* and parallel light flux 5*bp* passing through the color separation filter 8*bs*, and the parallel light flux 6*bs* reflected by the color separation filter 8*bs* proceed toward the condenser lens 4.

Light source group Z1, Z2 and Z3 shown in FIG. 26(A) are groups obtained by grouping the light sources 1*rp*, 1*gp*, 1*bp*, 2*rs*, 2*gs* and 2*bs* based on positions in the Y direction. Respectively three light sources 1*rp*, 1*gp*, 1*bp*, 2*rs*, 2*gs* and 2*bs* are arranged in the Y direction.

The light fluxes 5*rp*, 5*gp*, 5*bp*, 6*rs*, 6*gs* and 6*bs* emitted by the light sources 1*rp*, 1*gp*, 1*bp*, 2*rs*, 2*gs* and 2*bs* of the light source group Z1 shown in FIG. 26(A) are reflected by or pass through the color separation filters Trp, 7*gp*, 7*bp*, 8*rs*, 8*gs* and 8*bs*, and proceed in the +Z direction. The positions of the reflected or transmitted light fluxes 5*rp*, 5*gp*, 5*bp*, 6*rs*, 6*gs* and 6*bs* in the X direction are the same, and therefore the light fluxes 5*rp*, 5*gp*, 5*bp*, 6*rs*, 6*gs* and 6*bs* are superimposed, and form a white light flux W1.

That is, when the light fluxes 5*rp*, 5*gp* and 6*rs* emitted by the light source group Z1 and passing through the color separation filter 8*gs*, and the light flux 6*gs* reflected by the color separation filter 8*gs* proceed in the same direction and are superimposed on each other. Moreover, when the light fluxes 5*rp*, 5*gp*, 5*bp*, 6*rs*, 6*gs* emitted by the light source group Z1 and passing through the color separation filter 8*bs*, and the light flux 6*bs* reflected by the color separation filter 8*bs* proceed in the same direction and are superimposed on each other. The superimposed light fluxes form the white light flux W1.

Light fluxes 5*rp*, 5*gp*, 5*bp*, 6*rs*, 6*gs* and 6*bs* emitted by the light sources 1*rp*, 1*gp*, 1*bp*, 2*rs*, 2*gs*, 2*bs* of the light source group Z2 shown in FIG. 26(A) are reflected by or pass through the color separation filter Trp, 7*gp*, 7*bp*, 8*rs*, 8*gs* and 8*bs*, and proceed in the +Z direction. Positions of the reflected or transmitted light fluxes 5*rp*, 5*gp*, 5*bp*, 6*rs*, 6*gs*, and 6*bs* in the X direction are the same, and therefore the light fluxes 5*rp*, 5*gp*, 5*bp*, 6*rs*, 6*gs* and 6*bs* are superimposed on each other to form the white light flux W2.

That is, the light fluxes 5*rp*, 5*gp* and 6*rs* emitted by the light source group Z2 and passing through the color separation filter 8*gs*, and the light flux 6*gs* reflected by the color separation filter 8*gs* proceeding in the same direction, and are superimposed on each other. Moreover, the light fluxes 5*rp*, 5*gp*, 5*bp*, 6*rs* and 6*gs*, emitted by the light source group Z2 and passing through the color separation filter 8*bs*, and the light flux 6*bs* reflected by the color separation filter 8*bs* proceed in the same direction, and are superimposed on each other. The superimposed light fluxes form the white light flux W2.

The light fluxes 5*rp*, 5*gp*, 5*bp*, 6*rs*, 6*gs* and 6*bs* emitted by the light sources 1*rp*, 1*gp*, 1*bp*, 2*rs*, 2*gs* and 2*bs* of the light source group Z3 shown in FIG. 26(A) are reflected by or pass through the color separation filter Trp, 7*gp*, 7*bp*, 8*rs*, 8*gs* and 8*bs*, and proceed in the +Z direction. Positions of the reflected or transmitted light flux 5*rp*, 5*gp*, 5*bp*, 6*rs*, 6*gs*, and 6*bs* are the same, and therefore the light fluxes 5*rp*, 5*gp*, 5*bp*, 6*rs*, 6*gs* and 6*bs* are superimposed on each other to form a white light flux W3.

That is, the light fluxes 5*rp*, 5*gp* and 6*rs* emitted by the light source group Z3 and passing through the color separation filter 8*gs*, and the light flux 6*gs* reflected by the color separation filter 8*gs* proceed in the same direction, and are superimposed on each other. Moreover, the light fluxes 5*rp*, 5*gp*, 5*bp*, 6*rs* and 6*gs* emitted by the light source group Z3 and passing through the color separation filter 8*b*, and the light flux 6*bs* reflected by the color separation filter 8*bs* proceed in the same direction, and are superimposed. The superimposed light fluxes form the white light flux W3.

Moreover, constant intervals are provided between the superimposed light fluxes 5*rp*, 5*gp*, 6*rs* and 6*gs* emitted by the light source group Z1, the superimposed light fluxes 5*rp*, 5*gp*, 6*rs* and 6*gs* emitted by the light source group Z2, and the superimposed light fluxes 5*rp*, 5*gp*, 6*rs* and 6*gs* emitted by the light source group Z3. Moreover, constant intervals are provided the superimposed light flux 5*rp*, 5*gp*, 5*bp*, 6*rs*, 6*gs* and 6*bs* emitted by the light source group Z1, the superimposed light flux 5*rp*, 5*gp*, 5*bp*, 6*rs*, 6*gs* and 6*bs* emitted by the light source group Z2, and the superimposed light flux 5*rp*, 5*gp*, 5*bp*, 6*rs*, 6*gs* and 6*bs* emitted by the light source group Z3.

Moreover, the light sources of Embodiment 9 are arranged in the order of the light sources 1*rp* and 2*rs*, the light sources 1*gp* and 2*gs*, and the light sources 1*bp* and 2*bs* from −Z direction. The light sources 1*rp* and 2*rs* are light sources that emit red light. The light sources 1*gp* and 2*gs* are light sources that emit green light. The light sources 1*bp* and 2*bs* are light sources that emit blue light.

However, the light sources that emit red light, the light sources that emit green light and the light sources that emit blue light may be arranged in any order. For example, the light sources may be arranged in the order of the light sources 1*bp* and 2*bs*, the light sources 1*gp* and 2*gs*, and the light sources 1*rp* and 2*rs* from −Z direction. By appropriately setting the characteristics of the color separation filter Trp, 7*gp*, 7*bp*, 8*rs*, 8*gs* and 8*bs*, the transmission and reflection of light described in Embodiment 9 can be achieved, and the same effect can be obtained.

In this embodiment, three colors, i.e., the red color, the green color and the blue color can be combined without expanding the light flux in the X direction as shown in FIG. 25 and FIG. 26(B), and therefore light use efficiency can be enhanced. The expression "without expanding in the X direction" means that a width of the light flux incident on the condenser lens 4 in the X direction on the XY plane is the same as a width of each of the parallel light fluxes 5*rp*, 5*gp*, 5*bp*, 6*rs*, 6*gs* and 6*bs* in the Z direction on the YZ plane. That is, it is the same as each of widths of the parallel light fluxes 5*rp*, 5*gp*, 5*bp*, 6*rs*, 6*gs*, and 6*bs* in the Z direction on the YZ plane.

Moreover, the expression "light use efficiency is enhanced" means that brightness of the light flux becomes high. This means that high brightness is obtained. The "brightness" means brightness per unit area. This means brightness per unit area of a section of the light flux.

Moreover, in this embodiment, the light sources 1*rp*, 1*gp*, 1*bp*, 2*rs*, 2*gs* and 2*bs* are arranged in the order of the red light sources 1*rp* and 2*rs*, the green light sources 1*gp* and 2*gs* and the blue light sources 1*bp* and 2*bs* from the −Z direction. However, the same effect is obtained even when the light sources are arranged in the order of the red light sources 1*bp* and 2*bs*, the green light sources 1*gp* and 2*gs* and the blue light sources 1*rp* and 2*rs* from the −Z direction. In such a case, it is necessary to appropriately set the characteristics of the color separation filters. The expression "appropriately" means to be suitable for condition. That is, the characteristics of the color separation filters are set according to the arrangements of the light sources.

Embodiment 10

Figure 28:
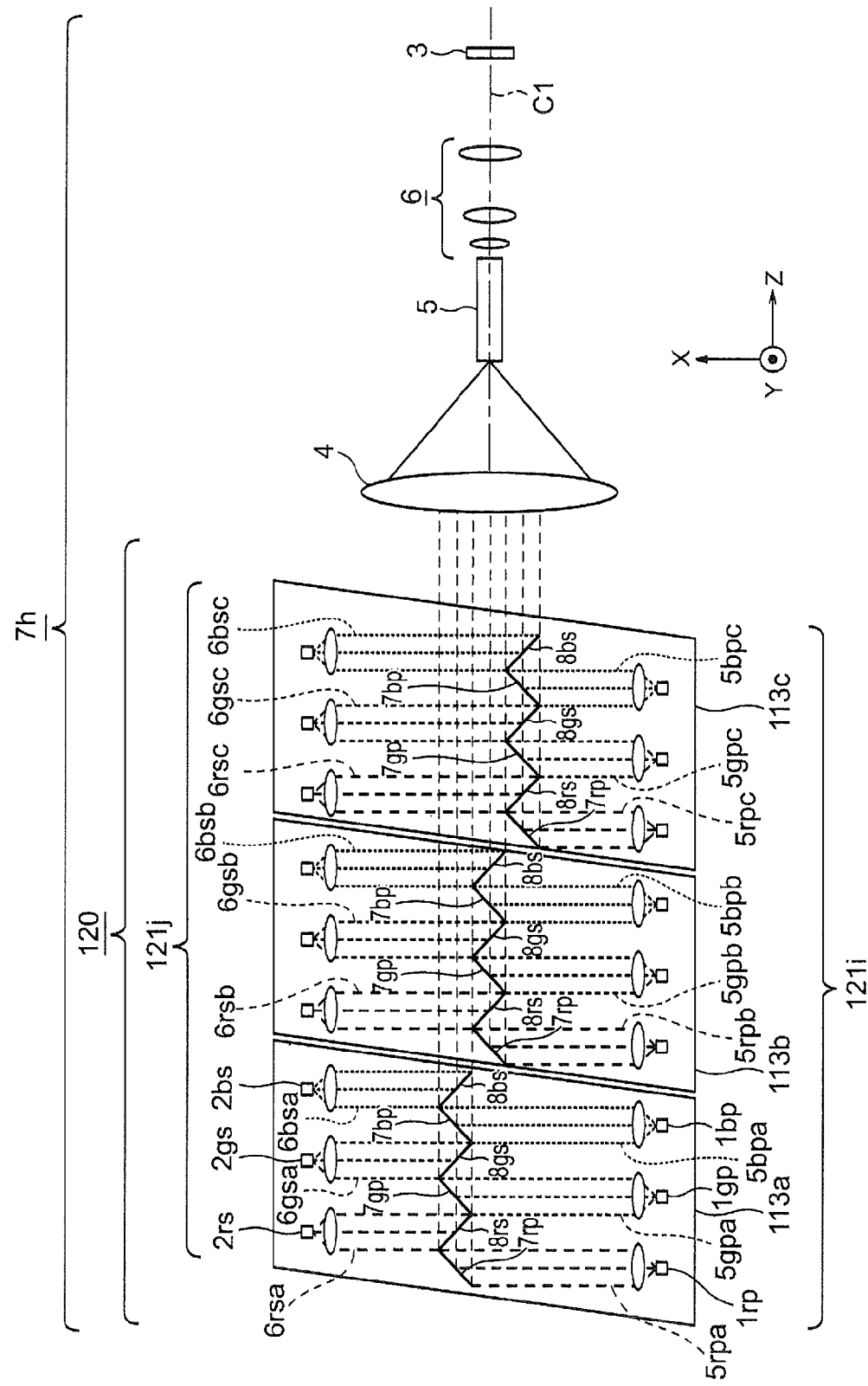
FIG. 28 is a view showing a configuration of a projection-type display apparatus including a light source device according to Embodiment 10 of the present invention.
Figure 29:
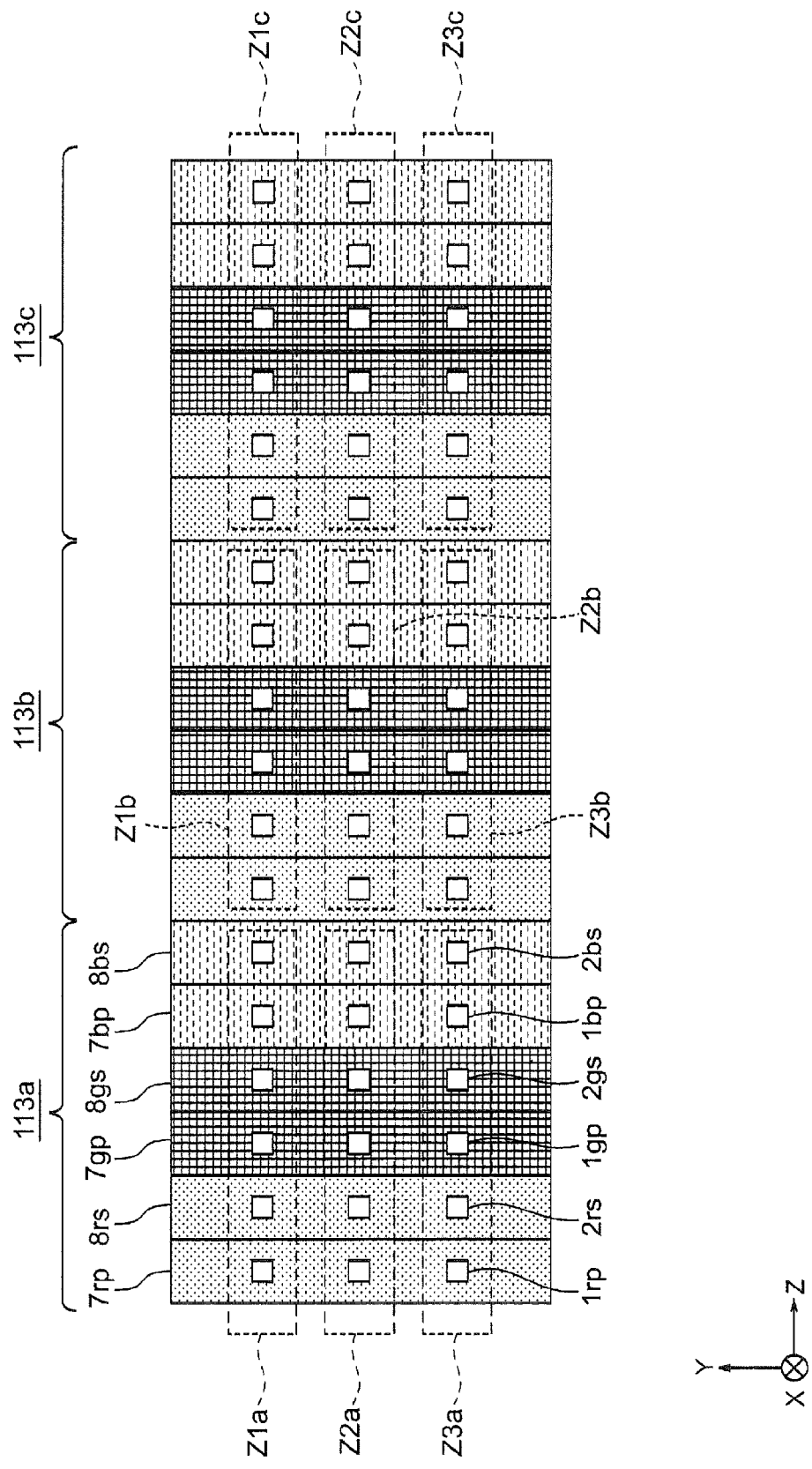
FIG. 29 is a schematic view showing a positional relationship of light sources and color separation filters according to Embodiment 10 of the present invention.
Figure 30:
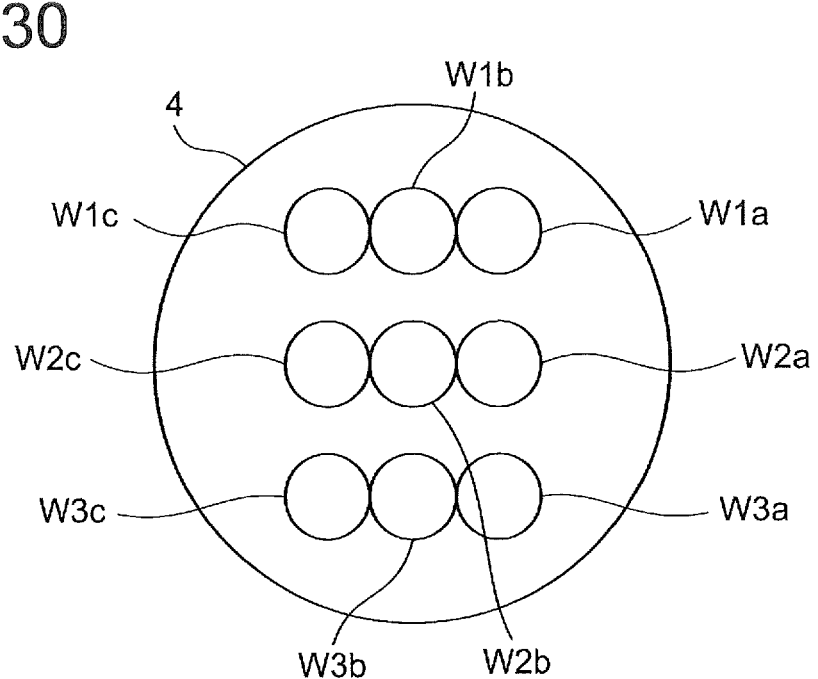
FIG. 30 is a schematic view showing an incidence position of a light flux on a condenser lens according to Embodiment 10 of the present invention.

FIG. 28 is a view showing a configuration of a projection-type display apparatus 7*h* including a light source device 120 according to Embodiment 10 of the present invention. FIG. 29 is a schematic view showing a positional relationship of light sources and color separation filters as seen from the −X direction. FIG. 30 is a schematic view showing incident positions of the light fluxes W1, W2*a*, W3*a*, W1*b*, W2*b*, W3*b*, W1*c*, W2*c* and W3*c* on the condenser lens 4 as seen from the +Z direction side.

In the projection-type display apparatus 7*h*, components on the emission side of the light source device 120 are the same as those of the components described in Embodiment 1. The components on the emission side of the light source device are those from the condenser lens 4 to the screen 9 in FIG. 1. That is, the components on the emission side of the light source device are the condenser lens 4, the light intensity equalizing element 5, the relay lens group 6, the image display element 3, the projection optical system 8 and the screen 9. In this regard, in FIG. 28, the projection optical system 8 and the screen 9 are omitted.

The light source device 120 of Embodiment 10 is configured to include a plurality of light source devices 113 of Embodiment 9. In Embodiment 10, three light source units 113*a*, 113*b* and 113*c* are provided. In FIG. 28, the first light source unit 113*a*, the second light source unit 113*b*, and the third light source unit 113*c* are arranged from the −Z direction side.

As shown in FIG. 28 and FIG. 29, the color separation filters 7*rp*, 7*gp*, 7*bp*, 8*rs*, 8*gs* and 8*bs* of the second light source unit 113*b* are provided at positions shifted in the −X direction with respect to the color separation filter 7*rp*, 7*gp*, 7*bp*, 8*rs*, 8*gs* and 8*bs* of the first light source unit 113*a*. A shifting amount corresponds to a width in the X direction on the XY plane of the light flux incident on the condenser lens 4. Moreover, an end of the color separation filter 8*bs* of the first light source unit 113*a* in the +Z direction is connected to an end of the color separation filter Trp of the second light source unit 113*b* in the −Z direction are provided in proximate positions as seen in the X direction.

The expression "proximate" means a close position. The expression "proximate" does not necessarily means contacting. Moreover, the expression "proximate" means that a gap between light fluxes is less than or equal to a width of the light flux.

Similarly, the color separation filters 7*rp*, 7*gp*, 7*bp*, 8*rs*, 8*gs* and 8*bs* of the third light source unit 113*c* are provided on positions shifted in the –X direction with respect to the color separation filters 7*rp*, 7*gp*, 7*bp*, 8*rs*, 8*gs* and 8*bs* of the second light source unit 113*b*. A shifted amount corresponds to a width in the X direction on the XY plane of the light flux incident on the condenser lens 4. Moreover, an end of the color separation filter 8*bs* of the second light source unit 113*b* in the +Z direction and an end of the color separation filter Trp of the third light source unit 113*c* in the –Z direction are located in proximate positions as seen in the X direction.

That is, the color separation filters 7*rp*, 7*gp*, 7*bp*, 8*rs*, 8*gs* and 8*bs* of the second light source unit 113*b* are shifted in the –X direction with respect to the color separation filters 7*rp*, 7*gp*, 7*bp*, 8*rs*, 8*gs* and 8*bs* of the first light source unit 113*a* by an amount corresponding to the width of the parallel light flux. Moreover, the color separation filter 7*rp*, 7*gp*, 7*bp*, 8*rs*, 8*gs* and 8*bs* of the third light source unit 113*c* are shifted in the –X direction with respect to the color separation filter 7*rp*, 7*gp*, 7*bp*, 8*rs*, 8*gs* and 8*bs* of the second light source unit 113*b* by an amount corresponding to the width of the parallel light flux.

The respective light sources 1*rp*, 1*gp* and 1*bp* of the first light source unit 113*a*, the second light source unit 113*b* and the third light source unit 113*c* are arranged in the Z direction without being shifted in the Y direction. The light source 2*rs*, 2*gs* and 2*bs* of the first light source unit 113*a*, the second light source unit 113*b* and the third light source unit 113*c* are arranged in the Z direction without being shifted in the Y direction.

The three light source units 113*a*, 113*b* and 113*c* have the same configuration except for the positions of the color separation filters 7*rp*, 7*gp*, 7*bp*, 8*rs*, 8*gs* and 8*bs* in the X direction. Therefore, a relationship of the light fluxes, the color separation filters and the condenser lens 4 will be described taking the case of the light source unit 113*a* as an example. Moreover, the color separation filter Trp need only have reflecting function as in Embodiment 9. This is because the color separation filter Trp only reflects the parallel light flux 5*rpa* toward the condenser lens 4, and does not transmit other light flux.

The light source unit 113*a* includes a first light source group 121*i* and a second light source group 121*j*. The first light source group 121*i* has optical axes in the X direction, and includes a plurality of light sources 1*rp*, 1*gp* and 1*bp* arranged in the YZ plane. The second light source group 121*j* has optical axes in the X direction, and includes a plurality of light sources 2*rs*, 2*gs* and 2*bs* arranged in the YZ plane.

The light source 2*rs* emits the light whose polarization direction is different from that of the light source 1*rp* by 90 degrees. The light source 2*gs* emits the light whose polarization direction is different from that of the light source 1*gp* by 90 degrees. The light source 2*bs* emits the light whose polarization direction is different from that of the light source 1*bp* by 90 degrees.

The parallel light flux 5*rpa* emitted by the light source 1*rp* is reflected by the color separation filter Trp toward the condenser lens 4. The parallel light flux 6*rsa* emitted by the light source 2*rs* is reflected by the color separation filter 8*rs* toward the condenser lens 4. The parallel light flux 5*rpa* reflected by the color separation filter Trp passes through the color separation filter 8*rs* based on the polarization direction of the light. The parallel light fluxes 5*rpa* and 6*rsa* correspond to light of the first wavelength band.

The parallel light flux 5*gpa* emitted by the light source 1*gp* is reflected by the color separation filter 7*gp* toward the condenser lens 4. The parallel light flux 6*gsa* emitted by the light source 2*gs* is reflected by the color separation filter 8*gs* toward the condenser lens 4. The parallel light flux 5*gpa* reflected by the color separation filter 7*gp* passes through the color separation filter 8*gs* based on the polarization direction of the light. The parallel light fluxes 5*gpa* and 6*gsa* correspond to light of the second wavelength band. The parallel light fluxes 5*rpa* and 6*rsa* pass through the color separation filters 7*gp* and 8*gs* based on the wavelength band of the light.

The parallel light flux 5*bpa* emitted by the light source 1*bp* is reflected by the color separation filter 7*bp* toward the condenser lens 4. The parallel light flux 6*bsa* emitted by light source 2*bs* is reflected by the color separation filter 8*bs* toward the condenser lens 4. The parallel light flux 5*bpa* reflected by the color separation filter 7*bp* passes through the color separation filter 8*bs* based on the polarization direction of the light. The parallel light fluxes 5*bpa* and 6*bsa* correspond to light of the third wavelength band. The parallel light fluxes 5*rpa* and 6*rsa* and the parallel light fluxes 5*gpa* and 6*gsa* pass through the color separation filters 7*bp* and 8*bs* based on the wavelength band of the light.

The parallel light flux 5*rpa*, the parallel light flux 6*rsa* and the parallel light flux 5*gpa* passing through the color separation filter 8*gs*, and the parallel light flux 6*gsa* reflected by the color separation filter 8*gs* proceed in the same direction. That is, the parallel light flux 5*rpa*, the parallel light flux 6*rsa* and the parallel light flux 5*gpa* passing through the color separation filter 8*gs*, and the parallel light flux 6*gsa* reflected by the color separation filter 8*gs* proceed toward the condenser lens 4.

Moreover, the parallel light flux 5*rpa*, the parallel light flux 6*rsa*, the parallel light flux 5*gpa*, the parallel light flux 6*gsa* and the parallel light flux 5*bpa* passing through the color separation filter 8*bs*, and the parallel light flux 6*bsa* reflected by the color separation filter 8*bs* proceed in the same direction. That is, the parallel light flux 5*rpa*, parallel light flux 6*rsa*, parallel light flux 5*gpa*, parallel light flux 6*gsa* and parallel light flux 5*bpa* passing through the color separation filter 8*bs*, and the parallel light flux 6*bsa* reflected by the color separation filter 8*bs* proceed toward the condenser lens 4.

As shown in FIG. 29, respectively three light sources 1*rp* and 2*rs*, respectively three light sources 1*gp* and 2*gs*, and respectively three light sources 1*bp* and 2*bs* are arranged in the Y directions. The light source unit 113*a* includes three light source groups Z1*a*, Z2*a* and Z3*a*. Each of the light source groups Z1*a*, Z2*a* and Z3*a* includes light sources 1*rp*, 2*rs*, 1*gp*, 2*gs*, 1*bp* and 2*bs* arranged in the Z direction. The light source 1*rp*, 2*rs*, 1*gp*, 2*gs*, 1*bp* and 2*bs* of each of the light source groups Z1*a*, Z2*a* and Z3*a* have the same positions in the X direction and the same positions in the Y direction. The three light source groups Z1*a*, Z2*a* and Z3*a* are arranged in the order of the light source group Za1, the light source group Z2*a* and the light source group Z3*a* from the +Y direction side toward the –Y direction side.

In the light source units 113*a*, the parallel light fluxes 5*rpa*, 5*gpa*, 5*bpa*, 6*rsa*, 6*gsa* and 6*bsa* emitted by the light source group Z1*a* are reflected by or pass through the color separation filters Trp, 7*gp*, 7*bp*, 8*rs*, 8*gs* and 8*bs*, and proceed in the +Z direction. The respective parallel light fluxes 5*rpa*, 5*gpa*, 5*bpa*, 6*rsa*, 6*gsa* and 6*bsa* form a white light flux W1*a*.

That is, the light fluxes 5*rpa*, 5*gpa* and 6*rsa* emitted by the light source group Z1*a* and passing through the color separation filter 8*gs*, and the light flux 6*gsa* reflected by the color separation filter 8*gs* proceed in the same direction, and are superimposed on each other. Moreover, the light fluxes 5*rpa*

5*gpa*, 5*bpa*, 6*rsa* and 6*gsa* emitted by the light source group Z1*a* and passing through the color separation filter 8*bs*, and the light flux 6*bsa* reflected by the color separation filter 8*bs* proceed in the same direction, and are superimposed on each other. The superimposed light fluxes form the white light flux W1*a*.

Similarly, the parallel light fluxes 5*rpa*, 5*gpa*, 5*bpa*, 6*rsa*, 6*gsa* and 6*bsa* emitted by the light source group Z2*a* are reflected by or pass through the color separation filters 7*rp*, 7*gp*, 7*bp*, 8*rs*, 8*gs* and 8*bs*, and proceed in the +Z direction. The parallel light fluxes 5*rpa*, 5*gpa*, 5*bpa*, 6*rsa*, 6*gsa* and 6*bsa* are superimposed on each other to form a white light flux W2*a*.

That is, the light fluxes 5*rpa*, 5*gpa* and 6*rsa* emitted by the light source group Z2*a* and passing through the color separation filter 8*gs*, and the light flux 6*gsa* reflected by the color separation filter 8*gs* proceed in the same direction, and are superimposed on each other. Moreover, the light fluxes 5*rpa*, 5*gpa*, 5*bpa*, 6*rsa* and 6*gsa* emitted by the light source group Z2*a* and passing through the color separation filter 8*bs* and the light flux 6*bsa* reflected by the color separation filter 8*bs* proceed in the same direction, and are superimposed on each other. The superimposed light fluxes form the white light flux W2*a*.

Moreover, the parallel light fluxes 5*rpa*, 5*gpa*, 5*bpa*, 6*rsa*, 6*gsa* and 6*bsa* emitted by the light source group Z3 are reflected by or pass through the color separation filters 7*rp*, 7*gp*, 7*bp*, 8*rs*, 8*gs* and 8*bs*, and proceed in the +Z direction. The respective parallel light fluxes 5*rpa*, 5*gpa*, 5*bpa*, 6*rsa*, 6*gsa* and 6*bsa* are superimposed on each other, and form a white light flux W3*a*.

That is, the light fluxes 5*rpa*, 5*gpa* and 6*rsa* emitted by the light source group Z3*a* and passing through the color separation filter 8*gs*, and the light flux 6*gsa* reflected by the color separation filter 8*gs* proceed in the same direction, and are superimposed on each other. Moreover, the light fluxes 5*rpa*, 5*gpa*, 5*bpa*, 6*rsa* and 6*gsa* emitted by the light source group Z3*a* and passing through the color separation filter 8*bs*, and the light flux 6*bsa* reflected by the color separation filter 8*bs* proceed in the same direction, and are superimposed on each other. The superimposed light fluxes form the white light flux W3*a*.

Moreover, there are certain intervals between the superimposed light fluxes 5*rpa*, 5*gpa*, 6*rsa* and 6*gsa* emitted from the light source group Z1*a*, the superimposed light fluxes 5*rpa*, 5*gpa*, 6*rsa* and 6*gsa* emitted from the light source group Z2*a* and superimposed, and the superimposed light fluxes 5*rpa*, 5*gpa*, 6*rsa* and 6*gsa* emitted from the light source group Z3*a*. Moreover, there are certain intervals the superimposed light fluxes 5*rpa*, 5*gpa*, 5*bpa*, 6*rsa*, 6*gsa* and 6*bsa* emitted from the light source group Z1*a*, the superimposed light fluxes 5*rpa*, 5*gpa*, 5*bpa*, 6*rsa*, 6*gsa* and 6*bsa* emitted from the light source group Z2*a*, and the superimposed light fluxes 5*rpa*, 5*gpa*, 5*bpa*, 6*rsa*, 6*gsa* and 6*bsa* emitted from the light source group Z3*a*.

Similarly, in the light source unit 113*b*, the parallel light fluxes 5*rpb*, 5*gpb*, 5*bpb*, 6*rsb*, 6*gsb* and 6*bsb* emitted by the light source group Z1*b* form a white light flux W1*b*. The parallel light flux 5*rpb*, 5*gpb*, 5*bpb*, 6*rsb*, 6*gsb* and 6*bsb* emitted by the light source groups Z2*b* form a white light flux W2*b*. The parallel light fluxes 5*rpb*, 5*gpb*, 5*bpb*, 6*rsb*, 6*gsb* and 6*bsb* emitted by the light source group Z3*b* form a white light flux W3*b*.

Similarly, in the light source unit 113*c*, the parallel light fluxes 5*rpc*, 5*gpc*, 5*bpc*, 6*rsc*, 6*gsc* and 6*bsc* emitted by the light source group Z1*c* from a white light flux W1*c*. The parallel light fluxes 5*rpc*, 5*gpc*, 5*bpc*, 6*rsc*, 6*gsc* and 6*bsc* emitted by the light source group Z2*c* from a white light flux W2*c*. The parallel light fluxes 5*rpc*, 5*gpc*, 5*bpc*, 6*rsc*, 6*gsc* and 6*bsc* emitted by the light source group Z3*c* form a white light flux W3*c*.

In this way, three pairs of the light sources of three colors (red, green and blue) are arranged in the Y direction, and each pair includes two light sources (light of S-polarization and light of P-polarization). Three light fluxes (for example, the light fluxes W1*a*, W2*a* and W3*a*) incident on the condenser lens 4 are arranged in the Y direction. Therefore, one light flux is formed by two light sources for each of the three colors. In other words, six light fluxes are made into one white light flux. Further, three units of light fluxes, each unit including three light fluxes, are arranged in the X direction. Therefore, the light fluxes incident on the condenser lens 4 are 9 in number, and are arranged in three rows and three columns. That is, the light fluxes emitted by 54 light sources are integrated into 9 light fluxes, and are incident on the condenser lens 4. Therefore, light use efficiency can be enhanced.

The expression "light use efficiency is enhanced" means that brightness of the light flux becomes high. This means that high brightness is obtained. The "brightness" means brightness per unit area. This means brightness per unit area of a section of the light flux.

Moreover, the light sources of Embodiment 10 are arranged in the order of the light sources 1*rp* and 2*rs*, the light sources 1*gp* and 2*gs*, and the light sources 1*bp* and 2*bs* from the −Z direction side. The light sources 1*rp* and 2*rs* are light sources that emit red light. The light sources 1*gp* and 2*gs* are light sources that emit green light. The light sources 1*bp* and 2*bs* are light sources that emit blue light.

However, the light sources that emit red light, the light sources that emit green light, and the light sources that emit blue light may be arranged in any order. For example, the light sources may be arranged in the order of the light sources 1*bp* and 2*bs*, the light sources 1*gp* and 2*gs*, and the light sources 1*rp* and 2*rs* from the −Z direction side. By appropriately setting the characteristics of the color separation filter T*rp*, 7*gp*, 7*bp*, 8*rs*, 8*gs* and 8*bs*, the transmission and reflection of light described in Embodiment 10 can be achieved, and the same effect can be obtained.

Embodiment 11

Figure 31:
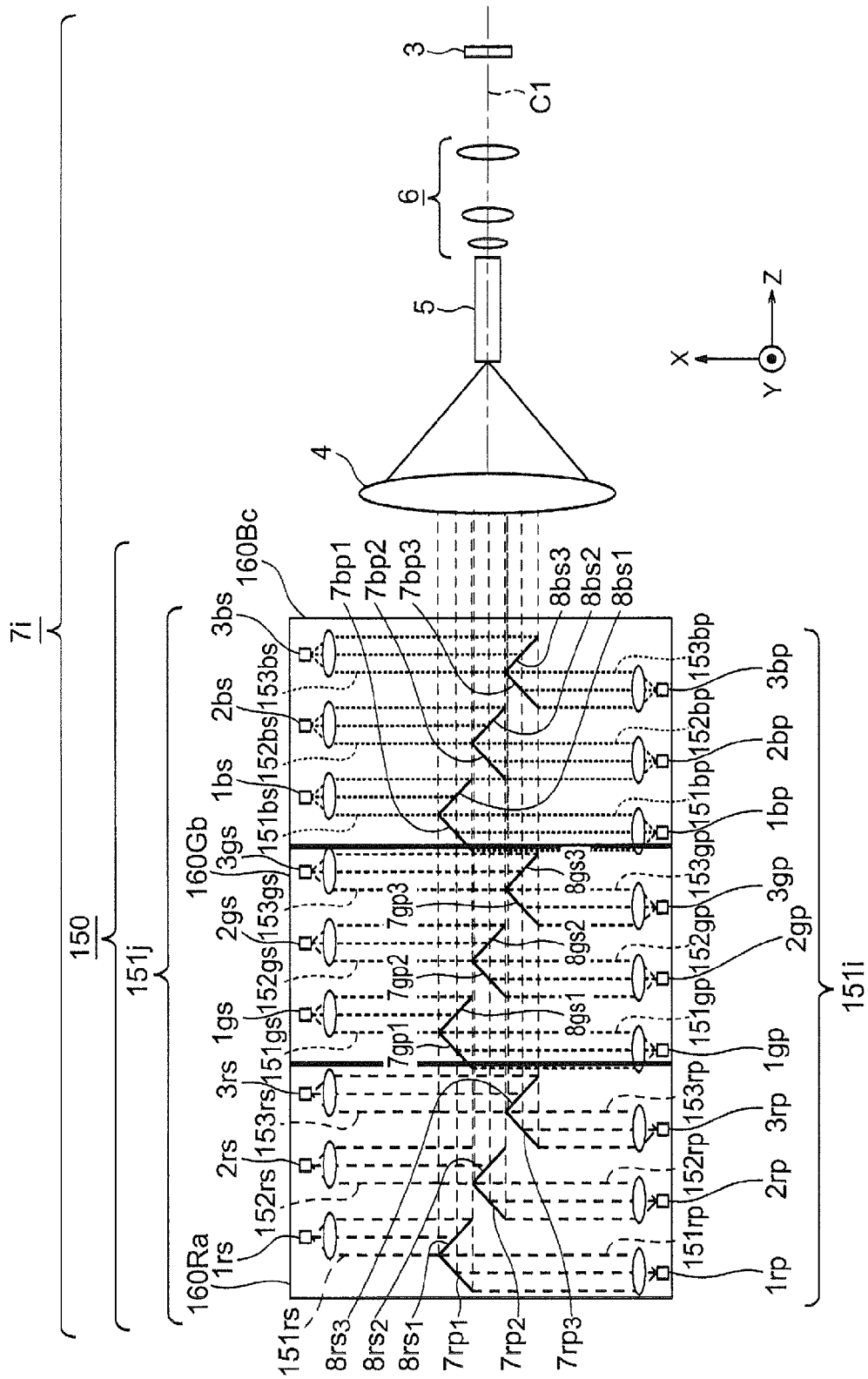
FIG. 31 is a view showing a configuration of a projection-type display apparatus including a light source device according to Embodiment 11 of the present invention.
Figure 32:
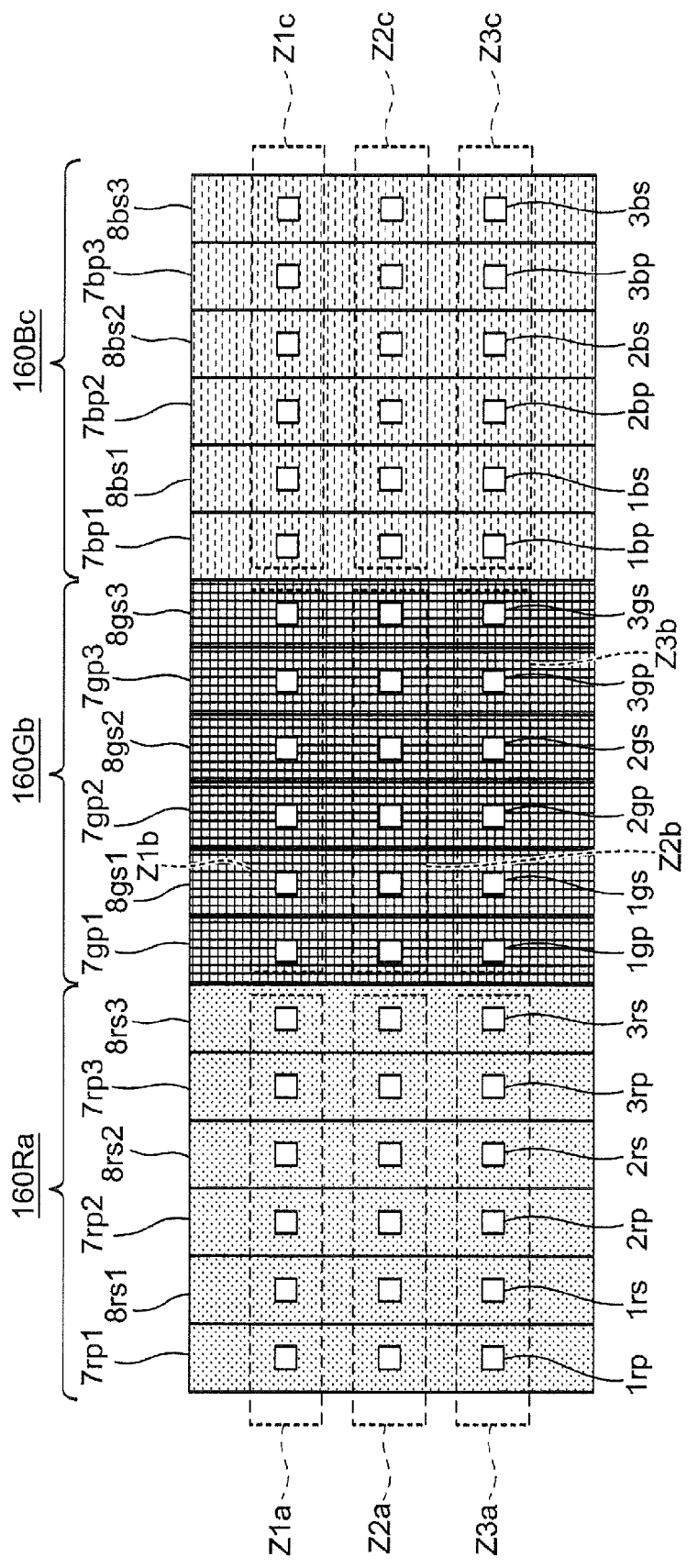
FIG. 32 is a schematic view showing a positional relationship of a light source and a color separation filter according to Embodiment 11 of the present invention.

FIG. 31 is a view showing a configuration of a projection-type display apparatus 7*i* including a light source device 150 according to Embodiment 11 of the present invention. FIG. 32 is a schematic view showing a positional relationship of light sources and color separation filters as seen from the −X direction side. FIG. 33 is a schematic view showing incident positions of the light fluxes W1*a*, W2*a*, W3*a*, W1*b*, W2*b*, W3*b*, W1*c*, W2*c* and W3*c* on the condenser lens 4 as seen from the +Z direction side.

In the projection-type display apparatus 7*i*, components on the emission side of the light source device 150 are the same as those described in Embodiment 1. The components on the emission side of the light source device are components from the condenser lens 4 to the screen 9 shown in FIG. 1. That is, the components on the emission side of the light source device are the condenser lens 4, the light intensity equalizing element 5, the relay lens group 6, the image display element 3, the projection optical system 8, and the screen 9. In FIG. 31, the projection optical system 8 and the screen 9 are omitted.

The light source device 150 of Embodiment 11 is configured so that three light source devices 111 of Embodiment 6 are arranged in the Z direction. A first light source unit 160R*a*, a second light source unit 160G*b* and a third light source unit 160B*c* are arranged in this order from the −Z direction side. A difference from the light source device 111 is that the light source units 160Ra, 160Gb and 160Bc have light sources of the same color. That is, the light sources 1$rp$, 2$rp$ and 3$rp$ of the first light source unit 160Ra emit the red light of P-polarization, and light source 1$rs$, 2$rs$ and 3$rs$ emit the red light of S-polarization. Similarly, the light sources 1$gp$, 2$gp$ and 3$gp$ of the second light source unit 160Gb emit the green light of P-polarization, and the light sources 1$gs$, 2$gs$ and 3$gs$ emit the green light of S-polarization. The light sources 1$bp$, 2$bp$ and 3$bp$ of the third light source unit 160Bc emit the blue light of P-polarization, and light sources 1$bs$, 2$bs$ and 3$bs$ emit the blur light of S-polarization.

The first light source unit 160Ra includes a first light source group 151$i$ and a second light source group 151$j$. The first light source group 151$i$ has optical axes in the X direction, and includes a plurality of light sources 1$rp$, 2$rp$ and 3$rp$ arranged in the YZ plane. The second light source group 151$j$ has optical axes in the X direction, and includes a plurality of light source 1$rs$, 2$rs$ and 3$rs$ arranged in the YZ plane.

The second light source unit 160Gb includes a first light source group 151$i$ and a second light source group 151$j$. The first light source group 151$i$ has optical axes in the X direction, and includes a plurality of light sources 1$gp$, 2$gp$ and 3$gp$ arranged in the YZ plane. The second light source group 151$j$ has optical axes in the X direction, and includes a plurality of light sources 1$gs$, 2$gs$ and 3$gs$ arranged in the YZ plane.

The third light source unit 160Bc includes a first light source group 151$i$ and a second light source group 151$j$. The first light source group 151$i$ has optical axes in the X direction, and includes a plurality of light sources 1$bp$, 2$bp$ and 3$bp$ arranged in the YZ plane. The second light source group 151$j$ includes optical axes in the X direction, and includes a plurality of light sources 1$bs$, 2$bs$ and 3$bs$ arranged in the YZ plane.

All of the six light sources 1$rp$, 2$rp$, 3$rp$, 1$rs$, 2$rs$ and 3$rs$ of the first light source unit 160Ra emit red light. The light sources 1$rp$, 2$rp$ and 3$rp$ emit the light of P-polarization. The light sources 1$rs$, 2$rs$ and 3$rs$ emit the light of S-polarization. The light source 1$rp$, the light source 2$rp$, the light source 3$rp$, the light source 1$rs$, the light source 2$rs$ and the light source 3$rs$ are respectively three in number and are arranged in the Y direction respectively. Therefore, the number of the light sources is 18.

All of six light sources 1$gp$, 2$gp$, 3$gp$, 1$gs$, 2$gs$ and 3$gs$ of the second light source unit 160Gb emit green light. The light sources 1$gp$, 2$gp$ and 3$gp$ emit the light of P-polarization. The light sources 1$gs$, 2$gs$ and 3$gs$ emit the light of S-polarization. The light source 1$gp$, the light source 2$gp$, the light source 3$gp$, the light source 1$gs$, the light source 2$gs$, and the light source 3$gs$ are respectively three in number and are arranged in the Y direction respectively. Therefore, the number of the light sources is 18.

All of six light sources 1$bp$, 2$bp$, 3$bp$, 1$bs$, 2$bs$ and 3$bs$ of the third light source unit 160Bc emit blue light. The light source 1$bp$, 2$bp$ and 3$bp$ emit the light of P-polarization. The light source 1$bs$, 2$bs$ and 3$bs$ emit the light of S-polarization. The light source 1$bp$, the light source 2$bp$, the light source 3$bp$, the light source 1$bs$, the light source 2$bs$, and the light source 3$bs$ are respectively three in number, and are arranged in the Y direction respectively. Therefore, the number of the light sources is 18.

Color separation filters 7$rp$1, 7$rp$2, 7$rp$3, 7$gp$1, 7$gp$2, 7$gp$3, 7$bp$1, 7$bp$2, 7$bp$3, 8$rs$1, 8$rs$2, 8$rs$3, 8$gs$1, 8$gs$2, 8$gs$3, 8$bs$1, 8$bs$2, and 8$bs$3 have plate shapes.

The color separation filters 7$rp$1, 7$rp$2, 7$rp$3, 7$gp$1, 7$gp$2, 7$gp$3, 7$bp$1, 7$bp$2 and 7$bp$3 are arranged in parallel to a plane obtained by rotating the XY plane by 45 degrees clockwise as seen from the +Y direction. The color separation filters 8$rs$1, 8$rs$2, 8$rs$3, 8$gs$1, 8$gs$2, 8$gs$3, 8$bs$1, 8$bs$2, and 8$bs$3 are arranged in parallel to a plane obtained by rotating the XY plane by 45 degrees counterclockwise as seen from the +Y direction.

Moreover, the color separation filters 7$rp$1, 7$rp$2 and 7$rp$3 need only have reflecting function as in Embodiment 9. This is because the color separation filters 7$rp$1, 7$rp$2 and 7$rp$3 reflect the parallel light flux 151$rp$, 152$rp$ and 153$rp$ toward the condenser lens 4, and does not transmit other light.

The color separation filters 7$rp$1, 7$rp$2 and 7$rp$3 need only have the same transmission characteristics as the color separation filter Trp of Embodiment 9 (FIG. 25). The characteristics of the color separation filter Trp is the characteristics shown in FIG. 16. Moreover, it is also possible that the color separation filters 7$rp$1, 7$rp$2 and 7$rp$3 are reflecting films.

Similarly, the color separation filters 8$rs$1, 8$rs$2 and 8$rs$3 need only have the same transmission characteristics as the color separation filter 8$rs$ of Embodiment 9 (FIG. 25). The characteristics of the color separation filter 8$rs$ is the characteristics shown in FIG. 20.

The color separation filters 7$gp$1, 7$gp$2 and 7$gp$3 need only have the same transmission characteristics as the color separation filter 7$gp$ of Embodiment 9 (FIG. 25). The characteristics of the color separation filter 7$gp$ is the characteristics shown in FIG. 21.

The color separation filter 8$gs$1, 8$gs$2 and 8$gs$3 need only have the same transmission characteristics as the color separation filter 8$gs$ of Embodiment 9 (FIG. 25). The characteristics of the color separation filter 8$gs$ is the characteristics shown in FIG. 24.

The color separation filter 7$bp$1, 7$bp$2 and 7$bp$3 need only have the same transmission characteristics as the color separation filter 7$bp$ of the Embodiment 9 (FIG. 25). The characteristics of the color separation filter 7$bp$ is the characteristics shown in FIG. 22.

The color separation filter 8$bs$1, 8$bs$2 and 8$bs$3 need only have the same transmission characteristics as the color separation filter 8$bs$ of the Embodiment 9 (FIG. 25). The characteristics of the color separation filter 8$bs$ is the characteristics shown in FIG. 27.

In the first light source unit 160Ra, an end surface of the color separation filter 8$rs$1 in the −X direction and an end surface of the color separating filter 8$rs$2 in the +X direction are aligned on the X coordinate. Similarly, an end surface of the color separation filter 8$rs$2 in the −X direction and an end surface of the color separating filter 8$rs$3 in the +X direction are aligned on the X coordinate.

In the first light source unit 160Ra, an end surface of the color separation filter 8$rs$1 in the +Z direction and an end surface of the color separating filter 7$rp$2 in the −Z direction are aligned on the Z coordinate. Similarly, an end surface of the color separation filter 8$rs$2 in the +Z direction and an end surface of the color separating filter 7$rp$3 in the −Z direction are aligned on the ZX coordinate.

Further, an end surface of the color separation filter 7$rp$1 in the +Z direction and an end surface of the color separating filter 8$rs$1 in the −Z direction are connected. An end surface of the color separation filter 7$rp$2 in the +Z direction and an end surface of the color separating filter 8$rs$2 in the −Z direction are connected. Similarly, an end surface of the color separation filter 7$rp$3 in the +Z direction and an end surface of the color separating filter 8$rs$3 in the −Z direction are connected.

In the second light source unit 160Gb, an end surface of the color separation filter 8$gs$1 in the −X direction and an end surface of the color separating filter 8$gs$2 in the +X direction are aligned on the X coordinate. Similarly, an end surface of the color separation filter 8$gs$2 in the −X direction and an end surface of the color separating filter 8gs3 in the +X direction are aligned on the X coordinate.

In the second light source unit 160Ra, an end surface of the color separation filter 8gs1 in the +Z direction and an end surface of the color separating filter 7gp2 in the −Z direction are aligned on the Z coordinate. Similarly, an end surface of the color separation filter 8gs2 in the +Z direction and an end surface of the color separating filter 7gp3 in the −Z direction are aligned on the ZX coordinate.

Further, an end surface of the color separation filter 7gp1 in the +Z direction and an end surface of the color separating filter 8gs1 in the −Z direction are connected. An end surface of the color separation filter 7gp2 in the +Z direction and an end surface of the color separating filter 8gs2 in the −Z direction are connected. Similarly, an end surface of the color separation filter 7gp3 in the +Z direction and an end surface of the color separating filter 8gs3 in the −Z direction are connected.

In the third light source unit 160Bc, an end surface of the color separation filter 8bs1 in the −X direction and an end surface of the color separation filter 8bs2 in the +X direction are aligned on the X coordinate. Similarly, an end surface of the color separation filter 8bs2 in the −X direction and an end surface of the color separation filter 8bs3 in the +X direction are aligned on the X coordinate.

In the third light source unit 160Bc, an end surface of the color separation filter 8bs1 in the +Z direction and an end surface of the color separation filter 7bp2 in the −Z direction are aligned on the Z coordinate. Similarly, an end surface of the color separation filter 8bs2 in the +Z direction and an end surface of the color separation filter 7bp3 in the −Z direction are aligned on the ZX coordinate.

Further, an end surface of the color separation filter 7bp1 in the +Z direction and an end surface of the color separating filter 8bs1 in the −Z direction are connected. An end surface of the color separation filter 7bp2 in the +Z direction and an end surface of the color separating filter 8bs2 in the −Z direction are connected. Similarly, an end surface of the color separation filter 7bp3 in the +Z direction and an end surface of the color separating filter 8bs3 in the −Z direction are connected.

Here, the term "aligned" is as described in Embodiment 6. That is, the term "aligned" includes a gap or overlapping due to variations of components and variations in assembling.

In first light source unit 160Ra, the parallel light flux 151rp emitted by the light source 1rp in the +X direction and parallelized by the parallelizing lens is reflected by the color separation filter 7rp1, proceeds in the +Z direction, and reaches the condenser lens 4. The parallel light flux 152rp emitted by the light source 2rp in the +X direction and parallelized by the parallelizing lens is reflected by the color separation filter 7rp2, proceeds in the +Z direction, and reaches the condenser lens 4. The parallel light flux 153rp emitted by the light source 3rp in the +X direction and parallelized by the parallelizing lens is reflected by the color separation filter 7rp3, proceeds in the +Z direction, and reaches the condenser lens 4.

Moreover, the parallel light flux 151rs emitted by the light source 1rs in the −X direction and parallelized by the parallelizing lens is reflected by the color separation filter 8rs1, proceeds in the +Z direction, and reaches the condenser lens 4. The parallel light flux 152rs emitted by the light source 2rs in the −X direction and parallelized by the parallelizing lens is reflected by the color separation filter 8rs2, proceeds in the +Z direction, and reaches the condenser lens 4. The parallel light flux 153rs emitted by the light source 3rs in the −X direction and parallelized by the parallelizing lens is reflected by the color separation filter 8rs3, proceeds in the +Z direction, and reaches the condenser lens 4.

In second light source unit 160Gb, the parallel light flux 151gp emitted by the light source 1gp in the +X direction and parallelized by the parallelizing lens is reflected by the color separation filter 7gp1, proceeds in the +Z direction, and reaches the condenser lens 4. The parallel light flux 152gp emitted by light source 2gp in the +X direction and parallelized by the parallelizing lens is reflected by the color separation filter 7gp2, proceeds in the +Z direction, and reaches the condenser lens 4. The parallel light flux 153gp emitted by the light source 3gp in the +X direction and parallelized by the parallelizing lens is reflected by the color separation filter 7gp3, proceeds in the +Z direction, and reaches the condenser lens 4.

Moreover, the parallel light flux 151gs emitted by the light source 1gs in the −X direction and parallelized by the parallelizing lens is reflected by the color separation filter 8gs1, proceeds in the +Z direction, and reaches the condenser lens 4. The parallel light flux 152gs emitted by the light source 2gs in the −X direction and parallelized by the parallelizing lens is reflected by the color separation filter 8gs2, proceeds in the +Z direction, and reaches the condenser lens 4. The parallel light flux 153gs emitted by the light source 3gs in the −X direction and parallelized by the parallelizing lens is reflected by the color separation filter 8gs3, proceeds in the +Z direction, and reaches the condenser lens 4.

In third light source unit 160Bc, the parallel light flux 151bp emitted by the light source 1bp in the +X direction and parallelized by the parallelizing lens is reflected by the color separation filter 7bp1, proceeds in the +Z direction, and reaches the condenser lens 4. The parallel light flux 152bp emitted by the light source 2bp in the +X direction and parallelized by the parallelizing lens is reflected by the color separation filter 7bp2, proceeds in the +Z direction, and reaches the condenser lens 4. The parallel light flux 153bp emitted by the light source 3bp in the +X direction and parallelized by the parallelizing lens is reflected by the color separation filter 7bp3, proceeds in the +Z direction, and reaches the condenser lens 4.

Moreover, the parallel light flux 151bs emitted by the light source 1bs in the −X direction and parallelized by the parallelizing lens is reflected by the color separation filter 8bs1, proceeds in the +Z direction, and reaches the condenser lens 4. The parallel light flux 152bs emitted by the light source 2bs in the −X direction and parallelized by the parallelizing lens is reflected by the color separation filter 8bs2, proceeds in the +Z direction, and reaches the condenser lens 4. The parallel light flux 153bs emitted by the light source 3bs in the −X direction and parallelized by the parallelizing lens is reflected by the color separation filter 8bs3, proceeds in the +Z direction, and reaches the condenser lens 4.

Three light source units 160Ra, 160Gb and 160Bc are different from each other in the following two points. First, transmission characteristics and reflection characteristics of the color separation filter 7rp1, 7rp2, 7rp3, 7gp1, 7gp2, 7gp3, 7bp1, 7bp2, 7bp3, 8rs1, 8rs2, 8rs3, 8gs1, 8gs2, 8gs3, 8bs1, 8bs2 and 8bs3 are different from each other.

Second, light sources 1rp, 2rp, 3rp, 1rs, 2rs, 3rs, 1gp, 2gp, 3gp, 1gs, 2gs, 3gs, 1bp, 2bp, 3bp, 1bs, 2bs and 3bs emit light of different colors.

The first light source unit 160Ra includes the light sources 1rp, 2rp, 3rp, 1rs, 2rs and 3rs that emits red light. The second light source unit 160Gb includes the light sources 1gp, 2gp, 3gp, 1gs, 2gs, and 3gs that emits green light. The third light source unit 160Bc includes light sources 1bp, 2bp, 3bp, 1bs, 2bs and 3bs that emits blue light.

In this regard, the light sources that emit light of different colors may have different inner configurations. The light source units 160Ra, 160Gb and 160Bc have the same configuration except for the above described two differences. Therefore, a relationship of the light fluxes, the color separation filters and the condenser lens 4 will be described taking the case of the light source device 160Ra as an example.

As shown in FIG. 32, the light source 1*rp*, 1*rs*, 2*rp*, 2*rs*, 3*rp* and 3*rs* are respectively three in number and arranged in the Y direction respectively. The first light source unit 160Ra includes the three light source groups Z1*a*, Z2*a* and Z3*a*. Each of the light source groups Z1*a*, Z2*a* and Z3*a* includes light sources 1*rp*, 1*rs*, 2*rp*, 2*rs*, 3*rp* and 3*rs* arranged in the Z direction. The light sources 1*rp*, 1*rs*, 2*rp*, 2*rs*, 3*rp* and 3*rs* of each of the light source groups Z1*a*, Z2*a* and Z3*a* have the same position in the X direction, and have the same position in the Y direction.

In first light source unit 160Ra, the parallel light fluxes 151*rp*, 151*rs*, 152*rp*, 152*rs*, 153*rp* and 153*rs* emitted by the light source group Z1*a* and parallelized by the parallelizing lenses are reflected by or pass through the color separation filters 7*rp*1, 8*rs*1, 7*rp*2, 8*rs*2, 7*rp*3 and 8*rs*3, and proceed in the +Z direction.

The parallel light fluxes 151*rp* and 151*rs* are superimposed to form a red light flux, and proceed to the position W1*a* on the condenser lens 4. The parallel light fluxes 152*rp* and 152*rs* are superimposed to form a red light flux, and proceed to the position W1*b* on the condenser lens 4. The parallel light fluxes 153*rp* and 153*rs* are superimposed to form a red light flux, and proceed to the position W1*c* on the condenser lens 4.

Similarly, the parallel light fluxes 151*rp*, 151*rs*, 152*rp*, 152*rs*, 153*rp* and 153*rs* emitted by the light source group Z2*a* and parallelized by the parallelizing lenses are reflected by or pass through the color separation filters 7*rp*1, 8*rs*1, 7*rp*2, 8*rs*2, 7*rp*3 and 8*rs*3, and proceed in the +Z direction.

The parallel light flux 151*rp* and 151*rs* are superimposed to form a red light flux, and proceed to the position W2*a* of the condenser lens 4. The parallel light fluxes 152*rp* and 152*rs* are superimposed to form a red light flux, and proceed to the position W2*b* on the condenser lens 4. The parallel light fluxes 153*rp* and 153*rs* are superimposed to form a red light flux, and proceed to the position W2*c* on the condenser lens 4.

Moreover, the parallel light fluxes 151*rp*, 151*rs*, 152*rp*, 152*rs*, 153*rp* and 153*rs* emitted by the light source group Z3*a* and parallelized by the parallelizing lenses are reflected by or pass through the color separation filters 7*rp*1, 8*rs*1, 7*rp*2, 8*rs*2, 7*rp*3 and 8*rs*3, and proceed in the +Z direction.

The parallel light fluxes 151*rp* and 151*rs* are superimposed to form a red light flux, and proceed to the position W3*a* on the condenser lens 4. The parallel light fluxes 152*rp* and 152*rs* are superimposed to form a red light flux, and proceed to the position W3*b* on the condenser lens 4. The parallel light fluxes 153*rp* and 153*rs* are superimposed to form a red light flux, and proceed to the position W3*c* on the condenser lens 4.

In second light source unit 160Gb, the parallel light fluxes 151*gp*, 151*gs*, 152*gp*, 152*gs*, 153*gp* and 153*gs* emitted by the light source group Z1*b* and parallelized by the parallelizing lenses are reflected by or pass through the color separation filter 7*gp*1, 8*gs*1, 7*gp*2, 8*gs*2, 7*gp*3 and 8*gs*3, and proceed in the +Z direction.

The parallel light fluxes 151*gp* and 151*gs* are superimposed to form a green light flux, and proceed to the position W1*a* on the condenser lens 4. The parallel light fluxes 152*gp* and 152*gs* are superimposed to form a green light flux, and proceed to the position W1*b* on the condenser lens 4. The parallel light fluxes 153*gp* and 153*gs* are superimposed to form a green light flux, and proceed to the position W1*c* on the condenser lens 4.

Similarly, the parallel light fluxes 151*gp*, 151*gs*, 152*gp*, 152*gs*, 153*gp* and 153*gs* emitted by the light source group Z2*b* and parallelized by the parallelizing lenses are reflected by or pass through the color separation filter 7*gp*1, 8*gs*1, 7*gp*2, 8*gs*2, 7*gp*3 and 8*gs*3, and proceed in the +Z direction.

The parallel light fluxes 151*gp* and 151*gs* are superimposed to form a green light flux, and proceed to the position W2*a* on the condenser lens 4. The parallel light fluxes 152*gp* and 152*gs* are superimposed to form a green light flux, and proceed to the position W2*b* on the condenser lens 4. The parallel light fluxes 153*gp* and 153*gs* are superimposed to form a green light flux, and proceed to the position W2*c* on the condenser lens 4.

Similarly, the parallel light fluxes 151*gp*, 151*gs*, 152*gp*, 152*gs*, 153*gp* and 153*gs* emitted by the light source group Z3*b* and parallelized by the parallelizing lenses are reflected by or pass through the color separation filters 7*gp*1, 8*gs*1, 7*gp*2, 8*gs*2, 7*gp*3 and 8*gs*3, and proceed in the +Z direction.

The parallel light fluxes 151*gp* and 151*gs* are superimposed to form a green light flux, and proceed to the position W3*a* on the condenser lens 4. The parallel light fluxes 152*gp* and 152*gs* are superimposed to form a green light flux, and proceed to the position W3*b* on the condenser lens 4. The parallel light fluxes 153*gp* and 153*gs* are superimposed to form a green light flux, and proceed to the position W3*c* on the condenser lens 4.

In third light source unit 160Bc, the parallel light fluxes 151*bp*, 151*bs*, 152*bp*, 152*bs*, 153*bp*, and 153*bs* emitted by the light source group Z1*c* and parallelized by the parallelizing lenses are reflected by the color separation filters 7*bp*1, 8*bs*1, 7*bp*2, 8*bs*2, 7*bp*3 and 8*bs*3, and proceed in the +Z direction.

The parallel light fluxes 151*bp* and 151*bs* are superimposed to form a blue light flux, and proceed to the position W1*a* on the condenser lens 4. The parallel light fluxes 152*bp* and 152*bs* are superimposed to form a blue light flux, and proceed to the position W1*b* on the condenser lens 4. The parallel light fluxes 153*bp* and 153*bs* are superimposed to form a blue light flux, and proceed to the position W1*c* on the condenser lens 4.

Similarly, the parallel light fluxes 151*bp*, 151*bs*, 152*bp*, 152*bs*, 153*bp*, and 153*bs* emitted by the light source group Z2*c* and parallelized by the parallelizing lenses are reflected by or pass through the color separation filters 7*bp*1, 8*bs*1, 7*bp*2, 8*bs*2, 7*bp*3 and 8*bs*3, and proceed in the +Z direction.

The parallel light fluxes 151*bp* and 151*bs* are superimposed to form a blue light flux, and proceed to the position W2*a* on the condenser lens 4. The parallel light fluxes 152*bp* and 152*bs* are superimposed to form a blue light flux, and proceed to the position W2*b* on the condenser lens 4. The parallel light fluxes 153*bp* and 153*bs* are superimposed to form a blue light flux, and proceed to the position W2*c* on the condenser lens 4.

Similarly, the parallel light fluxes 151*bp*, 151*bs*, 152*bp*, 152*bs*, 153*bp* and 153*bs* emitted by the light source group Z3*c* parallelized by the parallelizing lenses are reflected by or pass through the color separation filters 7*bp*1, 8*bs*1, 7*bp*2, 8*bs*2, 7*bp*3 and 8*bs*3, and proceed in the +Z direction.

The parallel light fluxes 151*bp* and 151*bs* are superimposed to form a blue light flux, and proceed to the position W3*a* on the condenser lens 4. The parallel light fluxes 152*bp* and 152*bs* are superimposed to form a blue light flux, and proceed to the position W3*b* on the condenser lens 4. The parallel light fluxes 153*bp* and 153*bs* are superimposed to form a blue light flux, and proceed to the position W3*c* on the condenser lens 4.

The light source group Z1*a*, the light source group Z1*b* and the light source group Z1*c* have the same positions in the X direction and have the same position in the Y direction. The light source group Z1a, the light source group Z1b and the light source group Z1c are arranged in the Z direction at a line. The light source group Z1a, the light source group Z1b and the light source group Z1c are arranged in this order from the −Z direction side to the +Z direction side.

The light source group Z2a, the light source group Z2b and the light source group Z2c have the same position in the X direction and have the same position in the Y direction. The light source group Z2a, the light source group Z2b and the light source group Z2c are arranged in the Z direction. The light source group Z2a, the light source group Z2b and the light source group Z2c are arranged in this order form the −Z direction side to the +Z direction side.

The light source group Z3a, the light source group Z3b and the light source group Z3c have the same position in the X direction and have the same position in the Y direction. The light source group Z3a, the light source group Z3b and the light source group Z3c are arranged in the Z direction. The light source group Z1a, the light source group Z3b and the light source group Z3c are arranged in this order from the −Z direction side to the +Z direction side.

The expression "the respective light sources have the same positions in the X direction" means that the positions of the corresponding light sources in the X direction are the same. The expression "corresponding light sources" means the light source 1rp, the light source 1gp and the light source 1bp. It also means the light source 1rs, the light source 1gs and the light source 1bs. It also means the light source 2rp, the light source 2gp and the light source 2bp. It also means the light source 2rs, the light source 2gs and the light source 2bs. It also means the light source 3rp, the light source 3gp and the light source 3bp. It also means the light source 3rs, the light source 3gs and the light source 3bs.

The parallel light fluxes 151rp and 151rs of the light source group Z1a, the parallel light fluxes 151gp and 151gs of the light source group Z1b, and the parallel light fluxes 151bp and 151bs of the light source group Z1c are superimposed on each other to form a white light flux, and proceed to the position W1a on the condenser lens 4.

The parallel light fluxes 152rp and 152rs of the light source group Z1a, the parallel light fluxes 152gp and 152gs of the light source group Z1b, and the parallel light flux 152bp and 152bs of the light source group Z1c are superimposed on each other to form a white light flux, and proceed to the position W1b on the condenser lens 4.

The parallel light fluxes 153rp and 153rs of the light source group Z1a, the parallel light fluxes 153gp and 153gs of the light source group Z1b, and the parallel light fluxes 153bp and 153bs of the light source group Z1c are superimposed on each other to form a white light flux, and proceed to the position W1c on the condenser lens 4.

The parallel light fluxes 151rp and 151rs of the light source group Z2a, the parallel light fluxes 151gp and 151gs of the light source group Z2b, and the parallel light fluxes 151bp and 151bs of the light source group Z2c are superimposed on each other to form a white light flux, and proceed to the position W2a on the condenser lens 4.

The parallel light fluxes 152rp and 152rs of the light source group Z2a, the parallel light fluxes 152gp and 152gs of the light source group Z2b, and the parallel light fluxes 152bp and 152bs of the light source group Z2c are superimposed on each other to form a white light flux, and proceed to the position W2b on the condenser lens 4.

The parallel light fluxes 153rp and 153rs of the light source group Z2a, the parallel light fluxes 153gp and 153gs of the light source group Z2b, and the parallel light fluxes 153bp and 153bs of the light source group Z2c are superimposed on each other to form a white light flux, and proceed to the position W2c on the condenser lens 4.

The parallel light fluxes 151rp and 151rs of the light source group Z3a, the parallel light fluxes 151gp and 151gs of the light source group Z3b, and the parallel light fluxes 151bp and 151bs of the light source group Z3c are superimposed on each other to form a white light flux, and proceed to the position W3a on the condenser lens 4.

The parallel light fluxes 152rp and 152rs of the light source group Z3a, the parallel light fluxes 152gp and 152gs of the light source group Z3b, and the parallel light fluxes 152bp and 152bs of the light source group Z3c are superimposed on each other to form a white light flux, and proceed to the position W3b of the condenser lens 4.

The parallel light fluxes 153rp and 153rs of the light source group Z3a, the parallel light fluxes 153gp and 153gs of the light source group Z3b, and the parallel light fluxes 153bp and 153bs of the light source group Z3c are superimposed on each other to form a white light flux, and proceed to the position W3c of the condenser lens 4.

The configuration of Embodiment 11 has been described. Here, description will be made of that the configuration of Embodiment 11 corresponds to a modification of Embodiment 9. That is, the configuration of Embodiment 11 corresponds to a configuration in which three configurations of Embodiment 9 are arranged in the X direction.

The light source 1rs emits the light whose polarization direction is different from the light source 1rp by 90 degrees. The light source 2rs emits the light whose polarization direction is different from the light source 2rp by 90 degrees. The light source 3rs emits the light whose polarization direction is different from the light source 3rp by 90 degrees.

Similarly, the light source 1gs emits the light whose polarization direction is different from the light source 1gp by 90 degrees. The light source 2gs emits the light whose polarization direction is different from the light source 2gp by 90 degrees. The light source 3gs emits the light whose polarization direction is different from the light source 3gp by 90 degrees.

Similarly, the light source 1bs emits the light whose polarization direction is different from the light source 1bp by 90 degrees. The light source 2bs emits the light whose polarization direction is different from the light source 2bp by 90 degrees. The light source 3bs emits the light whose polarization direction is different from the light source 3bp by 90 degrees.

The parallel light flux 151rp emitted by the light source 1rp is reflected by the color separation filter 7rp1 toward the condenser lens 4. The parallel light flux 151rs emitted by light source 1rs is reflected by the color separation filter 8rs1 toward the condenser lens 4. The parallel light flux 151rp reflected by the color separation filter 7rp1 passes through the color separation filter 8rs1 based on the polarization direction of the light. The parallel light fluxes 151rp and 151rs correspond to light of the first wavelength band.

The parallel light flux 151gp emitted by light source 1gp is reflected by the color separation filter 7gp1 toward the condenser lens 4. The parallel light flux 151gs emitted by light source 1gs is reflected by the color separation filter 8gs1 toward the condenser lens 4. The parallel light flux 151gp reflected by the color separation filter 7gp1 passes through the color separation filter 8gs1 based on the polarization direction of the light. The parallel light fluxes 151gp and 151gs correspond to light of the second wavelength band. The parallel light fluxes 151*rp* and 151*rs* pass through the color separation filters 7*gp*1 and 8*gs*1 based on the wavelength band of the light.

The parallel light flux 151*bp* emitted by light source 1*bp* is reflected by the color separation filter 7*bp*1 toward the condenser lens 4. The parallel light flux 151*bs* emitted by light source 1*bs* is reflected by the color separation filter 8*bs*1 toward the condenser lens 4. The parallel light flux 151*bp* reflected by the color separation filter 7*bp*1 passes through the color separation filter 8*bs*1 based on the polarization direction of the light. The parallel light fluxes 151*bp* and 151*bs* correspond to light of the third wavelength band. The parallel light fluxes 151*rp* and 151*rs* and the parallel light fluxes 151*gp* and 151*gs* pass through the color separation filters 7*bp*1 and 8*bs*1 based on the wavelength band of the light.

The parallel light flux 151*rp*, the parallel light flux 151*rs* and the parallel light flux 151*gp* passing through the color separation filter 8*gs*1, and the parallel light flux 151*gs* reflected by the color separation filter 8*gs*1 proceed in the same direction. That is, the parallel light flux 151*rp*, the parallel light flux 151*rs* and the parallel light flux 151*gp* passing through the color separation filter 8*gs*1, and the parallel light flux 151*gs* reflected by the color separation filter 8*gs*1 proceed toward the condenser lens 4.

Moreover, the parallel light flux 151*rp*, the parallel light flux 151*rs*, the parallel light flux 151*gp*, the parallel light flux 151*gs* and the parallel light flux 151*bp* passing through the color separation filter 8*bs*1, and the parallel light flux 151*bs* reflected by the color separation filter 8*bs*1 proceed in the same direction. That is, the parallel light flux 151*rp*, the parallel light flux 151*rs*, the parallel light flux 151*gp*, the parallel light flux 151*gs* and the parallel light flux 151*bp* passing through the color separation filter 8*bs*1 and the parallel light flux 151*bs* reflected by the color separation filter 8*bs*1 proceed toward the condenser lens 4.

The same can be said for the light sources 2*rp*, 2*rs*, 2*gp*, 2*gs*, 2*bp* and 2*bs*.

The parallel light flux 152*rp* emitted by the light source 2*rp* is reflected toward the condenser lens 4 by the color separation filter 7*rp*2. The parallel light flux 152*rs* emitted by light source 2*rs* is reflected by the color separation filter 8*rs*2 toward the condenser lens 4. The parallel light flux 152*rp* reflected by the color separation filter 7*rp*2 passes through the color separation filter 8*rs*2 based on the polarization direction of the light. The parallel light fluxes 152*rp* and 152*rs* correspond to light of the first wavelength band.

The parallel light flux 152*gp* emitted by the light source 2*gp* is reflected toward the condenser lens 4 by the color separation filter 7*gp*2. The parallel light flux 152*gs* emitted by light source 2*gs* is reflected by the color separation filter 8*gs*2 toward the condenser lens 4. The parallel light flux 152*gp* reflected by the color separation filter 7*gp*2 passes through the color separation filter 8*gs*2 based on the polarization direction of the light. The parallel light fluxes 152*gp* and 152*gs* correspond to light of the second wavelength band. The parallel light fluxes 152*rp* and 152*rs* pass through the color separation filters 7*gp*2 and 8*gs*2 based on the wavelength band of the light.

The parallel light flux 152*bp* emitted by the light source 2*bp* is reflected by the color separation filter 7*bp*2 toward the condenser lens 4. The parallel light flux 152*bs* emitted by the light source 2*bs* is reflected by the color separation filter 8*bs*2 toward the condenser lens 4. The parallel light flux 152*bp* reflected by the color separation filter 7*bp*2 passes through the color separation filter 8*bs*2 based on the polarization direction of the light. The parallel light fluxes 152*bp* and 152*bs* correspond to light of the third wavelength band. The parallel light fluxes 152*rp* and 152*rs*, the parallel light fluxes 152*gp* and 152*gs* pass through the color separation filters 7*bp*2 and 8*bs*2 based on the wavelength band of the light.

The parallel light flux 152*rp*, the parallel light flux 152*rs* and the parallel light flux 152*gp* passing through the color separation filter 8*gs*2, and the parallel light flux 152*gs* reflected by the color separation filter 8*gs*2 proceed in the same direction. That is, the parallel light flux 152*rp*, the parallel light flux 152*rs* and the parallel light flux 152*gp* passing through the color separation filter 8*gs*2, and the parallel light flux 152*gs* reflected by the color separation filter 8*gs*2 proceed toward the condenser lens 4.

Moreover, the parallel light flux 152*rp*, the parallel light flux 152*rs*, the parallel light flux 152*gp*, the parallel light flux 152*gs* and the parallel light flux 152*bp* passing through the color separation filter 8*bs*2, and the parallel light flux 152*bs* reflected by the color separation filter 8*bs*2 proceed in the same direction. That is, the parallel light flux 152*rp*, the parallel light flux 152*rs*, the parallel light flux 152*gp*, the parallel light flux 152*gs* and the parallel light flux 152*bp* passing through the color separation filter 8*bs*2, and the parallel light flux 152*bs* reflected by the color separation filter 8*bs*2 proceed toward the condenser lens 4.

The same can be said for the light sources 3*rp*, 3*rs*, 3*gp*, 3*gs*, 3*bp*, and 3*bs*.

The parallel light flux 153*rp* emitted by light source 3*rp* is reflected by the color separation filter 7*rp*3 toward the condenser lens 4. The parallel light flux 153*rs* emitted by light source 3*rs* is reflected by the color separation filter 8*rs*3 toward the condenser lens 4. The parallel light flux 153*rp* reflected by the color separation filter 7*rp*3 passes through the color separation filter 8*rs*3 based on the polarization direction of the light. The parallel light fluxes 153*rp* and 153*rs* correspond to light of the first wavelength band.

The parallel light flux 153*gp* emitted by light source 3*gp* is reflected by the color separation filter 7*gp*3 toward the condenser lens 4. The parallel light flux 153*gs* emitted by the light source 3*gs* is reflected by the color separation filter 8*gs*3 toward the condenser lens 4. The parallel light flux 153*gp* reflected by the color separation filter 7*gp*3 passes through the color separation filter 8*gs*3 based on the polarization direction of the light. The parallel light fluxes 153*gp* and 153*gs* correspond to light of the second wavelength band. The parallel light fluxes 153*rp* and 153*rs* pass through the color separation filters 7*gp*3 and 8*gs*3 based on the wavelength band of the light.

The parallel light flux 153*bp* emitted by light source 3*bp* is reflected by the color separation filter 7*bp*3 toward the condenser lens 4. The parallel light flux 153*bs* emitted by light source 3*bs* is reflected by the color separation filter 8*bs*3 toward the condenser lens 4. The parallel light flux 153*bp* reflected by the color separation filter 7*bp*3 passes through the color separation filter 8*bs*3 based on the polarization direction of the light. The parallel light fluxes 153*bp* and 153*bs* correspond to light of the third wavelength band. The parallel light fluxes 153*rp* and 153*rs* and the parallel light fluxes 153*gp* and 153*gs* pass through the color separation filter 7*bp*3 and 8*bs*3 based on the wavelength band of the light.

The parallel light flux 153*rp*, the parallel light flux 153*rs* and the parallel light flux 153*gp* passing through the color separation filter 8*gs*3, and the parallel light flux 153*gs* reflected by the color separation filter 8*gs*3 proceed in the same direction. That is, the parallel light flux 153*rp*, the parallel light flux 153*rs* and the parallel light flux 153*gp* passing through the color separation filter 8*gs*3, and the parallel light flux 153*gs* reflected by the color separation filter 8*gs*3 proceed toward the condenser lens 4.

Moreover, the parallel light flux 153*rp*, the parallel light flux 153*rs*, the parallel light flux 153*gp*, the parallel light flux 153*gs* and the parallel light flux 153*bp* pass through the color separation filter 8*bs*3, and the parallel light flux 153*bs* reflected by the color separation filter 8*bs*3 proceed in the same direction. That is, the parallel light flux 153*rp*, the parallel light flux 153*rs*, the parallel light flux 153*gp*, the parallel light flux 153*gs* and the parallel light flux 153*bp* passing through the color separation filter 8*bs*3, and the parallel light flux 153*bs* reflected by the color separation filter 8*bs*3 proceed toward the condenser lens 4.

The light fluxes 151*rp*, 151*gp* and 151*rs* emitted by the light source groups Z1*a* and Z1*b* and passing through the color separation filter 8*gs*1, and the light flux 151*gs* reflected by the color separation filter 8*gs*1 proceed in the same direction. Moreover, the light fluxes 151*rp*, 151*gp*, 151*bp*, 151*rs* and 151*gs* emitted by the light source groups Z1*a*, Z1*b* and Z1*c* and passing through the color separation filter 8*bs*1, and the light flux 151*bs* reflected by the color separation filter 8*bs*1 proceed in the same direction, and are superimposed on each other. The superimposed light fluxes form the white light flux W1*a*.

The light fluxes 151*rp*, 151*gp* and 151*rs* emitted by the light source groups Z2*a* and Z2*b* and passing through the color separation filter 8*gs*1, and the light flux 151*gs* reflected by the color separation filter 8*gs*1 proceed in the same direction. Moreover, the light flux 151*rp*, 151*gp*, 151*bp*, 151*rs* and 151*gs* emitted by the light source groups Z2*a*, Z2*b* and Z2*c* and passing through the color separation filter 8*bs*1, and the light flux 151*bs* reflected by the color separation filter 8*bs*1 proceed in the same direction, and are superimposed on each other. The superimposed light fluxes form the white light flux W2*a*.

The light fluxes 151*rp*, 151*gp* and 151*rs* emitted by the light source groups Z3*a* and Z3*b* and passing through the color separation filter 8*gs*1, and the light flux 151*gs* reflected by the color separation filter 8*gs*1 proceed in the same direction. The light fluxes 151*rp*, 151*gp*, 151*bp*, 151*rs* and 151*gs* emitted by the light source groups Z3*a*, Z3*b* and Z3*c* and passing through the color separation filter 8*bs*1, and the light flux 151*bs* reflected by the color separation filter 8*bs*1 proceed in the same direction, and are superimposed on each other. The superimposed light fluxes form the white light flux W3*a*.

The light fluxes 152*rp*, 152*gp* and 152*rs* emitted by the light source groups Z1*a* and Z1*b* and passing through the color separation filter 8*gs*2, and the light flux 152*gs* reflected by the color separation filter 8*gs*2 proceed in the same direction. Moreover, the light fluxes 152*rp*, 152*gp*, 152*bp*, 152*rs* and 152*gs* emitted by the light source groups Z1*a*, Z1*b* and Z1*c* and passing through the color separation filter 8*bs*2, and the light flux 152*bs* reflected by the color separation filter 8*bs*2 proceed in the same direction, and are superimposed on each other. The superimposed light fluxes form the white light flux W1*b*.

The light fluxes 152*rp*, 152*gp* and 152*rs* emitted by the light source groups Z2*a* and Z2*b* and passing through the color separation filter 8*gs*2, and the light flux 152*gs* reflected by the color separation filter 8*gs*2 proceed in the same direction. Moreover, the light fluxes 152*rp*, 152*gp*, 152*bp*, 152*rs* and 152*gs* emitted by the light source groups Z2*a*, Z2*b* and Z2*c* and passing through the color separation filter 8*bs*2, and the light flux 152*bs* reflected by the color separation filter 8*bs*2 proceed in the same direction, and are superimposed on each other. The superimposed light fluxes form the white light flux W2*b*.

The light fluxes 152*rp*, 152*gp* and 152*rs* emitted by the light source groups Z3*a* and Z3*b* and passing through the color separation filter 8*gs*2, and the light flux 152*gs* reflected by the color separation filter 8*gs*2 proceed in the same direction. Moreover, the light fluxes 152*rp*, 152*gp*, 152*bp*, 152*rs* and 152*gs* emitted by the light source groups Z3*a*, Z3*b* and Z3*c* and passing through the color separation filter 8*bs*2, and the light flux 152*bs* reflected by the color separation filter 8*bs*2 proceed in the same direction, and are superimposed on each other. The superimposed light fluxes form the white light flux W3*b*.

The light fluxes 153*rp*, 153*gp* and 153*rs* emitted by the light source groups Z1*a* and Z1*b* and passing through the color separation filter 8*gs*3, and the light flux 153*gs* reflected by the color separation filter 8*gs*3 proceed in the same direction. Moreover, the light flux 153*rp*, 153*gp*, 153*bp*, 153*rs* and 153*gs* emitted by the light source groups Z1*a*, Z1*b* and Z1*c* and passing through the color separation filter 8*bs*3, and the light flux 153*bs* reflected by the color separation filter 8*bs*3 proceed in the same direction, and are superimposed on each other. The superimposed light fluxes form the white light flux W1*c*.

The light fluxes 153*rp*, 153*gp* and 153*rs* emitted by the light source groups Z2*a* and Z2*b* and passing through the color separation filter 8*gs*3, and the light flux 153*gs* reflected by the color separation filter 8*gs*3 proceed in the same direction. Moreover, the light flux 153*rp*, 153*gp*, 153*bp*, 153*rs* and 153*gs* emitted by the light source groups Z2*a*, Z2*b* and Z2*c*, and passing through the color separation filter 8*bs*3, and light flux 153*bs* reflected by the color separation filter 8*bs*3 proceed in the same direction, and are superimposed on each other. The superimposed light fluxes form the white light flux W2*c*.

The light fluxes 153*rp*, 153*gp* and 153*rs* emitted by the light source groups Z3*a* and Z3*b* and passing through the color separation filter 8*gs*3, and the light flux 153*gs* reflected by the color separation filter 8*gs*3 proceed in the same direction. Moreover, the light fluxes 153*rp*, 153*gp*, 153*bp*, 153*rs* and 153*gs* emitted by the light source groups Z3*a*, Z3*b* and Z3*c* and passing through the color separation filter 8*bs*3, and the light flux 153*bs* reflected by the color separation filter 8*bs*3 proceed in the same direction, and are superimposed on each other. The superimposed light fluxes form the white light flux W3*c*.

Moreover, the superimposed light fluxes 152*rp*, 152*rs*, 152*gp*, 152*gs*, 152*bp* and 152*bs* emitted by the light source groups Z1*a*, Z1*b* and Z1*c* (i.e., light fluxes at the position of the light flux W1*b* in FIG. 30) are proximate to the superimposed light fluxes 151*rp*, 151*rs*, 151*gp*, 151*gs*, 151*bp* and 151*bs* emitted by the light source groups Z1*a*, Z1*b* and Z1*c* (i.e., the light fluxes in the position of the light flux W1*a* in FIG. 30) and the superimposed light fluxes 153*rp*, 153*rs*, 153*gp*, 153*gs*, 153*bp* and 153*bs* emitted by the light source groups Z1*a*, Z1*b* and Z1*c* (i.e., the light fluxes in the position of the light flux W1*c* in FIG. 30).

The superimposed light fluxes 152*rp*, 152*rs*, 152*gp*, 152*gs*, 152*bp* and 152*bs* emitted by the light source groups Z2*a*, Z2*b* and Z2*c* (i.e., the light fluxes in the position of the light flux W2*b* in FIG. 30) are proximate to the superimposed light fluxes 151*rp*, 151*rs*, 151*gp*, 151*gs*, 151*bp* and 151*bs* emitted by the light source groups Z2*a*, Z2*b* and Z2*c* (i.e., the light fluxes in the position of the light flux W2*a* in FIG. 30) and the superimposed light fluxes 153*rp*, 153*rs*, 153*gp*, 153*gs*, 153*bp* and 153*bs* emitted by the light source groups Z2*a*, Z2*b* and Z2*c* (i.e., the light fluxes in the position of the light flux W2*c* in FIG. 30).

The superimposed light fluxes 152rp, 152rs, 152gp, 152gs, 152bp and 152bs emitted by the light source groups Z3a, Z3b and Z3c (i.e., the light fluxes in the position of light flux W3b in FIG. 30) are proximate to the superimposed light fluxes 151rp, 151rs, 151gp, 151gs, 151bp, 151bs emitted by the light source groups Z3a, Z3b and Z3c (i.e., the light fluxes in the position of light flux W3a in FIG. 30) and the superimposed light fluxes 153rp, 153rs, 153gp, 153gs, 153bp and 153bs emitted by the light source groups Z3a, Z3b and Z3c (i.e., the light fluxes in the position of light flux W3c in FIG. 30).

Moreover, the light flux W1b is proximate to the light flux W1a and the light flux W1c. Similarly, the light flux W2b is proximate to the light flux W2a and the light flux W2c. The light flux W3b is proximate to the light flux W3a and the light flux W3c.

The expression "proximate" means a close position. The expression "proximate" does not necessarily means contacting. Moreover, the expression "proximate" means that a gap between light fluxes is less than or equal to a width of the light flux.

Moreover, the respective light sources of Embodiment 11 are arranged in the order of the light sources 1rp and 1rs, the light sources 1gp and 1gs, and the light sources 1bp and 1bs from the −Z direction side. However, the light sources that emit red light, the light sources that emit green light, and the light sources that emit blue light may be arranged in any order. For example, the respective light sources may be arranged in the order of the light sources 1bp and 1bs, the light sources 1gp and 1gs, and the light source 1rp and 1rs from the −Z direction side.

Similarly, the respective light sources of Embodiment 11 are arranged in the order of the light sources 2rp and 2rs, the light sources 2gp and 2gs, and the light sources 2bp and 2bs from the −Z direction side. However, the light sources that emit red light, the light sources that emit green light, and the light sources that emit blue light may be arranged in any order. For example, the respective light sources may be arranged in the order of the light sources 2bp and 2bs, the light sources 2gp and 2gs, and the light sources 2rp and 2rs from the −Z direction side.

Similarly, the respective light sources of Embodiment 11 are arranged in the order of the light sources 3rp and 3rs, the light sources 3gp and 3gs, and the light sources 3bp and 3bs from the −Z direction side. However, the light sources that emit red light, the light sources that emit green light, and the light sources that emit blue light may be arranged in any order. For example, the respective light sources may be are arranged in the order of the light sources 3bp and 3bs, the light sources 3gp and 3gs, and the light source 3rp and 3rs from the −Z direction side.

The light sources 1rp, 1rs, 2rp, 2rs, 3rp and 3rs are light sources that emit red light. The light sources 1gp, 1gs, 2gp, 2gs, 3gp and 3gs are light sources that emit green light. The light sources 1bp, 1bs, 2bp, 2bs, 3bp and 3bs are light sources that emit blue light. By appropriately setting the characteristics of the color separation filters 7rp1, 7rp2, 7rp3, 7gp1, 7gp2, 7gp3, 7bp1, 7bp2, 7bp3, 8rs1, 8rs2, 8rs3, 8gs1, 8gs2, 8gs3, 8bs1, 8bs2 and 8bs3, the transmission and reflection of the light described with Embodiment 11 can be achieved, and the same effect can be obtained.

Next, the light source unit 160Ra will be described. The light sources 1rp, 2rp and 3rp emit light fluxes 151rp, 152rp and 153rp. The light sources 1rs, 2rs and 3rs emit light fluxes 151rs 152rs and 153rs whose polarization directions are different from the light fluxes 151rp, 152rp and 153rp by 90 degrees.

The color separation filters 7rp1, 7rp2 and 7rp3 are color separation filters that reflect light fluxes 151rp, 152rp and 153rp. The color separation filters 7rp1, 7rp2 and 7rp3 have plate shapes.

The color separation filters 8rs1, 8rs2 and 8rs3 are color separation filters that transmit the light fluxes 151rp, 152rp and 153rp, and reflect the light fluxes 151rs, 152rs and 153rs based on the polarization direction of the light. The color separation filters 8rs1, 8rs2 and 8rs3 have plate shapes. In this regard, the color separation filters 7rp1, 7rp2 and 7rp3 need only have reflecting function as described above.

Modules including the light sources 1rp, 2rp and 3rp, the light sources 1rs, 2rs and 3rs, and the color separation filters 7rp1, 7rp2, 7rp3, and the color separation filters 8rs1, 8rs2 and 8rs3 are referred to as light source modules.

In the light source modules, ends of the color separation filters 7rp1, 7rp2 and 7rp3 and ends of the color separation filters 8rs1, 8rs2 and 8rs3 are connected so that surfaces of the color separation filters 7rp1, 7rp2 and 7rp3, and surfaces of the color separation filters 8rs1, 8rs2 and 8rs3 form an angle other than 180 degrees and 0 degree. This angle is 90 degrees in Embodiment 11.

The light fluxes 151rp, 152rp and 153rp are reflected by the surfaces of the color separation filters 7rp1, 7rp2 and 7rp3 whose angles with the color separation filters 8rs1, 8rs2 and 8rs3 are smaller than 180 degrees. The light fluxes 151rp, 152rp and 153rp are incident on the surfaces of the color separation filters 8rs1, 8rs2 and 8rs3 whose angles with the color separation filters 7rp1, 7rp2 and 7rp3 are smaller than 180 degrees, and pass through the color separation filters 8rs1, 8rs2 and 8rs3.

The light fluxes 151rs, 152rs and 153rs are reflected by the surfaces of the color separation filters 8rs1, 8rs2 and 8rs3 whose angles with the surfaces of the color separation filters 7rp1, 7rp2 and 7rp3 are larger than 180 degrees.

The light source modules emit the light fluxes 151rp, 152rp and 153rp passing through the color separation filters 8rs1, 8rs2 and 8rs3, and the light fluxes 151rs, 152rs and 153rs reflected by the surfaces of the color separation filters 8rs1, 8rs2 and 8rs3 so that the light fluxes proceed in the same direction.

The light source unit 160Ra includes a plurality of light source modules. A plurality of light source modules are arranged so that directions where the light sources 1rp, 2rp, and 3rp are located with respect to the color separation filters 7rp1, 7rp2, and 7rp3 of the respective light source modules are the same. Further, a plurality of light source modules are arranged so that directions where the light sources 1rs, 2rs and 3rs are located with respect to the color separation filters 8rs1, 8rs2 and 8rs3 of the respective light source modules are the same.

Among the light source modules, the color separation filters 7rp1, 7rp2 and 7rp3 and the color separation filters 8rs1, 8rs2 and 8rs3 of one light source module are shifted toward the light sources 1rp, 2rp, 3rp and the light sources 1rs, 2rs and 3rs of the one light source module are located, with respect to the color separation filters 7rp1, 7rp2 and 7rp3 and the color separation filters 8rs1, 8rs2 and 8rs3 of another light source module.

Moreover, the light sources 1rp, 2rp and 3rp and the light sources 1rs, 2rs and 3rs emit the light of the same wavelength band. Similarly, the light sources 1gp, 2gp and 3gp and the light sources 1gs, 2gs and 3gs emit the light of the same wavelength band. The light sources 1bp, 2bp and 3bp and the light sources 1bs, 2bs and 3bs emit the light of the same wavelength band.

Since the light source device 150 is constituted as described above, the red parallel light fluxes passing through the condenser lens 4 form nine red parallel light fluxes arranged in the XY plane as seen from the +Z direction side. Nine green parallel light fluxes are arranged in the XY plane. Nine blue parallel light fluxes are arranged in the XY plane. Three parallel light fluxes from the respective light sources are arranged in the X direction in the XY plane, and three parallel light fluxes are arranged in the Y direction in the XY plane. Nine light fluxes of the respective colors are combined, and therefore nine white parallel light fluxes are arranged in the XY plane. That is, as shown in FIG. 33, the parallel light fluxes arranged in three rows and three columns pass through the condenser lens 4.

With such a configuration, the light fluxes of two light sources of each of 3 colors (i.e., a total of six light sources) is combined, and white light fluxes are generated. Three white light fluxes are arranged in the X direction and three white light fluxes are arranged in the Y direction. Therefore, nine light fluxes arranged in three rows and three columns enters into the condenser lens 4. That is, 54 light sources are integrated into 9 light fluxes, and are incident on the condenser lens 4. Therefore, light use efficiency can be enhanced.

The expression "light use efficiency is enhanced" means that brightness of the light flux becomes high. This means that high brightness is obtained. The "brightness" means brightness per unit area. This means brightness per unit area of a section of the light flux.

In this regard, although the peak wavelength of the blue light was approximately 450 nm in this embodiment, is may be approximately 460 nm. In such a case, it is necessary to appropriately set the setting of the color separation filters. For example, the transmission characteristics for the light of S-polarization shown in FIG. 27 may be shifted so that the light of S-polarization whose wavelength is 470 nm or more passes.

Embodiment 12

Figure 34:
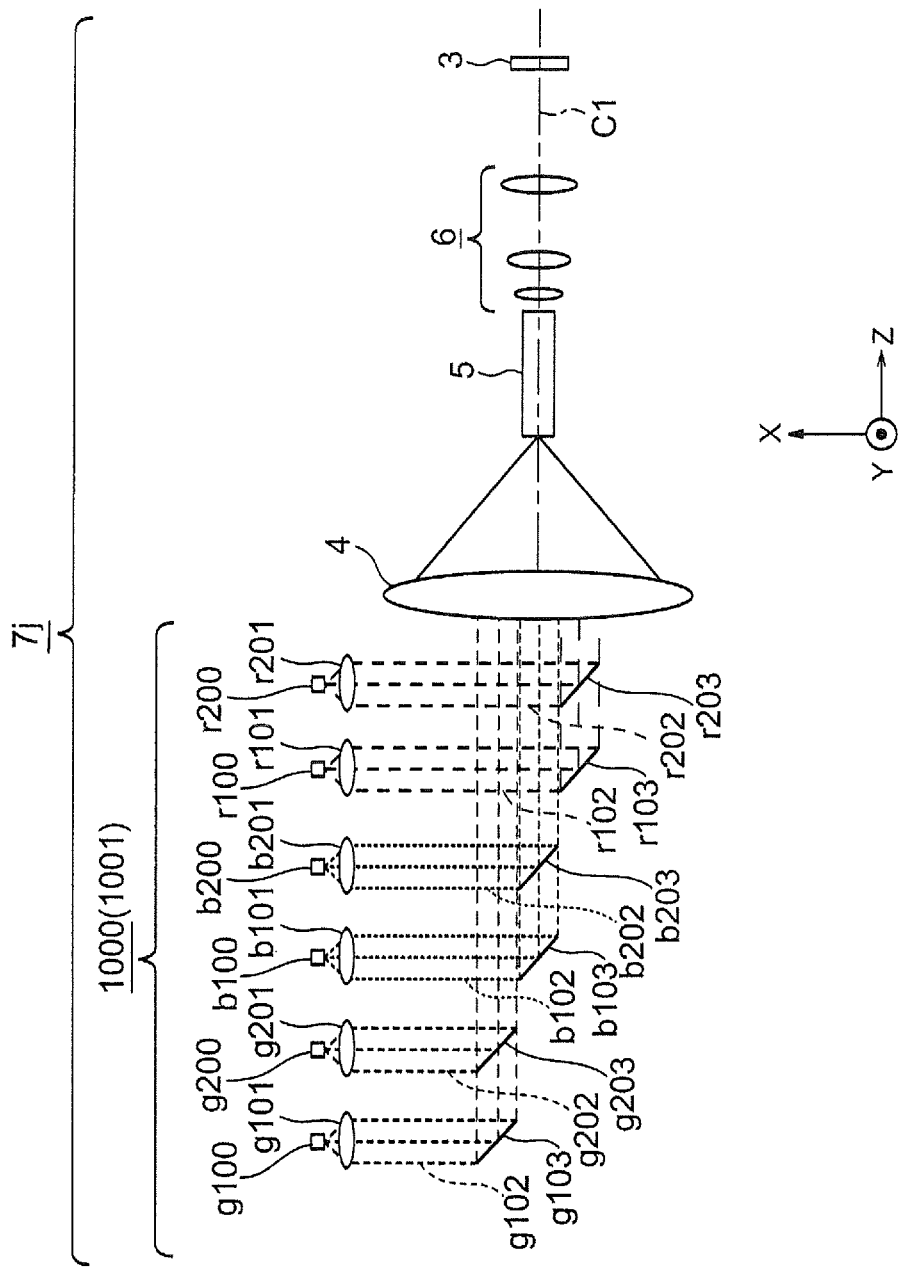
FIG. 34 is a view showing a configuration of a projection-type display apparatus including a light source device according to Embodiment 12 of the present invention.

FIG. 34 is a view showing a configuration of a projection-type display apparatus 7j in which the light source device 111 (FIG. 10) of the above described Embodiment 6 is modified. In the projection-type display apparatus 7j, components on the emission side of the light source device are the same as those of Embodiment 1. The component on the emission side of the light source device are components from the condenser lens 4 to the screen 9 shown in FIG. 9. That is, "the components on the emission side of the light source device" is the condenser lens 4, the light intensity equalizing element 5, the relay lens group 6, the image display element 3, the projection optical system 8, and the screen 9. In FIG. 34, the projection optical system 8 and the screen 9 are omitted.

As shown in FIG. 34, the projection-type display apparatus 7j includes a light source device 1000. The light source device 1000 is different from the light source device 111 of Embodiment 6 in that the light source device 1000 only includes the first light source group. A first light source group 1001 has an optical axes in the X direction. Moreover, the first light source group 1001 includes a plurality of light sources g100, g200, b100, b200, r100 and r200. The light sources g100, g200, b100, b200, r100 and r200 are arranged in the YZ plane. The expression "in the YZ plane" means that on a flat surface of the YZ plane. Similarly, the expression "in the XY plane" means that on a flat surface of the XY plane. The expression "in the ZX plane" means that on a flat surface of the ZX plane.

A plurality of light sources g100, b100, and r100 are arranged in two rows in the Y direction and a column in the Z direction (in two rows and a column) (refer to FIG. 35). In contrast, a plurality of light sources g200, b200, and r200 are arranged in three lines and the Z direction in the Y direction at one row (one row of three lines) (refer to FIG. 35).

Parallelizing lenses g101, g201, b101, b201, r101 and r201 are provided on respective emission sides of a plurality of light sources g100, g200, b100, b200, r100 and r200. That is, the parallelizing lenses g101, g201, b101, b201, r101 and r201 are arranged on the −X direction sides of a plurality of light sources g100, g200, b100, b200, r100 and r200.

A reflecting element g103 is provided on the emission side of the parallelizing lens g101. A transmitting-reflecting element g203 is provided on the emission side of the parallelizing lens g201. A reflecting element b103 is provided on the emission side of the parallelizing lens b101. A transmitting-reflecting element b203 is provided on the emission side of the parallelizing lens b201. A reflecting element r103 is provided on the emission side of the parallelizing lens r101. A transmitting-reflecting element r203 is provide on the emission side of the parallelizing lens r201.

The reflecting element g103 reflects the parallel light flux g102 parallelized by the parallelizing lens g101 toward the condenser lens 4 (i.e., in the +Z direction). The transmitting-reflecting element g203 reflects the parallel light flux g202 parallelized by the parallelizing lens g201 toward the condenser lens 4 (i.e., in the +Z direction). The reflecting element b103 reflects the parallel light flux b102 parallelized by the parallelizing lens b101 toward the condenser lens 4 (i.e., in the +Z direction). The transmitting-reflecting element b203 reflects the parallel light flux b202 parallelized by parallelizing lens b201 toward the condenser lens 4 (i.e., in the +Z direction). The reflecting element r103 reflects the parallel light flux r102 parallelized by the parallelizing lens r101 toward the condenser lens 4 (i.e., in the +Z direction). The transmitting-reflecting element r203 reflects the parallel light flux r202 parallelized by the parallelizing lens r201 toward the condenser lens 4 (i.e., in the +Z direction).

The reflecting element g103 and the transmitting-reflecting element g203 are provided at the same position in the X direction and in the Y direction. Therefore, the parallel light flux g102 reflected by the reflecting element g103 passes through the transmitting-reflecting element g203, and proceeds in the Z direction. The reflecting element b103 and the transmitting-reflecting element b203 are provided at the same position in the X direction and in the Y direction. Therefore, the parallel light flux b102 reflected by the reflecting element b103 passes through the transmitting-reflecting element b203, and proceeds in the Z direction. The reflecting element r103 and the transmitting-reflecting element r203 are provided at the same position in the X direction and in the Y direction. Therefore, the parallel light flux r102 reflected by the reflecting element r103 passes through the transmitting-reflecting element r203, and proceeds in the Z direction.

In the X direction, the reflecting element b103 and the transmitting-reflecting element b203 are located on the −X direction side with respect to the reflecting element g103 and the transmitting-reflecting element g203. In the X direction, the reflecting element b103 and the transmitting-reflecting element b203 are located so as not to interrupt the parallel light fluxes g102 and g202 that proceed in the +Z direction. Moreover, in the X direction, the reflecting element r103 and the transmitting-reflecting element r203 are located in the −X direction side with respect to the reflecting element b103 and the transmitting-reflecting element b203. In the X direction, the reflecting element r103 and the transmitting-reflecting element r203 are located so as not to interrupt the parallel light fluxes b102 and b202 that proceed in the +Z direction.

FIG. 35 is a configuration view showing the reflecting elements g103, b103 and r103 and the transmitting-reflecting elements g203, b203 and r203 as seen from the −X direction. In FIG. 35, in order to show positions of the reflecting elements g103, b103 and r103, positions of the transmitting-reflecting elements g203, b203 and r203, and a positional relationship with the light sources g100, g200, b100, b200, r100 and r200, the respective light sources g100, g200, b100, b200, r100 and r200 of the first light source group 1001 are shown by solid lines.

As shown in FIG. 35, the reflecting elements g103, b103 and r103 have rectangular shapes elongated in the Y direction. Moreover, the transmitting-reflecting elements g203, b203 and r203 have rectangular shapes elongated in the Y direction. Moreover, the reflecting elements g103, b103 and r103 and the transmitting-reflecting elements g203, b203 and r203 are arranged at equal intervals in the Z direction.

Moreover, a position of the light source g100 in the Z direction is aligned with a center position of the reflecting element g103 in the Z direction. A position of the light source g200 in the Z direction is aligned with a center position of the transmitting-reflecting element g203 in the Z direction. A position the light source b100 in the Z direction is aligned with a center position of the reflecting element b103 in the Z direction. A position of the light source b200 in the Z direction is aligned with a center position of the transmitting-reflecting element b203 in the Z direction. A position of the light source r100 in the Z direction is aligned with a center position of the reflecting element r103 in the Z direction. A position of the light source r200 in the Z direction is aligned with a center position of the transmitting-reflecting element r203 in the Z direction. The light sources g100, b100 and r100 are respectively two in number, and are arranged in the Y direction respectively. The light sources g200, b200 and r200 are respectively three in number, and are arranged in the Y direction respectively.

The reflecting elements g103, b103 and r103 are obtained by forming reflecting portions Rg, Rb and Rr using reflecting films or the like on surfaces of transparent plates such as glass. The reflecting elements g103, b103 and r103 have reflecting portions Rg, Rb and Rr formed on entire surfaces thereof.

The transmitting-reflecting elements g203, b203 and r203 are obtained by forming reflecting portions Rg, Rb and Rr using reflecting films or the like on surfaces of transparent plates such as glass. The transmitting-reflecting elements g203, b203 and r203 have the reflecting portions Rg, Rb and Rr respectively where the light fluxes emitted by the light sources g200, b200 and r200 are incident. Regions on the transmitting-reflecting elements g203, b203 and r203 where the reflecting portions Rg, Rb and Rr are not formed correspond to transmitting regions that transmit the light fluxes.

In the Y direction, the light sources g100 are located at positions corresponding to regions on the transmitting-reflecting element g203 that transmit the light flux. Similarly, in the Y direction, the light sources b100 are located at portions corresponding to regions on the transmitting-reflecting element b203 that transmit the light flux of. Moreover, in the Y direction, the light sources r100 are located at positions corresponding to regions on the transmitting-reflecting element r203 that transmit the light flux of the.

With such a configuration, the parallel light fluxes g102, b102, and r102 emitted by the light sources g100, b100 and r100 and parallelized by the parallelizing lenses g101, b101 and r101 are reflected by the reflecting elements g103, b103 and r103 in the +Z direction, pass through the transmitting regions of the transmitting-reflecting elements g203, b203 and r203, and are incident on the condenser lens 4.

Moreover, the parallel light fluxes g202, b202 and r202 emitted by the light sources g200, b200 and r200 and parallelized by the parallelizing lenses g201, b201 and r201 are reflected by the transmitting-reflecting elements g203, b203 and r203 in the +Z direction, and are incident on the condenser lens 4.

FIG. 36(A) is a schematic view showing positions where the parallel light fluxes g102, b102 and r102 are incident on the condenser lens 4. The parallel light fluxes g102, b102 and r102a are emitted by the light sources g100, b100 and r100 of the first light source group 1001 and parallelized by the parallelizing lenses g101, b101 and r101.

As shown in FIG. 36(A), when only the light sources g100, b100 and r100 are used, a total of six parallel light fluxes are incident on an incident surface of the condenser lens 4. The green parallel light fluxes g102 emitted by the light sources g100 are arranged in two rows in the Y direction and a row in the X direction (i.e., in two rows and one column) and are incident on the condenser lens 4. The blue parallel light fluxes b102 emitted by the light sources b100 are arranged in two rows in the Y direction and a row in the X direction (i.e., in two rows and one column) and are incident on the condenser lens 4. The red parallel light fluxes r102 emitted by the light sources r100 are arranged in two rows in the Y direction and a row in the X direction (i.e., in two rows and one column) and are incident on the condenser lens 4. The parallel light fluxes g102, b102 and r102 are arranged densely in the X direction, but gaps are formed in the Y direction. Therefore, light use efficiency is not good.

In contrast, in this Embodiment 12, when all the light sources g100, g200, b100, b200, r100 and r200 are used, a total of 15 parallel light fluxes are incident on the incident surface of the condenser lens 4. The parallel light fluxes g202, b202, and r202 emitted by the light sources g200, b200 and r200 (i.e., a total of nine light sources) and parallelized by the parallelizing lenses g201, b201 and r201 are incident on the condenser lens 4, and are arranged in three rows in the Y direction and in three columns in the X direction (i.e., in three rows and three columns). The parallel light fluxes g202 are green light fluxes. The parallel light fluxes b202 are blue light fluxes. The parallel light fluxes r202 are red light fluxes. The parallel light fluxes g102 b102, and r102 are incident on the condenser lens 4 in three rows of two columns so as to eliminate gaps between the parallel light fluxes g202, b202 and r202 in the Y directions at the incident surface of the condenser lens 4. In this way, the parallel light fluxes g102, b102, r102, g202, b202 and r202 are incident on the incident surface of the condenser lens 4 without leaving gaps, and therefore light use efficiency can be enhanced.

As described above, the light source device 1000 of the form 12 of this embodiment eliminates gaps between the light fluxes at the incident surface of the condenser lens 4 by using the light fluxes emitted by the light sources g100, b100 and r100, and the light fluxes emitted by the light sources g200, b200 and r200. Therefore, the light source device 1000 with high light use efficiency can be achieved.

Moreover, the reflecting elements g103, b103 and r103 do not have transmitting regions. Therefore, reflecting films having high reflectance can be used.

Moreover, the green light sources, the blue light sources, and the red light sources are used here. However, the same effect can be obtained even when monochromatic light sources are used.

Moreover, polarization separation elements may be used as the transmitting-reflecting elements g203, b203 and r203. In this case, it is preferred that the polarization directions of the light flux emitted by the light sources g100, b100 and r100 are different from the polarization directions of the light fluxes emitted by the light sources g200, b200 and r200 by 90 degrees.

Furthermore, when the polarization directions of the light sources g100, b100 and r100 are different from the polarization directions of the light sources g200, b200 and r200 by 90 degrees, the entire surfaces of the transmitting-reflecting elements g203, b203 and r203 can be made of the polarization separating films. When the transmitting-reflecting elements g203, b203 and r203 are used, parts of the parallel light fluxes g102, b102 and g102 emitted by the light sources g100, b100 and r100 are reflected by the reflecting portions Rg, Rb and Rr, and do not reach the condenser lens 4. By using the polarization separating films, the parts of the parallel light fluxes g102, b102 and g102 reflected by the reflecting portions Rg, Rb and Rr and do not reach the condenser lens 4 can be made reach the condenser lens 4. Therefore, light use efficiency of the light source device 1000 can be enhanced.

In this case, if the peak wavelength of red is 640 nm, the transmitting-reflecting element r203 need only have the transmittance characteristic shown in FIG. 20 on an entire surface thereof. If the peak wavelength of green is 530 nm, the transmitting-reflecting element g203 need only have the transmittance characteristic shown in FIG. 18 on an entire surface thereof. If the peak wavelength of blue is 450 nm, the transmitting-reflecting element b203 need only have the transmittance characteristic shown in FIG. 14 on an entire surface thereof.

Moreover, in Embodiment 12, as shown in FIG. 36(A), the light sources g100, b100 and r100 are arranged in two rows in the Y direction. However, the number of rows may be three or more l.

In this embodiment, the interval between the light source g200 and the light source b100 in the Z direction and the interval between the light source b200 and the light source r 100 in the Z direction correspond to the interval between the parallel light fluxes g102 and g202 and the parallel light fluxes b102 and b202 in the X direction and the interval between the parallel light fluxes b102 and b202 and the parallel light fluxes r102 and r202 in the X direction. The intervals in the X direction are close to each other. Therefore, light use efficiency increases.

Furthermore, the dense parallel light fluxes can be made reach the condenser lens 4 using one light source device 1000, and therefore cooling becomes easy.

Moreover, the first light source group 1001 may be constituted by a monochromatic light for exciting a phosphor. In this case, a phosphor is provided at a condensing position of a light flux. A light flux of a color (wavelength) different from the monochromatic light source condensed on the phosphor is emitted.

The present invention is applicable to, for example, a light source device using light sources such LEDs and LDs, and a projection-type display apparatus using the light source device.

Moreover, the present invention is applicable to, for example, a projection-type display apparatus having LEDs that emit red light and LEDs that emit blue light, and also using LDs emitting blue light on a phosphor to emit green light. Since a high-pressure mercury lamp is not used as a light source, a mercury free can be achieved. Brightness of the lamp gradually decreases due to electrode wear, and therefore it is difficult to increase a lifetime. In contrast, a lifetime of the projection-type display apparatus to which the present invention is applied can be extended.

In the above described embodiments, light emitted by the light source is parallelized by the parallelizing lens. However, parallelizing of the light is not essential requirement. The same effect can be obtained when the light flux is convergent light toward the condenser lens. In this regard, since the difference between the respective light sources and the condenser lens 4 are different, designing of lenses can be simple when the parallel light flus is used.

Moreover, in the above described embodiments, the light sources are so provided that optical axes of the opposing light sources are parallel to each other. However, the present invention is not limited to such arrangement. The optical axes of the light emitted by the respective light sources need only be arranged so that the light reflected by the transmitting-and-reflecting element and the polarization separation element proceed toward the condenser lens 4. As the optical axes of the opposing light sources are not parallel, the light source is prevented from being irradiated with the light from the opposing light source. Therefore, deterioration of the light source is prevented, and the lifetime of the light source can be prevented from being shortened.

In this regard, although embodiments of the present invention have been described, the present invention is not limited to these embodiments.

EXPLANATION OF MARKS 1, 1e, 1f, 111, 113, 113a, 113b, 113c, 120, 150 and 1000 . . . light source device, 1rp . . . light source (first light source), 1gp . . . light source (third light source), 1bp . . . light source (fifth light source), 2a . . . first light source group, 2b . . . second light source group, 2rs . . . light source (second light source), 2gs . . . light source (fourth light source), 2bs light source (sixth light source), 3 . . . image display element (light valve), 4 . . . condenser lens (condenser optical system), 5 . . . light intensity equalizing element, 5rp . . . parallel light flux (light of first polarization), 5gp . . . parallel light flux (light of third polarization), 5bp . . . parallel light flux (light of fifth polarization), 6 . . . relay lens groups, 6rs . . . parallel light flux (light of second polarization), 6gs . . . parallel light flux (light of fourth polarization), 6bs . . . parallel light flux (light of sixth polarization), 7a, 7b, 7c, 7d, 7e, 7f, 7g, 7h and 7i . . . projection type display, Trp, 7rp1, 7rp2, and 7rp3 . . . color separation filter (reflecting element), 7gp . . . color separation filter (second selective transmission element), 7bp . . . color separation filter (fourth selective transmission element), 8rs, 8rs1, 8rs2 and 8rs3 . . . color separation filter (first selective transmission element), 8gs . . . color separation filter (third selective transmission element), 8bs . . . color separation filter (fifth selective transmission element), 11r, 11b, 11g, 12r, 12b and 12g . . . light source, 13r, 13b, 13g, 14r, 14b and 14g . . . parallelizing lens, 17 . . . transmitting-reflecting element, 21r, 21b, 21g, 22r, 22b and 22g . . . light source, 27 . . . transmitting-reflecting element, 37, 57, 88, 108R, 108B and 108G . . . transmitting-reflecting element, 77b, 87b and 68 . . . polarization separation element (polarization separation element), 101a and 101c . . . first light source unit, 101b and 101d . . . second light source unit, 102a, 102c, 102e, 102g, 114i and 121i . . . first light source group, 102b, 102d, 102f, 102h, 114j and 121j . . . second light source group, 151rp, 152rp and 153rp . . . parallel light flux (light of first polarization), 151rs, 152rs and 153rs . . . parallel light flux (light of second polarization), and 160Ra . . . first light source unit, 160Gb . . . second light source unit, 160Bc . . . third light source unit, 302a, 302b, 302g and 302r . . . light source group (first light source group), 402a, 402r, 402g and 402b . . . light source group (second light source group), 311b, 312b, 312g, 312r, 411r, 412r, 412g, and 412b Light source (the first light source), 313b, 314b, 314g, 314r, 413r, 414r, 414g and 414b . . . parallelizing lens, 317b and 417r . . . color separation filter (polarization separation element), 317g and 417g . . . color separation filter (first selective transmission element), 317r and 417b . . . color separation filter (second selective transmission element), g100, g200, b100, b200, r100 and r200 . . . light source, g103, b103 and r103 . . . reflecting element, g203, b203 and r203 . . . transmitting-reflecting element, 1001 . . . first light source group.

What is claimed is:

1. A light source device comprising;
a first light source that emits light of a first polarization;
a second light source that emits light of a second polarization whose polarization direction is different from the light of the first polarization by 90 degrees, wherein a combined wavelength band of the light of the first polarization and the light of the second polarization is a first wavelength band;
a third light source that emits light of a third polarization and of a wavelength band which is different from the first wavelength band;
a first selective transmission element that transmits the light of the first polarization and reflects the light of the second polarization based on the polarization direction of the light;
a second selective transmission element that transmits combined light of the light of the first polarization passing through the first selective transmission element and the light of the second polarization reflected by the first selective transmission element based on the wavelength band of the light, and reflects the light of the third polarization based on the wavelength band of the light;
a fourth light source that emits light of a fourth polarization whose polarization direction is different from the light of the third polarization by 90 degrees; and
a third selective transmission element that transmits the combined light of the light of the first polarization and the light of the second polarization passing through the second selective transmission element based on the wavelength band of the light, transmits the light of the third polarization reflected by the second selective transmission element based on the polarization direction of the light, and reflects the light of the fourth polarization,
wherein the light of the first polarization and the light of the second polarization passing through the second selective transmission element, and the light of the third polarization reflected by the second selective transmission element proceed in the same direction,
wherein the light of the first polarization, the light of the second polarization and the light of the third polarization passing through the third selective transmission element, and the light of the fourth polarization reflected by the third selective transmission element proceed in the same direction.

2. The light source device according to claim 1, further comprising:
a fifth light source that emits light of a fifth polarization;
a sixth light source that emits light of a sixth polarization whose polarization direction is different from the light of the fifth polarization by 90 degrees, wherein a combined wavelength band of the light of the third polarization and the light of the fourth polarization is a second wavelength band which is different from the first wavelength band, wherein a combined wavelength band of the light of the fifth polarization and the light of the sixth polarization is a third wavelength band which is different from the second wavelength band;

a fourth selective transmission element that transmits combined light of the light of the first polarization, the light of the second polarization and the light of the third polarization passing through the third selective transmission element and the light of the fourth polarization reflected by the third selective transmission element based on the wavelength of the light, and reflects the light of the fifth polarization based on the wavelength band of the light;
a fifth selective transmission element that transmits combined light of the light of the first polarization, the light of the second polarization, the light of the third polarization and the light of the fourth polarization passing through the fourth selective transmission element based on the wavelength band of the light, transmits the light of the fifth polarization reflected by the fourth selective transmission element based on the polarization direction of the light, and reflects the light of the sixth polarization based on the polarization direction of the light;
wherein the light of the first polarization, the light of the second polarization, the light of the third polarization, the light of the fourth polarization and the light of the fifth polarization passing through the fifth selective transmission element and the light of the sixth polarization reflected by the fifth selective transmission element proceed in the same direction.

3. The light source device according to claim 1, wherein when the light of the first polarization, the light of the second polarization and the light of the third polarization passing through the third selective transmission element and the light of the fourth polarization reflected by the third selective transmission element proceed in the same direction, the light of the first polarization, the light of the second polarization, the light of the third polarization and the light of the fourth polarization are superimposed on each other or proximate to each other.

4. The light source device according to claim 2, wherein when the light of the first polarization, the light of the second polarization, the light of the third polarization, the light of the fourth polarization and the light of the fifth polarization passing through the fifth selective transmission element and the light of the sixth polarization reflected by the fifth selective transmission element proceed in the same direction, the light of the first polarization, the light of the second polarization, the light of the third polarization, the light of the fourth polarization, the light of the fifth polarization and the light of the sixth polarization are superimposed on each other or proximate to each other.

5. The light source device according to claim 2, wherein the first wavelength band, the second wavelength band and the third wavelength band are in an ascending order from a shortest wavelength, or the third wavelength band, the second wavelength band and the first wavelength band are in an ascending order from the shortest wavelength.

6. A projection-type display apparatus comprising:
the light source device according to claim 1;
a condenser lens for condensing a light flux emitted by the light source;
a light intensity equalizing element provided on an emission side of the condenser lens, the light intensity equalizing element equalizing light intensity of incident light flux;
a relay optical system that guides the light flux emitted by the light intensity equalizing element;
a light valve on which the light flux emitted by the relay optical system is incident, the light valve generating image light; and a projection optical system that projects the image light generated by the light valve.

7. A light source device comprising:
a first light source that emits first light of a first wavelength band;
a second light source that emits light of a first polarization direction and of a different wavelength band from the first wavelength band;
a third light source that emits light of a second polarization whose polarization direction is different from the light of the first polarization by 90 degrees;
a first selective transmission element that transmits the first light based on the wavelength band of the light, and reflects the light of the first polarization based on the wavelength band of the light; and
a second selective transmission element that transmits the first light passing through the first selective transmission element based on the wavelength band of the light, transmits the light of the first polarization reflected by the first selective transmission element based on the polarization direction of the light, and reflects the light of the second polarization based on the polarization direction of the light,
wherein the first light and the light of the first polarization passing through the second selective transmission element, and the light of the second polarization reflected by the second selective transmission element proceed in the same direction.

8. The light source device according to claim 7, wherein when the first light and the light of the first polarization passing through the second selective transmission element and the light of the second polarization reflected by the second selective transmission element proceed in the same direction, the first light, the light of the first polarization and the light of the second polarization are superimposed on each other or proximate to each other.

9. A light source device comprising a plurality of light source modules,
each light source modules comprising:
a first light source that emits light of a first polarization;
a second light source that emits light of a second polarization whose polarization direction is different from the light of the first polarization by 90 degrees;
a reflecting element that reflects the light of the first polarization; and
a selective transmission element that transmits the light of the first polarization reflected by the reflecting element based on the polarization direction of the light, and reflects the light of the second polarization,
wherein an end portion of the reflecting element and an end portion of the selective transmission element are connected so that a surface of the reflecting element and a surface of the selective transmission element have an angle other than 180 degrees or 0 degree,
wherein the light of the first polarization is reflected by the surface of the reflecting element on a side whose angle is smaller than 180 degrees, is incident on the surface of the selective transmission element on a side whose angle is smaller than 180 degrees, and passes through the selective transmission element,
wherein the light of the second polarization is reflected by the surface of the selective transmission element on a side whose angle is larger than 180 degrees,
wherein the light of the first polarization passing through the selective transmission element and the light of the second polarization reflected by the surface of the selective transmission element are emitted as a light flux proceeding in the same direction,
wherein a plurality of light source modules are arranged so that the first light sources are disposed in the same direction with respect to the reflecting elements of the respective light source modules, and so that the second light sources are disposed in the same direction with respect to the selective transmission elements of the respective light source modules,
wherein the reflecting element and the selective transmission element of one of the plurality of light source modules are disposed at a shifted position with respect to the reflecting element and the selective transmission element of another one of the plurality of light source modules toward a side where the first light source or the second light source of the one of the plurality of light source modules is disposed.

10. The light source device according to claim 9, wherein the first light source and the second light source emit light of the same wavelength.

11. The light source device according to claim 9, wherein when the light of the first polarization passing through the selective transmission element and the light of the second polarization reflected by the selective transmission element proceed in the same direction, the light of the first polarization and the light of the second polarization are superimposed on each other or proximate to each other.

12. The light source device according to claim 10, wherein when the light of the first polarization passing through the selective transmission element and the light of the second polarization reflected by the selective transmission element proceed in the same direction, the light of the first polarization and the light of the second polarization are superimposed on each other or proximate to each other.

* * * * *